(12) United States Patent
Lapstun et al.

(10) Patent No.: US 7,673,218 B2
(45) Date of Patent: Mar. 2, 2010

(54) SYSTEM FOR DECODING BIT STREAM PRINTED ON SURFACE

(75) Inventors: Paul Lapstun, Balmain (AU); Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 0 days.

(21) Appl. No.: 12/199,738

(22) Filed: Aug. 27, 2008

(65) Prior Publication Data

US 2008/0317190 A1    Dec. 25, 2008

Related U.S. Application Data

(63) Continuation of application No. 11/084,742, filed on Mar. 21, 2005, now Pat. No. 7,584,402.

(30) Foreign Application Priority Data

Apr. 2, 2004    (AU) .............................. 2004901796

(51) Int. Cl.
*G11C 29/00*    (2006.01)
(52) U.S. Cl. ..................... 714/769; 714/770; 714/763
(58) Field of Classification Search ................ 714/769, 714/770, 776, 784, 798, 799, 22, 763
See application file for complete search history.

(56) References Cited

U.S. PATENT DOCUMENTS

| | | |
|---|---|---|
| 4,237,375 A | 12/1980 | Granholm |
| 4,493,080 A | 1/1985 | Campbell |
| 4,493,083 A | 1/1985 | Kinoshita |
| 4,864,618 A | 9/1989 | Wright et al. |
| 5,051,736 A | 9/1991 | Bennett et al. |

(Continued)

FOREIGN PATENT DOCUMENTS

EP    0780790 A2    6/1997

(Continued)

OTHER PUBLICATIONS

Dymetman, M., and Copperman, M., "Intelligent Paper in Electronic Publishing, Artist Imaging, and Digital Typography, Proceedings of EP '98", Mar./Apr. 1998, Springer Verlag LNCS 1375, pp. 392-406.

(Continued)

*Primary Examiner*—Scott T Baderman
*Assistant Examiner*—Fritz Alphonse

(57)    ABSTRACT

A system for decoding coded data printed in ink on a surface. The coded data includes an encoded bit stream and associated redundancy data, and a registration structure of clock tracks indicative of a position of the coded data in the direction perpendicular to an alignment direction and two alignment lines for each clock track. The system has a store for storing the coded data and a decoder for determining a codeword format for the coded data, reading the coded data from the store using the determined format, correcting errors in the encoded bit stream, and writing the corrected data to the store. The coded data is read so as to de-interleave the encoded bit stream and redundancy data into codewords. The decoder uses an alignment phase-locked loop (PLL) to determine a position of the alignment lines so as to determine the position of each respective track and update the alignment PLL.

6 Claims, 31 Drawing Sheets

U.S. PATENT DOCUMENTS

| | | |
|---|---|---|
| 5,301,072 A | 4/1994 | Wilson |
| 5,464,974 A | 11/1995 | Priddy et al. |
| 5,477,012 A | 12/1995 | Sekendur |
| 5,517,631 A | 5/1996 | Machado et al. |
| 5,652,412 A | 7/1997 | Lazzouni et al. |
| 5,661,506 A | 8/1997 | Lazzouni et al. |
| 5,692,073 A | 11/1997 | Cass |
| 5,717,197 A | 2/1998 | Petrie |
| 5,852,434 A | 12/1998 | Sekendur |
| 5,988,645 A * | 11/1999 | Downing ............ 273/348 |
| 5,996,105 A | 11/1999 | Zook |
| 6,009,549 A | 12/1999 | Bliss et al. |
| 6,076,734 A | 6/2000 | Dougherty et al. |
| 6,112,324 A | 8/2000 | Howe et al. |
| 6,192,139 B1 * | 2/2001 | Tao ............ 382/100 |
| 6,341,730 B1 | 1/2002 | Petrie |
| 6,543,024 B2 | 4/2003 | Gray |
| 6,903,887 B2 | 6/2005 | Asano et al. |
| 6,964,374 B1 | 11/2005 | Djuknic et al. |
| 7,064,861 B2 * | 6/2006 | Wexler et al. ............ 358/1.9 |
| 2002/0028015 A1 | 3/2002 | Tack-Don et al. |
| 2003/0056169 A1 | 3/2003 | Lapstun et al. |
| 2003/0227513 A1 | 12/2003 | Samii |
| 2004/0035935 A1 | 2/2004 | Takahasi et al. |

FOREIGN PATENT DOCUMENTS

| | | |
|---|---|---|
| EP | 0672994 B1 | 7/2000 |
| GB | 2306669 A | 5/1997 |
| JP | 2003076962 | 3/2003 |
| WO | WO 99/18487 A2 | 4/1999 |
| WO | WO 99/50787 A1 | 10/1999 |
| WO | WO 02/080087 A1 | 10/2002 |

OTHER PUBLICATIONS

Bauer, R et al. "Iterative Source/Channel-Decoding Using Reversible Variable Length Codes" Proceedings Data Compression Conference DCC 2000. Published Mar. 28-30, 2000. Abstract.

* cited by examiner

SYSTEM FOR DECODING BIT STREAM PRINTED ON SURFACE

CROSS-REFERENCES TO RELATED APPLICATIONS

The present application is a Continuation of U.S. application Ser. No. 11/084,742 now U.S. Pat. No. 7,584,402, now allowed, filed on, Mar. 21, 2005 all of which are herein incorporated by reference.

FIELD OF THE INVENTION

The present invention broadly relates to a method and apparatus for storing digital data on physical surfaces.

CO-PENDING APPLICATIONS

The following applications have been filed by the Applicant simultaneously with the parent application Ser. No. 11/084,742:
Ser. Nos. 11/084,796 11/084,806
The disclosures of these co-pending applications are incorporated herein by reference.

CROSS-REFERENCES

Various methods, systems and apparatus relating to the present invention are disclosed in the following patents and co-pending applications filed by the applicant or assignee of the present invention. The disclosures of all of these patents and co-pending applications are incorporated herein by cross-reference

| | | | | | |
|---|---|---|---|---|---|
| 6750901 | 6476863 | 6788336 | 11/003786 | 7258417 | 7293853 |
| 7328968 | 7270395 | 11/003404 | 11/003419 | 7334864 | 7255419 |
| 7284819 | 7229148 | 7258416 | 7273263 | 7270393 | 6984017 |
| 11/003699 | 11/071473 | 11/003463 | 11/003701 | 11/003683 | 11/003614 |
| 7284820 | 7341328 | 7246875 | 7322669 | 10/815621 | 7243835 |
| 10/815630 | 10/815637 | 10/815638 | 7251050 | 10/815642 | 7097094 |
| 7137549 | 10/815618 | 7156292 | 10/815635 | 10/815647 | 10/815634 |
| 7137566 | 7131596 | 7128265 | 7197374 | 7175089 | 10/815617 |
| 10/815620 | 7178719 | 10/815613 | 7207483 | 7296737 | 7270266 |
| 10/815614 | 10/815636 | 7128270 | 11/041650 | 11/041651 | 11/041652 |
| 11/041649 | 11/041610 | 11/041609 | 11/041626 | 11/041627 | 11/041624 |
| 11/041625 | 11/041556 | 11/041580 | 11/041723 | 11/041698 | 11/041648 |
| 10/815609 | 7150398 | 7159777 | 10/815610 | 7188769 | 7097106 |
| 7070110 | 7243849 | 6623101 | 6406129 | 6505916 | 6457809 |
| 6550895 | 6457812 | 7152962 | 6428133 | 7204941 | 7282164 |
| 10/815628 | 7278727 | 10/913373 | 10/913374 | 10/913372 | 7138391 |
| 7153956 | 10/913380 | 10/913379 | 10/913376 | 7122076 | 7148345 |
| 10/407212 | 7156508 | 7159972 | 7083271 | 7165834 | 7080894 |
| 7201469 | 7090336 | 7156489 | 10/760233 | 10/760246 | 7083257 |
| 7258422 | 7255423 | 7219980 | 10/760253 | 10/760255 | 10/760209 |
| 7118192 | 10/760194 | 7322672 | 7077505 | 7198354 | 7077504 |
| 10/760189 | 7198355 | 10/760232 | 7322676 | 7152959 | 7213906 |
| 7178901 | 7222938 | 7108353 | 7104629 | 7246886 | 7128400 |
| 7108355 | 6991322 | 7287836 | 7118197 | 10/728784 | 10/728783 |
| 7077493 | 6962402 | 10/728803 | 7147308 | 10/728779 | 7118198 |
| 7168790 | 7172270 | 7229155 | 6830318 | 7195342 | 7175261 |
| 10/773183 | 7108356 | 7118202 | 10/773186 | 7134744 | 10/773185 |
| 7134743 | 7182439 | 7210768 | 10/773187 | 7134745 | 7156484 |
| 7118201 | 7111926 | 10/773184 | 7018021 | 11/060751 | 11/060805 |
| 7156289 | 7178718 | 7225979 | 09/575197 | 7079712 | 6825945 |
| 7330974 | 6813039 | 7190474 | 6987506 | 6824044 | 7038797 |
| 6980318 | 6816274 | 7102772 | 09/575186 | 6681045 | 6678499 |
| 6679420 | 6963845 | 6976220 | 6728000 | 7110126 | 7173722 |
| 6976035 | 6813558 | 6766942 | 6965454 | 6995859 | 7088459 |
| 6720985 | 7286113 | 6922779 | 6978019 | 6847883 | 7131058 |
| 7295839 | 09/607843 | 09/693690 | 6959298 | 6973450 | 7150404 |
| 6965882 | 7233924 | 09/575181 | 09/722174 | 7175079 | 7162259 |
| 6718061 | 10/291523 | 10/291471 | 7012710 | 6825956 | 10/291481 |

-continued

| | | | | | |
|---|---|---|---|---|---|
| 7222098 | 10/291825 | 7263508 | 7031010 | 6972864 | 6862105 |
| 7009738 | 6989911 | 6982807 | 10/291576 | 6829387 | 6714678 |
| 6644545 | 6609653 | 6651879 | 10/291555 | 7293240 | 10/291592 |
| 10/291542 | 7044363 | 7004390 | 6867880 | 7034953 | 6987581 |
| 7216224 | 10/291821 | 7162269 | 7162222 | 7290210 | 7293233 |
| 7293234 | 6850931 | 6865570 | 6847961 | 10/685523 | 10/685583 |
| 7162442 | 10/685584 | 7159784 | 10/804034 | 10/793933 | 6889896 |
| 10/831232 | 7174056 | 6996274 | 7162088 | 10/943874 | 10/943872 |
| 10/944044 | 7259884 | 10/944043 | 7167270 | 10/943877 | 6986459 |
| 10/954170 | 7181448 | 10/981626 | 10/981616 | 7324989 | 7231293 |
| 7174329 | 10/992713 | 7295922 | 7200591 | 11/020106 | 11/020260 |
| 11/020321 | 11/020319 | 11/026045 | 11/059696 | 11/051032 | 11/059674 |
| 7068382 | 7007851 | 6957921 | 6457883 | 10/743671 | 7044381 |
| 7094910 | 7091344 | 7122685 | 7038066 | 7099019 | 7062651 |
| 6789194 | 6789191 | 10/900129 | 7278018 | 10/913350 | 10/982975 |
| 10/983029 | 6644642 | 6502614 | 6622999 | 6669385 | 6827116 |
| 7011128 | 10/949307 | 6549935 | 6987573 | 6727996 | 6591884 |
| 6439706 | 6760119 | 7295332 | 7064851 | 6826547 | 6290349 |
| 6428155 | 6785016 | 6831682 | 6741871 | 6927871 | 6980306 |
| 6965439 | 6840606 | 7036918 | 6977746 | 6970264 | 7068389 |
| 7093991 | 7190491 | 10/901154 | 10/932044 | 10/962412 | 7177054 |
| 10/962552 | 10/965733 | 10/965933 | 10/974742 | 10/982974 | 7180609 |
| 10/986375 | 6982798 | 6870966 | 6822639 | 6474888 | 6627870 |
| 6724374 | 6788982 | 7263270 | 6788293 | 6946672 | 6737591 |
| 7091960 | 09/693514 | 6792165 | 7105753 | 6795593 | 6980704 |
| 6768821 | 7132612 | 7041916 | 6797895 | 7015901 | 7289882 |
| 7148644 | 10/778056 | 10/778058 | 10/778060 | 10/778059 | 10/778063 |
| 10/778062 | 10/778061 | 10/778057 | 7096199 | 7286887 | 10/917467 |
| 10/917466 | 7324859 | 7218978 | 7245294 | 7277085 | 7187370 |
| 10/917436 | 10/943856 | 10/919379 | 7019319 | 10/943878 | 10/943849 |
| 7043096 | 7148499 | 7055739 | 7233320 | 6830196 | 6832717 |
| 7182247 | 7120853 | 7082562 | 6843420 | 10/291718 | 6789731 |
| 7057608 | 6766944 | 6766945 | 7289103 | 10/291559 | 7299969 |
| 10/409864 | 7108192 | 7111791 | 7077333 | 6983878 | 10/786631 |
| 7134598 | 10/893372 | 6929186 | 6994264 | 7017826 | 7014123 |
| 7134601 | 7150396 | 10/971146 | 7017823 | 7025276 | 7284701 |
| 7080780 | 11/074802 | 10/492152 | 10/492161 | 7308148 | 10/502575 |
| 10/683151 | 10/683040 | 10/510391 | 10/510392 | 10/778090 | 6957768 |
| 09/575172 | 7170499 | 7106888 | 7123239 | 6982701 | 6982703 |
| 7227527 | 6786397 | 6947027 | 6975299 | 7139431 | 7048178 |
| 7118025 | 6839053 | 7015900 | 7010147 | 7133557 | 6914593 |
| 10/291546 | 6938826 | 7278566 | 7123245 | 6992662 | 7190346 |
| 10/774782 | 11/074777 | 11/075917 | 6593166 | 7132679 |
| 6940088 | 10/727181 | 10/727162 | 10/727163 | 10/727245 | 7121639 |
| 7165824 | 7152942 | 10/727157 | 7181572 | 7096137 | 7302592 |
| 7278034 | 7188282 | 10/727159 | 10/727180 | 10/727179 | 10/727192 |
| 10/727274 | 10/727164 | 10/727161 | 10/727198 | 10/727158 | 10/754536 |
| 10/754938 | 10/727160 | 10/934720 | 10/296522 | 6795215 | 7070098 |
| 7154638 | 6805419 | 6859289 | 6977751 | 6398332 | 6394573 |
| 6622923 | 6747760 | 6921144 | 10/884881 | 7092112 | 7192106 |
| 11/039866 | 10/854521 | 10/854522 | 10/854488 | 7281330 | 10/854503 |
| 7328956 | 10/854509 | 7188928 | 7093989 | 10/854497 | 10/854495 |
| 10/854498 | 10/854511 | 10/854512 | 10/854525 | 10/854526 | 10/854516 |
| 7252353 | 10/854515 | 7267417 | 10/854505 | 10/854493 | 7275805 |
| 7314261 | 10/854490 | 7281777 | 7290852 | 10/854528 | 10/854523 |
| 10/854527 | 10/854524 | 10/854520 | 10/854514 | 10/854519 | 10/854513 |
| 10/854499 | 10/854501 | 7266661 | 7243193 | 10/854518 | 10/854517 |
| 10/934628 | 10/760254 | 10/760210 | 10/760202 | 7201468 | 10/760198 |
| 10/760249 | 7234802 | 7303255 | 7287846 | 7156511 | 10/760264 |
| 7258432 | 7097291 | 10/760222 | 10/760248 | 7083273 | 10/760192 |
| 10/760203 | 10/760204 | 10/760205 | 10/760206 | 10/760267 | 10/760270 |
| 7198352 | 10/760271 | 7303251 | 7201470 | 7121655 | 7293861 |
| 7232208 | 7328985 | 10/760261 | 7083272 | 11/014764 | 11/014763 |
| 7331663 | 11/014747 | 7328973 | 11/014760 | 11/014757 | 7303252 |
| 7249822 | 11/014762 | 7311382 | 11/014723 | 11/014756 | 11/014736 |
| 11/014759 | 11/014758 | 11/014725 | 7331660 | 11/014738 | 11/014737 |
| 7322684 | 7322685 | 7311381 | 7270405 | 7303268 | 11/014735 |
| 11/014734 | 11/014719 | 11/014750 | 11/014749 | 7249833 | 11/014769 |
| 11/014729 | 7331661 | 11/014733 | 7300140 | 11/014755 | 11/014765 |
| 11/014766 | 11/014740 | 7284816 | 7284845 | 7255430 | 11/014744 |
| 7328984 | 11/014768 | 7322671 | 11/014718 | 11/014717 | 11/014716 |
| 11/014732 | 11/014742 | 6454482 | 6808330 | 6527365 | 6474773 |
| 6550997 | 7093923 | 6957923 | 7131724 | 10/949288 | 7168867 |
| 7125098 | | | | | |

DESCRIPTION OF RELATED ART

DotCards encode data as a series of marks on a card and are described in detail in a series of granted patents and pending patent applications, including U.S. patent application Ser. No. 09/112,781 entitled "Data distribution mechanism in the form of ink dots on cards".

SUMMARY OF THE INVENTION

In a first broad form the present invention provides a surface having disposed therein or thereon coded data, the coded data including: at least one data portion arranged at a respective position on or in the surface; and, alignment data arranged on or in the surface, the alignment data being at least partially indicative of at least two registration positions, the registration positions being at least partially indicative of a relative position of the at least one data portion with respect to the surface, thereby allowing the at least one data portion to be at least partially decoded.

Optionally the alignment data includes: a first registration structure indicative of a plurality of reference points indicative of a position of the coded data in the alignment direction; and, a second registration structure indicative of a plurality of reference points indicative of a position of the coded data in a direction perpendicular to the alignment direction.

Optionally the first registration structure includes: a number of markers indicative of a gross position of the coded data in the alignment direction; and, a clock track indicative of a fine position of the coded data in the alignment direction.

Optionally the second registration structure includes: at least two clock tracks indicative of a position of the coded data in the direction perpendicular to the alignment direction; and, two alignment lines for each clock track, the two alignment lines being indicative of the position of the respective clock track in the alignment direction.

Optionally the format includes at least one data block, the data block including: an arrangement of marks defining a plurality of possible values; and, alignment data indicative of the position of the marks.

Optionally each data block is at least one of: provided with its own pilot track; provided with its own registration feature; provided with its own clocking feature; provided with two clocking features on opposite sides of a data-encoding area; encoding a fragment of a bitstream; encoding a fragment of a bitstream in a data-encoding area; and, formed from a rectangular data-encoding area.

Optionally data is encoded using parameter data, each data block encoding at least some of the parameter data, and the parameter data being at least one of: indicative of a size of the encoded data; indicative of an interleave factor; encoded fault-tolerantly using at least one of: a checksum associated with parameters; a CRC checksum associated with parameters; redundancy data associated with parameters; Reed-Solomon redundancy data associated with parameters; and, replication of parameters and a checksum.

Optionally the data is encoded using multiple interleaved codewords to fault-tolerantly encode data.

Optionally the alignment data includes a pilot feature, the pilot feature being at least one of: encoded fault-tolerantly; formed from a set of parallel lines; formed from a set of parallel lines that encode a binary pilot sequence; a pilot sequence which encodes at least one of: 110101100100011; and, 110010001111010;

In a second broad form the present invention provides a surface having disposed therein or thereon coded data, the coded data including: at least one data portion arranged at a respective position on or in the surface, each data portion extending in an alignment direction; and, alignment data arranged on or in the surface; wherein, in use, a sensing device, which senses data provided in a sensing region extending in a scanline direction, operates to: sense: the alignment data in at least two positions; and, at least part of at least one of the number of data portions; determine, using the at least two registration positions, an alignment angle between the scanline direction and the alignment direction; determine, using at least one registration position and the alignment angle, the relative position of the at least one sensed data portion part with respect to the sensing region; and, at least partially decode, using the relative position and the alignment angle, the at least one data portion part.

In a third broad form the present invention provides a system for decoding coded data provided on or in a surface, the coded data including: at least one data portion arranged on or in the surface; and, alignment data at least partially indicative of at least one clock indicator; the system including: a sensor which senses data provided in a sensing region, the sensor sensing: at least part of the alignment data; and, at least part of the at least one data portion; a decoder for: determining, using the sensed alignment data part, the clock indicator; updating, using the clock indicator, a PLL; determining, using the PLL, a relative position between the sensing region and the at least one sensed data portion part; and, at least partially decoding, using the relative position, the at least one data portion part.

Optionally the decoder is for: determining the position of at least one marker to determine a gross registration; determining, using the gross registration, a clock indicator in a clock track; updating, using the clock indicator, an alignment PLL; determining, using the alignment PLL, a fine registration of the coded data in the alignment direction.

Optionally the coded data includes a registration structure, the registration structure including at least two clock tracks indicative of a position of the coded data in the direction perpendicular to the alignment direction and two alignment lines for each clock track, the two alignment lines being indicative of the position of the respective clock track, and wherein the decoder is for: determining, using an alignment PLL, a position of the alignment lines for a respective clock track; determining, using the position of the alignment lines, the position of each respective clock track; and, updating the alignment PLL.

Optionally the decoder is for: for each clock track, determining, using a respective data clock PLL, a position of a clock indicator on the clock track; determining, using the position of the clock indicator on each clock track, an alignment angle; and, updating each data clock PLL.

Optionally the decoder is for decoding the coded data by: determining a transform for a scan line using the alignment data, the transform being indicative of coordinates of bit encoding locations within the data portions; and, detecting bit values using the transform.

Optionally the decoder is for: determining coordinates of sample values from the coordinates of the bit-encoding location; and, determining a bit-encoding value by interpolating sample values from two successive scan lines.

Optionally the decoder is for: assigning a temporary value to a decoded bitstream bit which has more than two possible values; resolving a binary value for the bit based on the values of surrounding bits in the data-encoding area; and, writing resolved encoded bitstream bit values to a storage device in bitstream order.

Optionally the decoder is for: detecting a pilot feature in the alignment data, the pilot feature being detected at least two locations; determining, using the pilot feature: an alignment angle between a scanline direction and an alignment direction; and, an initial registration in a direction perpendicular to the alignment direction; detecting a registration marker in a registration feature in the alignment data; determining, using the registration marker, a gross registration in the alignment direction; detecting, using the gross registration, a registration clock indicator in the alignment data; determining, using the registration clock indicator, a fine registration in the alignment direction; detecting, using the fine registration and the alignment angle and the initial registration, at least one alignment line; updating, using the at least one detected alignment line, the fine registration; determining, using the updated fine registration, the position of two data clock tracks in the alignment data; detecting, using the position of the data clock tracks, a data clock indicator on each data clock track; determining, using each data clock indicator, an updated alignment angle and an updated registration in a direction perpendicular to the alignment direction; detecting at least part of the at least one data portion; and, decoding, using the updated alignment angle and the fine registration and the updated registration, at least some of the at least one detected data portion part.

Optionally the decoder is for, repeatedly: detecting the at least one alignment line; updating the fine registration; determining using the updated fine registration and the updated registration, the position of the data clock tracks; detecting a data clock indicator on each data clock track; updating the updated alignment angle and the updated registration; and, detecting at least part of the at least one data portion, to thereby allow the at least one data portion to be decoded.

Optionally the decoder is for: detecting, at two locations in the pilot feature, a clock indicator; synchronising a respective pilot PLL with each clock indicator to thereby track the pilot feature; determining, using the pilot PLLs: the alignment angle; and, the initial registration; initialising, using the initial registration and the alignment angle, two data clock PLLs; detecting the registration marker in the alignment data; determining, using the registration marker, the gross registration; synchronising, using the gross registration, a registration PLL with the registration clock indicator in the alignment data to thereby track the registration feature; determining, using the registration PLL, the fine registration; initialising, using the fine registration, two alignment PLLs; synchronising the alignment PLLs with alignment markers to thereby track the data clock tracks; determining, using the alignment PLLs, the position of two data clock tracks in the alignment data; detecting, using the position of the data clock tracks, a data clock indicator on each data clock track; synchronising each data clock PLL with a corresponding data clock indicator to thereby track the registration of the data in the direction perpendicular to the alignment direction; and, determining, using the data clock PLLs, at least one of: the updated alignment angle; and, the position of coded data on the surface.

In another broad form the present invention provides a method for decoding coded data provided on or in a surface, the coded data including: at least one data portion arranged on or in the surface; and, alignment data at least partially indicative of at least one clock indicator; the method including, in a decoder: sensing, using a sensor which senses data provided in a sensing region: at least part of the alignment data; and, at least part of the at least one data portion; determining, using the sensed alignment data part, the clock indicator; updating, using the clock indicator, a PLL; determining, using the PLL, a relative position between the sensing region and the at least one sensed data portion part; and, at least partially decoding, using the relative position, the at least one data portion part.

Optionally the method includes: determining the position of at least one marker to determine a gross registration; determining, using the gross registration, a clock indicator in a clock track; updating, using the clock indicator, an alignment PLL; determining, using the alignment PLL, a fine registration of the coded data in the alignment direction.

Optionally the coded data includes a registration structure, the registration structure including at least two clock tracks indicative of a position of the coded data in the direction perpendicular to the alignment direction and two alignment lines for each clock track, the two alignment lines being indicative of the position of the respective clock track, and wherein the method includes: determining, using an alignment PLL, a position of the alignment lines for a respective clock track; determining, using the position of the alignment lines, the position of each respective track; and, updating the alignment PLL.

Optionally the method includes: for each clock track, determining, using a respective data clock PLL, a position of a clock indicator on the clock track; determining, using the position of the clock indicator on each clock track, an alignment angle; and, updating each data clock PLL.

Optionally the method includes decoding the coded data by: determining a transform for a scan line using the alignment data, the transform being indicative of coordinates of bit encoding locations within the data portions; and, detecting bit values using the transform.

Optionally the method includes: determining coordinates of sample values from the coordinates of the bit-encoding location; and, determining a bit-encoding value by interpolating sample values from two successive sample lines.

Optionally the method includes: assigning a temporary value to a decoded bitstream bit which has more than two possible values; resolving a binary value for the bit based on the values of surrounding bits in the data-encoding area; and, writing resolved encoded bitstream bit values to a storage device in bitstream order.

Optionally the method includes: detecting a pilot feature in the alignment data, the pilot feature being detected at least two locations; determining, using the pilot feature: an alignment angle between a scanline direction and an alignment direction; and, an initial registration in a direction perpendicular to the alignment direction; detecting a registration marker in a registration feature in the alignment data; determining, using the registration marker, a gross registration in the alignment direction; detecting, using the gross registration, a registration clock indicator in the alignment data; determining, using the registration clock indicator, a fine registration in the alignment direction; detecting, using the fine registration and the alignment angle and the initial registration, at least one alignment line; updating, using the at least one detected alignment line, the fine registration; determining, using the updated fine registration, the position of two data clock tracks in the alignment data; detecting, using the position of the data clock tracks, a data clock indicator on each data clock track; determining, using each data clock indicator, an updated alignment angle and an updated registration in a direction perpendicular to the alignment direction; detecting at least part of the at least one data portion; and, decoding, using the updated alignment angle and the fine registration and the updated registration, at least some of the at least one detected data portion part.

Optionally the method includes, repeatedly: detecting the at least one alignment line; updating the fine registration; determining using the updated fine registration and the updated registration, the position of the data clock tracks; detecting a data clock indicator on each data clock track;

updating the updated alignment angle and the updated registration; and, detecting at least part of the at least one data portion, to thereby allow the at least one data portion to be decoded.

Optionally the method includes: detecting, at two locations in the pilot feature, a clock indicator; synchronising a respective pilot PLL with each clock indicator to thereby track the pilot feature; determining, using the pilot PLLs: the alignment angle; and, the initial registration; initialising, using the initial registration and the alignment angle, two data clock PLLs; detecting, the registration marker in the alignment data; determining, using the registration marker, the gross registration; synchronising, using the gross registration, a registration PLL with the registration clock indicator in the alignment data to thereby track the registration feature; determining, using the registration PLL, the fine registration; initialising, using the fine registration, two alignment PLLs; synchronising the alignment PLLs with alignment markers to thereby track the data clock tracks; determining, using the alignment PLLs, the position of two data clock tracks in the alignment data; detecting, using the position of the data clock tracks, a data clock indicator on each data clock track; synchronising each data clock PLL with a corresponding data clock indicator to thereby track the registration of the data in the direction perpendicular to the alignment direction; and, determining, using the data clock PLLs, at least one of: the updated alignment angle; and, the position of coded data on the surface.

In another broad form the present invention provides a surface having disposed therein or thereon coded data, wherein the coded data is encoded by: segmenting the data into a plurality of data portions each data portion being decodable independently from other data portions; causing the data portions to be disposed on or in the surface such that each data portion extends in an alignment direction, and such that at least one first data portion is displaced from at least one second data portion in at least one of: the alignment direction; and, a direction perpendicular to the alignment direction; generating alignment data indicative of an arrangement of at least some of the data portions; and, causing the alignment data to be disposed on or in the surface, such that when the surface is provided in a sensing region of a sensing device, the sensing region defining a scanline, the sensing device: senses at least part of the alignment data; determines, using the sensed alignment data, an angle between the scanline and the alignment direction; senses at least part of the at least one first data portion; and, at least partially decodes, using the determined angle, the at least one sensed first data portion part before the at least one second data portion is sensed.

In another broad form the present invention provides a surface having disposed therein or thereon coded data, wherein the coded data is decoded by: sensing, using a sensor which senses data provided in a sensing region defining a scanline: a first part of the at least one data portion; and, a second part of the at least one data portion, the second part being displaced relative to the first part in a direction orthogonal to the scanline; and, storing, in a memory: first indicating data indicative of the first part; second indicating data indicative of the second part; and, at least partially decoding, using a processor and using the first and second indicating data from memory, at least some of the at least one data portion.

In another broad form the present invention provides a surface having disposed therein or thereon coded data, wherein the coded data is at least one of printed and sensed using a monolithic integrated circuit including: an elongate printhead having at least one row of nozzles for printing on a surface; and, an elongate image sensor having at least one row of pixel sensors for sensing markings on a surface.

In another broad form the present invention provides a surface having disposed therein or thereon coded data, wherein the coded data is at least one of printed and sensed using a monolithic integrated circuit including: a printhead for printing coded data on a surface; and, a sensing device used for sensing coded data on the surface; wherein, in use, the integrated circuit is provided adjacent a transport module to allow the surface to be moved past the printhead and sensing device for printing or sensing coded data respectively.

In another broad form the present invention provides a surface having disposed therein or thereon coded data, wherein the coded data is decoded by a system which includes: a store for storing the coded data, a decoder for: determining a codeword format for the coded data; reading from the store, using the determined format, coded data, the coded data being read so as to de-interleave the encoded bit stream and the redundancy data into each of a number of codewords, each codeword including a bit stream part and corresponding redundancy data; correcting, using the bit stream part and the corresponding redundancy data, errors in the encoded bit stream; and, writing the corrected data to the store.

In another broad form the present invention provides a surface having disposed therein or thereon coded data, wherein the coded data is stored in a store, wherein the coded data includes: an encoded bit stream; and, redundancy data associated with the bit stream; and wherein the coded data is decoded by: determining a codeword format for the coded data; reading from the store, using the determined format, coded data, the coded data being read so as to de-interleave the encoded bit stream and the redundancy data into each of a number of codewords, each codeword including a bit stream part and corresponding redundancy data; correcting, using the bit stream part and the corresponding redundancy data, errors in the encoded bit stream; and, writing the corrected data to the store.

In another broad form the present invention provides a surface having disposed therein or thereon coded data, wherein the coded data is a bit stream encoded by a format including: at least one data portion, the at least one data portion encoding a data sequence including the bit stream followed by corresponding redundancy data, the data sequence forming interleaved codewords, each codeword encoding at least part of the bit stream and redundancy data associated with the respective bit stream part.

In a fourth broad form the present invention provides a data storage format for encoding a bit stream on or in a surface, the format including: at least one data portion, the at least one data portion encoding a data sequence including the bit stream followed by corresponding redundancy data, the data sequence forming interleaved codewords, each codeword encoding at least part of the bit stream and redundancy data associated with the respective bit stream part.

Optionally the format includes alignment data arranged on or in the surface, the alignment data being at least partially indicative of the position of the data portions on the surface.

Optionally the alignment data includes: a first registration structure indicative of a plurality of reference points indicative of a position of the coded data in the alignment direction; and, a second registration structure indicative of a plurality of reference points indicative of a position of the coded data in a direction perpendicular to the alignment direction.

Optionally the first registration structure includes: a number of markers indicative of a gross position of the coded data in the alignment direction; and, a clock track indicative of a fine position of the coded data in the alignment direction.

Optionally the second registration structure includes: at least two clock tracks indicative of a position of the coded data in the direction perpendicular to the alignment direction; and, two alignment lines for each clock track, the two alignment lines being indicative of the position of the respective clock track in the alignment direction. Optionally the format includes at least one data block, the data block including: an arrangement of marks defining a plurality of possible values; and, alignment data indicative of the position of the marks.

Optionally each data block, is at least one of: provided with its own pilot track; provided with its own registration feature; provided with its own clocking feature; provided with two clocking features on opposite sides of a data-encoding area; encoding a fragment of a bitstream; encoding a fragment of a bitstream in a data-encoding area; and, formed from a rectangular data-encoding area.

Optionally the data is encoded using multiple interleaved codewords to fault-tolerantly encode data.

Optionally the format includes parameter data at least partially indicative of at least one parameter used to encode the bit stream.

Optionally at least part of the bit stream is encoded as at least one data block, the data block encoding at least some parameter data and at least some encoded data.

Optionally data block includes a data grid defining an arrangement of marks defining a plurality of possible values, and wherein at least a first and a last column of the data grid are used to encode the parameter data.

Optionally the parameter data is at least one of: indicative of a size of the encoded data; indicative of an interleave factor; encoded fault-tolerantly using at least one of: a checksum associated with parameters; a CRC checksum associated with parameters; redundancy data associated with parameters; Reed-Solomon redundancy data associated with parameters; and, replication of parameters and a checksum.

Optionally the alignment data includes a pilot feature, the pilot feature being at least one of: encoded fault-tolerantly; formed from a set of parallel lines; formed from a set of parallel lines that encode a binary pilot sequence; a pilot sequence which encodes at least one of: 110101100100011; and, 110010001111010;

In a fifth broad form the present invention provides a system for decoding coded data, the coded data including: an encoded bit stream; and, redundancy data associated with the bit stream; and wherein the system includes: a store for storing the coded data, a decoder for: determining a codeword format for the coded data; reading from the store, using the determined format, coded data, the coded data being read so as to de-interleave the encoded bit stream and the redundancy data into each of a number of codewords, each codeword including a bit stream part and corresponding redundancy data; correcting, using the bit stream part and the corresponding redundancy data, errors in the encoded bit stream; and, writing the corrected data to the store.

Optionally the decoder is for decoding the coded data by: determining a transform for each scan line using the alignment data, the transform being indicative of coordinates of bit encoding locations within the data portions; and, detecting bit values using the transform.

Optionally the decoder is for: determining coordinates of sample values from the coordinates of the bit-encoding location; and, determining a bit-encoding value by interpolating sample values from two successive sample lines.

Optionally the decoder is for: assigning a temporary value to a decoded bitstream bit which has more than two possible values; resolving a binary value for the bit based on the values of surrounding bits in the data-encoding area; and, writing resolved encoded bitstream bit values to a storage device in bitstream order.

Optionally the decoder is for: determining the position of at least one marker to determine a gross registration; determining, using the gross registration, a clock indicator in a clock track; updating, using the clock indicator, an alignment PLL; determining, using the alignment PLL, a fine registration of the coded data in the alignment direction.

Optionally the coded data includes a registration structure, the registration structure including at least two clock tracks indicative of a position of the coded data in the direction perpendicular to the alignment direction and two alignment lines for each clock track, the two alignment lines being indicative of the position of the respective clock track, and wherein the decoder is for: determining, using an alignment PLL, a position of the alignment lines for a respective clock track; determining, using the position of the alignment lines, the position of each respective track; and, updating the alignment PLL.

Optionally the decoder is for: for each clock track, determining, using a respective data clock PLL, a position of a clock indicator on the clock track; determining, using the position of the clock indicator on each clock track, an alignment angle; and, updating each data clock PLL.

In another broad form the present invention provides a method of decoding coded data stored in a store, wherein the coded data includes: an encoded bit stream; and, redundancy data associated with the bit stream; and wherein the method includes: determining a codeword format for the coded data; reading from the store, using the determined format, coded data, the coded data being read so as to de-interleave the encoded bit stream and the redundancy data into each of a number of codewords, each codeword including a bit stream part and corresponding redundancy data; correcting, using the bit stream part and the corresponding redundancy data, errors in the encoded bit stream; and, writing the corrected data to the store.

Optionally the method includes decoding the coded data by: determining a transform for each scan line using the alignment data, the transform being indicative of coordinates of bit encoding locations within the data portions; and, detecting bit values using the transform.

Optionally the method includes: determining coordinates of sample values from the coordinates of the bit-encoding location; and, determining a bit-encoding value by interpolating sample values from two successive sample lines.

Optionally the method includes: assigning a temporary value to a decoded bitstream bit which has more than two possible values; resolving a binary value for the bit based on the values of surrounding bits in the data-encoding area; and, writing resolved encoded bitstream bit values to a storage device in bitstream order.

Optionally the method includes: determining the position of at least one marker to determine a gross registration; determining, using the gross registration, a clock indicator in a clock track; updating, using the clock indicator, an alignment PLL; determining, using the alignment PLL, a fine registration of the coded data in the alignment direction.

Optionally wherein the coded data includes a registration structure, the registration structure including at least two clock tracks indicative of a position of the coded data in the direction perpendicular to the alignment direction and two alignment lines for each clock track, the two alignment lines being indicative of the position of the respective clock track, and wherein the method includes: determining, using an alignment PLL, a position of the alignment lines for a respective clock track; determining, using the position of the alignment lines, the position of each respective track; and, updating the alignment PLL.

Optionally the method includes: for each clock track, determining, using a respective data clock PLL, a position of a clock indicator on the clock track; determining, using the position of the clock indicator on each clock track, an alignment angle; and, updating each data clock PLL.

In another broad form the present invention provides a data storage format for encoding a bit stream on or in a surface, wherein the coded data is encoded by: segmenting the data into a plurality of data portions each data portion being decodable independently from other data portions; causing the data portions to be disposed on or in the surface such that each data portion extends in an alignment direction, and such that at least one first data portion is displaced from at least one second data portion in at least one of: the alignment direction; and, a direction perpendicular to the alignment direction; generating alignment data indicative of an arrangement of at least some of the data portions; and, causing the alignment data to be disposed on or in the surface, such that when the surface is provided in a sensing region of a sensing device, the sensing region defining a scanline, the sensing device: senses at least part of the alignment data; determines, using the sensed alignment data, an angle between the scanline and the alignment direction; senses at least part of the at least one first data portion; and, at least partially decodes, using the determined angle, the at least one sensed first data portion part before the at least one second data portion is sensed.

In another broad form the present invention provides a data storage format for encoding a bit stream on or in a surface, wherein the coded data is decoded in a decoder by: sensing, using a sensor which senses data provided in a sensing region defining a scanline: a first part of the at least one data portion; and, a second part of the at least one data portion, the second part being displaced relative to the first part in a direction orthogonal to the scanline; and, storing, in a memory: first indicating data indicative of the first part; second indicating data indicative of the second part; and, at least partially decoding, using a processor and using the first and second indicating data from memory, at least some of the at least one data portion.

In another broad form the present invention provides a data storage format for encoding a bit stream on or in a surface, wherein the coded data includes: at least one data portion arranged on or in the surface; and, alignment data at least partially indicative of at least one clock indicator; and wherein the coded data is decoded by: sensing, using a sensor which senses data provided in a sensing region: at least part of the alignment data; and, at least part of the at least one data portion; determining, using the sensed alignment data part, the clock indicator; updating, using the clock indicator, a PLL; determining, using the PLL, a relative position between the sensing region and the at least one sensed data portion part; and, at least partially decoding, using the relative position, the at least one data portion part.

In another broad form the present invention provides a data storage format for encoding a bit stream on or in a surface, wherein the coded data includes: at least one data portion arranged on or in the surface; and, alignment data at least partially indicative of at least one clock indicator; wherein the coded is decoded by a system including: a sensor which senses data provided in a sensing region, the sensor sensing: at least part of the alignment data; and, at least part of the at least one data portion; a decoder for: determining, using the sensed alignment data part, the clock indicator; updating, using the clock indicator, a PLL; determining, using the PLL, a relative position between the sensing region and the at least one sensed data portion part; and, at least partially decoding, using the relative position, the at least one data portion part.

In another broad form the present invention provides a data storage format for encoding a bit stream on or in a surface, wherein the coded data is disposed on or in a surface, the surface including: at least one data portion arranged at a respective position on or in the surface; and, alignment data arranged on or in the surface, the alignment data being at least partially indicative of at least two registration positions, the registration positions being at least partially indicative of a relative position of the at least one data portion with respect to the surface, thereby allowing the at least one data portion to be at least partially decoded.

In another broad form the present invention provides a data storage format for encoding a bit stream on or in a surface, wherein the coded data is disposed on or in a surface, the surface including: at least one data portion arranged at a respective position on or in the surface, each data portion extending in an alignment direction; and, alignment data arranged on or in the surface; wherein, in use, a sensing device, which senses data provided in a sensing region extending in a scanline direction, operates to: sense: the alignment data in at least two positions; and, at least part of at least one of the number of data portions; determine, using the at least two registration positions, an alignment angle between the scanline direction and the alignment direction; determine, using at least one registration position and the alignment angle, the relative position of the at least one sensed data portion part with respect to the sensing region; and, at least partially decode, using the relative position and the alignment angle, the at least one data portion part.

In another broad form the present invention provides a data storage format for encoding a bit stream on or in a surface, wherein the coded data is at least one of printed and sensed using a monolithic integrated circuit including: an elongate printhead having at least one row of nozzles for printing on a surface; and, an elongate image sensor having at least one row of pixel sensors for sensing markings on a surface.

In another broad form the present invention provides a data storage format for encoding a bit stream on or in a surface, wherein the coded data is at least one of printed and sensed using a monolithic integrated circuit including: a printhead for printing coded data on a surface; and, a sensing device used for sensing coded data on the surface; wherein, in use, the integrated circuit is provided adjacent a transport module to allow the surface to be moved past the printhead and sensing device for printing or sensing coded data respectively.

In another broad form the present invention provides a data storage format for encoding a bit stream on or in a surface, wherein the coded data is decoded using a sensing device for sensing coded data provided in a sensing region extending in a scanline direction, the coded data including at least one data portion and alignment data defining a position of the at least one data portion, wherein the format is decoded by: detecting a pilot feature in the alignment data, the pilot feature being detected at least two locations; determining, using the pilot feature: an alignment angle between a scanline direction and an alignment direction; and, an initial registration in a direction perpendicular to the alignment direction; detecting a registration marker in a registration feature in the alignment data; determining, using the registration marker, a gross registration in the alignment direction; detecting, using the gross registration, a registration clock indicator in the alignment data; determining, using the registration clock indicator, a fine registration in the alignment direction; determining, using the alignment angle and the fine registration and the initial registration, the position of two data clock tracks in the alignment data; detecting, using the position of the data clock tracks, a data clock indicator on each data clock track; determining, using each data clock indicator, an updated alignment angle and an updated registration in a direction perpendicular to the alignment direction; detecting at least part of the at least one data portion; and, decoding, using the updated alignment angle and the fine registration and the updated registration, at least some of the at least one detected data portion part.

In a sixth broad form the present invention provides a monolithic integrated circuit including: an elongate printhead having at least one row of nozzles for printing on a surface; and, an elongate image sensor having at least one row of pixel sensors for sensing markings on a surface.

Optionally the circuit is used for at least one of: printing coded data using the printhead; and, sensing coded data using the image sensor.

Optionally the coded data includes: at least one data portion, the at least one data portion encoding a data sequence including the bit stream followed by corresponding redundancy data, the data sequence forming interleaved codewords, each codeword encoding at least part of the bit stream and redundancy data associated with the respective bit stream part.

Optionally the coded data includes: at least one data portion arranged at a respective position on or in the surface; and, alignment data arranged on or in the surface, the alignment data being at least partially indicative of at least two registration positions, the registration positions being at least partially indicative of a relative position of the at least one data portion with respect to the surface, thereby allowing the at least one data portion to be at least partially decoded.

Optionally the printhead prints the coded data by: printing the data portions on or in the surface such that each data portion extends in an alignment direction, and such that at least one first data portion is displaced from at least one second data portion in a second direction orthogonal to the alignment direction; and, printing alignment data indicative of the arrangement of at least some of the data portions.

Optionally the pixel sensors sense the coded data by: sensing at least part of the alignment data in at least two locations, the sensed alignment data being used to determine an angle between the image sensor and the alignment direction; and, sensing at least part of the at least one first data portion, the sensed data portion being at least partially decoded, using the determined angle, the at least one sensed first data portion part before the at least one second data portion is sensed.

Optionally wherein the coded data includes at least one of: a first registration structure including a plurality of reference points indicative of a position of the coded data in the alignment direction; and, a second registration structure including a plurality of reference points indicative of a position of the coded data in a direction perpendicular to the alignment direction.

Optionally the coded data includes at least one data block, the data block including: an arrangement of marks defining a plurality of possible values; and, alignment data indicative of the position of the marks.

Optionally each data block includes a data grid defining an arrangement of marks defining a plurality of possible values, and wherein at least a first and a last column of the data grid are used to encode parameter data used in generating the encoded data. Optionally the data is encoded using multiple interleaved codewords to fault-tolerantly encode data.

Optionally the printhead is at least one of: an inkjet printhead; and, a Memjet™ printhead.

Optionally the image sensor is at least one of: an active pixel CMOS image sensor; and, a CCD image sensor.

Optionally the printhead is configured to print at least one of: the format using substantially invisible ink; the format using an infrared-absorptive ink; visible information using visible inks; visible information and the substantially invisible format in substantially the same area of the medium; the visible information and the substantially invisible format at substantially the same time; and, netpage coded data.

In a seventh broad form the present invention provides a device incorporating a monolithic integrated circuit including: an elongate printhead having at least one row of nozzles for printing on a surface; and, an elongate image sensor having at least one row of pixel sensors for sensing markings on a surface.

Optionally the device includes: a transport path; a housing including: a cavity containing the integrated circuit; a slot defining a droplet ejection path to allow droplets to be deposited on a medium provided in the transport path at least one ink supply; an ink supply molding for supplying ink from the at least one ink supply to one or more inlets provided in a surface of the monolithic integrated circuit; at least one radiation source for exposing the medium; and, at least one focussing element for focusing radiation from the medium onto the pixels sensors.

Optionally the device includes a controller including: a dot shift register for storing data indicative of the markings to be printed; a fire shift register for storing data for controlling the firing of the nozzles; and, a nozzle timing and control block for storing data in the fire shift register.

Optionally the device includes a controller including: a pixel control block for causing the pixel sensors to output signals indicative of the sensed markings; a multiplexer for multiplexing the signals to form a multiplexed signal; an amplifier for amplifying the multiplexed signal to form an amplified multiplexed signal; and, an analog-to-digital converter for converting the amplified multiplexed signal into a data indicative of the sensed markings.

Optionally the device includes at least one of: at least one transport motor for transporting the medium past the image sensor; a storage device for storing bitstream data; at least one medium detector for detecting the presence of the medium; and, a host controller for controlling the decoding system.

Optionally the device includes at least one of: a printer; a reader; a decoding system; a camera; and, a mobile phone In an eighth broad form the present invention provides a monolithic integrated circuit including: a printhead for printing coded data on a surface; and, a sensing device used for sensing coded data on the surface; wherein, in use, the integrated circuit is provided adjacent a transport module to allow the surface to be moved past the printhead and sensing device for printing or sensing coded data respectively.

In another broad form the present invention provides a monolithic integrated circuit, wherein the circuit is used in a method of encoding data on or in a surface, the method including: segmenting the data into a plurality of data portions each data portion being decodable independently from other data portions; causing the data portions to be disposed on or in the surface such that each data portion extends in an alignment direction, and such that at least one first data portion is displaced from at least one second data portion in at least one of: the alignment direction; and, a direction perpendicular to the alignment direction; generating alignment data indicative of an arrangement of at least some of the data portions; and, causing the alignment data to be disposed on or in the surface, such that when the surface is provided in a sensing region of a sensing device, the sensing region defining a scanline, the sensing device: senses at least part of the alignment data; determines, using the sensed alignment data, an angle between the scanline and the alignment direction; senses at least part of the at least one first data portion; and, at least partially decodes, using the determined angle, the at least one sensed first data portion part before the at least one second data portion is sensed.

In another broad form the present invention provides a monolithic integrated circuit, wherein the circuit is used in a method of decoding data encoded on or in a surface, the encoded data including at least one data portion arranged on or in the surface, the method including, in a decoder: sensing, using a sensor which senses data provided in a sensing region defining a scanline: a first part of the at least one data portion; and, a second part of the at least one data portion, the second part being displaced relative to the first part in a direction orthogonal to the scanline; and, storing, in a memory: first indicating data indicative of the first part; second indicating data indicative of the second part; and, at least partially decoding, using a processor and using the first and second indicating data from memory, at least some of the at least one data portion.

In another broad form the present invention provides a monolithic integrated circuit, wherein the circuit is used in a method of decoding coded data provided on or in a surface, the coded data including: at least one data portion arranged on or in the surface; and, alignment data at least partially indicative of at least one clock indicator; the method including, in a decoder: sensing, using a sensor which senses data provided in a sensing region: at least part of the alignment data; and, at least part of the at least one data portion; determining, using the sensed alignment data part, the clock indicator; updating, using the clock indicator, a PLL; determining, using the PLL, a relative position between the sensing region and the at least one sensed data portion part; and, at least partially decoding, using the relative position, the at least one data portion part.

In another broad form the present invention provides a monolithic integrated circuit, wherein the circuit is used in a method system for decoding coded data provided on or in a surface, the coded data including: at least one data portion arranged on or in the surface; and, alignment data at least partially indicative of at least one clock indicator; the system including: a sensor which senses data provided in a sensing region, the sensor sensing: at least part of the alignment data; and, at least part of the at least one data portion; a decoder for: determining, using the sensed alignment data part, the clock indicator; updating, using the clock indicator, a PLL; determining, using the PLL, a relative position between the sensing region and the at least one sensed data portion part; and, at least partially decoding, using the relative position, the at least one data portion part.

In another broad form the present invention provides a monolithic integrated circuit, wherein the circuit is used with a surface having disposed therein or thereon coded data, the coded data including: at least one data portion arranged at a respective position on or in the surface; and, alignment data arranged on or in the surface, the alignment data being at least partially indicative of at least two registration positions, the registration positions being at least partially indicative of a relative position of the at least one data portion with respect to the surface, thereby allowing the at least one data portion to be at least partially decoded.

In another broad form the present invention provides a monolithic integrated circuit, wherein the circuit is used with a surface having disposed therein or thereon coded data, the coded data including: at least one data portion arranged at a respective position on or in the surface, each data portion extending in an alignment direction; and, alignment data arranged on or in the surface; wherein, in use, a sensing device, which senses data provided in a sensing region extending in a scanline direction, operates to: sense: the alignment data in at least two positions; and, at least part of at least one of the number of data portions; determine, using the at least two registration positions, an alignment angle between the scanline direction and the alignment direction; determine, using at least one registration position and the alignment angle, the relative position of the at least one sensed data portion part with respect to the sensing region; and, at least partially decode, using the relative position and the alignment angle, the at least one data portion part.

In another broad form the present invention provides a monolithic integrated circuit, wherein the circuit is used in a system for decoding coded data, the coded data including: an encoded bit stream; and, redundancy data associated with the bit stream; the system including: and wherein the system includes: a store for storing the coded data, a decoder for: determining a codeword format for the coded data; reading from the store, using the determined format, coded data, the coded data being read so as to de-interleave the encoded bit stream and the redundancy data into each of a number of codewords, each codeword including a bit stream part and corresponding redundancy data; correcting, using the bit stream part and the corresponding redundancy data, errors in the encoded bit stream; and, writing the corrected data to the store.

In another broad form the present invention provides a monolithic integrated circuit, wherein the circuit is used in a method of decoding coded data stored in a store, wherein the coded data includes: an encoded bit stream; and, redundancy data associated with the bit stream; and wherein the method includes: determining a codeword format for the coded data; reading from the store, using the determined format, coded data, the coded data being read so as to de-interleave the encoded bit stream and the redundancy data into each of a number of codewords, each codeword including a bit stream part and corresponding redundancy data; correcting, using the bit stream part and the corresponding redundancy data, errors in the encoded bit stream; and, writing the corrected data to the store.

In another broad form the present invention provides a monolithic integrated circuit, wherein the circuit is used with a data storage format for encoding a bit stream on or in a surface, the format including: at least one data portion, the at least one data portion encoding a data sequence including the bit stream followed by corresponding redundancy data, the data sequence forming interleaved codewords, each codeword encoding at least part of the bit stream and redundancy data associated with the respective bit stream part.

In another broad form the present invention provides a monolithic integrated circuit, wherein the circuit is used in a method of decoding coded data using a sensing device for sensing coded data provided in a sensing region extending in a scanline direction, the coded data including at least one data portion and alignment data defining a position of the at least one data portion, wherein the method includes: detecting a pilot feature in the alignment data, the pilot feature being detected at least two locations; determining, using the pilot feature: an alignment angle between a scanline direction and an alignment direction; and, an initial registration in a direction perpendicular to the alignment direction; detecting a registration marker in a registration feature in the alignment data; determining, using the registration marker, a gross registration in the alignment direction; detecting, using the gross registration, a registration clock indicator in the alignment data; determining, using the registration clock indicator, a fine registration in the alignment direction; determining, using the alignment angle and the fine registration and the initial registration, the position of two data clock tracks in the alignment data; detecting, using the position of the data clock tracks, a data clock indicator on each data clock track; determining, using each data clock indicator, an updated alignment angle and an updated registration in a direction perpendicular to the alignment direction; detecting at least part of the at least one data portion; and, decoding, using the updated alignment angle and the fine registration and the updated registration, at least some of the at least one detected data portion part.

In a ninth broad form the present invention provides a system for encoding data on or in a surface, the system including an encoder for: segmenting the data into a plurality of data portions each data portion being decodable independently from other data portions; causing the data portions to be disposed on or in the surface such that each data portion extends in an alignment direction, and such that at least one first data portion is displaced from at least one second data portion in at least one of: the alignment direction; and, a direction perpendicular to the alignment direction; generating alignment data indicative of an arrangement of at least some of the data portions; and, causing the alignment data to be disposed on or in the surface, such that when the surface is provided in a sensing region of a sensing device, the sensing region defining a scanline, the sensing device: senses at least part of the alignment data; determines, using the sensed alignment data, an angle between the scanline and the alignment direction; senses at least part of the at least one first data portion; and, at least partially decodes, using the determined angle, the at least one sensed first data portion part before the at least one second data portion is sensed.

Optionally the alignment data includes: a first registration structure including a plurality of reference points indicative of a position of the coded data in the alignment direction; and, a second registration structure including a plurality of reference points indicative of a position of the coded data in a direction perpendicular to the alignment direction.

Optionally the first registration structure includes: a number of markers indicative of a gross position of the coded data in the alignment direction; and, a clock track indicative of a fine position of the coded data in the alignment direction.

Optionally the second registration structure includes: at least two clock tracks indicative of a position of the coded data in the direction perpendicular to the alignment direction; and, two alignment lines for each clock track, the two alignment lines being indicative of the position of the respective clock track.

Optionally the surface includes at least one data block, the data block including: an arrangement of marks defining a plurality of possible values; and, alignment data indicative of the position of the marks.

Optionally each data block, is at least one of: provided with its own pilot track; provided with its own registration feature; provided with its own clocking feature; provided with two clocking features on opposite sides of a data-encoding area; encoding a fragment of a bitstream; encoding a fragment of a bitstream in a data-encoding area; and, formed from a rectangular data-encoding area.

Optionally data is encoded using parameter data, each data block encoding at least some of the parameter data, and the parameter data being at least one of: indicative of a size of the encoded data; indicative of an interleave factor; encoded fault-tolerantly using at least one of: a checksum associated with parameters; a CRC checksum associated with parameters; and, replication of parameters and a checksum.

Optionally the data is encoded using multiple interleaved codewords to fault-tolerantly encode data.

Optionally the at least one data portion encodes a data sequence including the bit stream followed by corresponding redundancy data, the data sequence forming interleaved codewords, each codeword encoding at least part of the bit stream and redundancy data associated with the respective bit stream part.

Optionally the encoder is for: determining a codeword format for the coded data; reading from a store, the bit stream; generating a number of codewords, each codeword including a bit stream part and corresponding redundancy data; interleaving the codewords to determine redundancy data for the bit stream from the redundancy data in each codeword; and, appending the redundancy data to the bit stream stored in the store to form the data sequence.

Optionally the alignment data includes a pilot feature, the pilot feature being at least one of: encoded fault-tolerantly; formed from a set of parallel lines; formed from a set of parallel lines that encode a binary pilot sequence; a pilot sequence which encodes at least one of: 110101100100011; and, 110010001111010;

In a tenth broad form the present invention provides a method for encoding data on or in a surface, the method including: segmenting the data into a plurality of data portions each data portion being decodable independently from other data portions; causing the data portions to be disposed on or in the surface such that each data portion extends in an alignment direction, and such that at least one first data portion is displaced from at least one second data portion in at least one of: the alignment direction; and, a direction perpendicular to the alignment direction; generating alignment data indicative of an arrangement of at least some of the data portions; and, causing the alignment data to be disposed on or in the surface, such that when the surface is provided in a sensing region of a sensing device, the sensing region defining a scanline, the sensing device: senses at least part of the alignment data; determines, using the sensed alignment data, an angle between the scanline and the alignment direction; senses at least part of the at least one first data portion; and, at least partially decodes, using the determined angle, the at least one sensed first data portion part before the at least one second data portion is sensed.

Optionally the alignment data includes: a first registration structure including a plurality of reference points indicative of a position of the coded data in the alignment direction; and, a second registration structure including a plurality of reference points indicative of a position of the coded data in a direction perpendicular to the alignment direction.

Optionally the first registration structure includes: a number of markers indicative of a gross position of the coded data in the alignment direction; and, a clock track indicative of a fine position of the coded data in the alignment direction.

Optionally the second registration structure includes: at least two clock tracks indicative of a position of the coded data in the direction perpendicular to the alignment direction; and, two alignment lines for each clock track, the two alignment lines being indicative of the position of the respective clock track.

Optionally the surface includes at least one data block, the data block including: an arrangement of marks defining a plurality of possible values; and, alignment data indicative of the position of the marks.

Optionally each data block, is at least one of: provided with its own pilot track; provided with its own registration feature; provided with its own clocking feature; provided with two clocking features on opposite sides of a data-encoding area;

encoding a fragment of a bitstream; encoding a fragment of a bitstream in a data-encoding area; and, formed from a rectangular data-encoding area.

Optionally data is encoded using parameter data, each data block encoding at least some of the parameter data, and the parameter data being at least one of: indicative of a size of the encoded data; indicative of an interleave factor; encoded fault-tolerantly using at least one of: a checksum associated with parameters; a CRC checksum associated with parameters; and, replication of parameters and a checksum.

Optionally the data is encoded using multiple interleaved codewords to fault-tolerantly encode data.

Optionally the at least one data portion encodes a data sequence including the bit stream followed by corresponding redundancy data, the data sequence forming interleaved codewords, each codeword encoding at least part of the bit stream and redundancy data associated with the respective bit stream part.

In another broad form the present invention provides a system for encoding data on or in a surface, the surface having disposed therein or thereon coded data, the coded data including: at least one data portion arranged at a respective position on or in the surface; and, alignment data arranged on or in the surface, the alignment data being at least partially indicative of at least two registration positions, the registration positions being at least partially indicative of a relative position of the at least one data portion with respect to the surface, thereby allowing the at least one data portion to be at least partially decoded.

In another broad form the present invention provides a system for encoding data on or in a surface, the surface having disposed therein or thereon coded data, the coded data including: at least one data portion arranged on or in the surface; and, alignment data at least partially indicative of at least one clock indicator; the method including, in a decoder: sensing, using a sensor which senses data provided in a sensing region: at least part of the alignment data; and, at least part of the at least one data portion; determining, using the sensed alignment data part, the clock indicator; updating, using the clock indicator, a PLL; determining, using the PLL, a relative position between the sensing region and the at least one sensed data portion part; and, at least partially decoding, using the relative position, the at least one data portion part.

In another broad form the present invention provides a system for encoding data on or in a surface, the surface having disposed therein or thereon coded data, the coded data including: at least one data portion arranged on or in the surface; and, alignment data at least partially indicative of at least one clock indicator; the system including: a sensor which senses data provided in a sensing region, the sensor sensing: at least part of the alignment data; and, at least part of the at least one data portion; a decoder for: determining, using the sensed alignment data part, the clock indicator; updating, using the clock indicator, a PLL; determining, using the PLL, a relative position between the sensing region and the at least one sensed data portion part; and, at least partially decoding, using the relative position, the at least one data portion part.

In another broad form the present invention provides a system for encoding data on or in a surface, the surface having disposed therein or thereon coded data, the coded data including: at least one data portion arranged at a respective position on or in the surface; and, alignment data arranged on or in the surface, the alignment data being at least partially indicative of at least two registration positions, the registration positions being at least partially indicative of a relative position of the at least one data portion with respect to the surface, thereby allowing the at least one data portion to be at least partially decoded.

In another broad form the present invention provides a system for encoding data on or in a surface, the surface having disposed therein or thereon coded data, wherein the coded data is decoded by: sensing, using a sensor which senses data provided in a sensing region defining a scanline: a first part of the at least one data portion; and, a second part of the at least one data portion, the second part being displaced relative to the first part in a direction orthogonal to the scanline; and, storing, in a memory: first indicating data indicative of the first part; second indicating data indicative of the second part; and, at least partially decoding, using a processor and using the first and second indicating data from memory, at least some of the at least one data portion.

In another broad form the present invention provides a system for encoding data on or in a surface, the surface having disposed therein or thereon coded data, wherein the coded data is at least one of printed and sensed using a monolithic integrated circuit including: an elongate printhead having at least one row of nozzles for printing on a surface; and, an elongate image sensor having at least one row of pixel sensors for sensing markings on a surface.

In another broad form the present invention provides a system for encoding data on or in a surface, the surface having disposed therein or thereon coded data, wherein the coded data is at least one of printed and sensed using a monolithic integrated circuit including: a printhead for printing coded data on a surface; and, a sensing device used for sensing coded data on the surface; wherein, in use, the integrated circuit is provided adjacent a transport module to allow the surface to be moved past the printhead and sensing device for printing or sensing coded data respectively.

In another broad form the present invention provides a system for encoding data on or in a surface, the surface having disposed therein or thereon coded data, wherein the coded data is decoded by a system which includes: a store for storing the coded data, a decoder for: determining a codeword format for the coded data; reading from the store, using the determined format, coded data, the coded data being read so as to de-interleave the encoded bit stream and the redundancy data into each of a number of codewords, each codeword including a bit stream part and corresponding redundancy data; correcting, using the bit stream part and the corresponding redundancy data, errors in the encoded bit stream; and, writing the corrected data to the store.

In another broad form the present invention provides a system for encoding data on or in a surface, the surface having disposed therein or thereon coded data, wherein the coded data is stored in a store, wherein the coded data includes: an encoded bit stream; and, redundancy data associated with the bit stream; and wherein the coded data is decoded by: determining a codeword format for the coded data; reading from the store, using the determined format, coded data, the coded data being read so as to de-interleave the encoded bit stream and the redundancy data into each of a number of codewords, each codeword including a bit stream part and corresponding redundancy data; correcting, using the bit stream part and the corresponding redundancy data, errors in the encoded bit stream; and, writing the corrected data to the store.

In another broad form the present invention provides a system for encoding data on or in a surface, the surface having disposed therein or thereon coded data, wherein the coded data is a bit stream encoded by a format including: at least one data portion, the at least one data portion encoding a data sequence including the bit stream followed by corresponding redundancy data, the data sequence forming interleaved codewords, each codeword encoding at least part of the bit stream and redundancy data associated with the respective bit stream part.

In an eleventh broad form the present invention provides a system for decoding data encoded on or in a surface, the encoded data including at least one data portion arranged on or in the surface, the system including a decoder for: sensing, using a sensor which senses data provided in a sensing region defining a scan line: a first part of the at least one data portion; and, a second part of the at least one data portion, the second part being displaced relative to the first part in a direction orthogonal to the scan line; and, storing, in a memory: first indicating data indicative of the first part; second indicating data indicative of the second part; and, at least partially decoding, using a processor and using the first and second indicating data from memory, at least some of the at least one data portion.

Optionally the sensor senses at least part of alignment data, the alignment data being at least partially indicative of at least one clock indicator, and wherein the decoder is for: determining, using the sensed alignment data part, the clock indicator; updating, using the clock indicator, a PLL; determining, using the PLL, a relative position between the sensing region and the at least one sensed data portion part; and, at least partially decoding, using the relative position, the at least one data portion part.

Optionally the decoder is for: determining the position of at least one marker to determine a gross registration; determining, using the gross registration, a clock indicator in a clock track; updating, using the clock indicator, an alignment PLL; determining, using the alignment PLL, a fine registration of the coded data in the alignment direction.

Optionally the coded data includes a registration structure, the registration structure including at least two clock tracks indicative of a position of the coded data in the direction perpendicular to the alignment direction and two alignment lines for each clock track, the two alignment lines being indicative of the position of the respective clock track, and wherein the decoder is for: determining, using an alignment PLL, a position of the alignment lines for a respective clock track; determining, using the position of the alignment lines, the position of each respective track; and, updating the alignment PLL.

Optionally the decoder is for: for each clock track, determining, using a respective data clock PLL, a position of a clock indicator on the clock track; determining, using the position of the clock indicator on each clock track, an alignment angle; and, updating each data clock PLL.

Optionally the decoder is for decoding the coded data by: determining a transform for a scan line using the alignment data, the transform being indicative of coordinates of bit encoding locations within the data portions; and, detecting bit values using the transform.

Optionally the decoder is for: determining coordinates of sample values from the coordinates of the bit-encoding location; and, determining a bit-encoding value by interpolating sample values from two successive sample lines.

Optionally the decoder is for: assigning a temporary value to a decoded bitstream bit which has more than two possible values; resolving a binary value for the bit based on the values of surrounding bits in the data-encoding area; and, writing resolved encoded bitstream bit values to a storage device in bitstream order.

Optionally the decoder is for: detecting a pilot feature in the alignment data, the pilot feature being detected at least two locations; determining, using the pilot feature: an alignment angle between a scan line direction and an alignment direction; and, an initial registration in a direction perpendicular to the alignment direction; detecting a registration marker in a registration feature in the alignment data; determining, using the registration marker, a gross registration in the alignment direction; detecting, using the gross registration, a registration clock indicator in the alignment data; determining, using the registration clock indicator, a fine registration in the alignment direction; detecting, using the fine registration and the alignment angle and the initial registration, at least one alignment line; updating, using the at least one detected alignment line, the fine registration; determining, using the updated fine registration, the position of two data clock tracks in the alignment data; detecting, using the position of the data clock tracks, a data clock indicator on each data clock track; determining, using each data clock indicator, an updated alignment angle and an updated registration in a direction perpendicular to the alignment direction; detecting at least part of the at least one data portion; and, decoding, using the updated alignment angle and the fine registration and the updated registration, at least some of the at least one detected data portion part.

Optionally the decoder is for, repeatedly: detecting the at least one alignment line; updating the fine registration; determining using the updated fine registration and the updated registration, the position of the data clock tracks; detecting a data clock indicator on each data clock track; updating the updated alignment angle and the updated registration; and, detecting at least part of the at least one data portion, to thereby allow the at least one data portion to be decoded.

Optionally wherein the decoder is for: detecting, at two locations in the pilot feature, a clock indicator; synchronising a respective pilot PLL with each clock indicator to thereby track the pilot feature; determining, using the pilot PLLs: the alignment angle; and, the initial registration; initialising, using the initial registration and the alignment angle, two data clock PLLs; detecting, the registration marker in the alignment data; determining, using the registration marker, the gross registration; synchronising, using the gross registration, a registration PLL with the registration clock indicator in the alignment data to thereby track the registration feature; determining, using the registration PLL, the fine registration; initialising, using the fine registration, two alignment PLLs; synchronising the alignment PLLs with alignment markers to thereby track the data clock tracks; determining, using the alignment PLLs, the position of two data clock tracks in the alignment data; detecting, using the position of the data clock tracks, a data clock indicator on each data clock track; synchronising each data clock PLL with a corresponding data clock indicator to thereby track the registration of the data in the direction perpendicular to the alignment direction; and, determining, using the data clock PLLs, at least one of: the updated alignment angle; and, the position of coded data on the surface.

In a twelfth broad form the present invention provides a method for decoding data encoded on or in a surface, the encoded data including at least one data portion arranged on or in the surface, the method including, in a decoder: sensing, using a sensor which senses data provided in a sensing region defining a scan line: a first part of the at least one data portion; and, a second part of the at least one data portion, the second part being displaced relative to the first part in a direction orthogonal to the scan line; and, storing, in a memory: first indicating data indicative of the first part; second indicating data indicative of the second part; and, at least partially decoding, using a processor and using the first and second indicating data from memory, at least some of the at least one data portion.

Optionally the sensor senses at least part of alignment data, the alignment data being at least partially indicative of at least one clock indicator, and wherein the decoder is for: determining, using the sensed alignment data part, the clock indicator; updating, using the clock indicator, a PLL; determining, using the PLL, a relative position between the sensing region and the at least one sensed data portion part; and, at least partially decoding, using the relative position, the at least one data portion part.

Optionally the decoder is for: determining the position of at least one marker to determine a gross registration; determining, using the gross registration, a clock indicator in a clock track; updating, using the clock indicator, an alignment PLL; determining, using the alignment PLL, a fine registration of the coded data in the alignment direction.

Optionally the coded data includes a registration structure, the registration structure including at least two clock tracks indicative of a position of the coded data in the direction perpendicular to the alignment direction and two alignment lines for each clock track, the two alignment lines being indicative of the position of the respective clock track, and wherein the decoder is for: determining, using an alignment PLL, a position of the alignment lines for a respective clock track; determining, using the position of the alignment lines, the position of each respective track; and, updating the alignment PLL.

Optionally the decoder is for: for each clock track, determining, using a respective data clock PLL, a position of a clock indicator on the clock track; determining, using the position of the clock indicator on each clock track, an alignment angle; and, updating each data clock PLL.

Optionally the decoder is for decoding the coded data by: determining a transform for a scan line using the alignment data, the transform being indicative of coordinates of bit encoding locations within the data portions; and, detecting bit values using the transform.

Optionally the decoder is for: determining coordinates of sample values from the coordinates of the bit-encoding location; and, determining a bit-encoding value by interpolating sample values from two successive sample lines.

Optionally the decoder is for: assigning a temporary value to a decoded bitstream bit which has more than two possible values; resolving a binary value for the bit based on the values of surrounding bits in the data-encoding area; and, writing resolved encoded bitstream bit values to a storage device in bitstream order.

Optionally the decoder is for: detecting a pilot feature in the alignment data, the pilot feature being detected at least two locations; determining, using the pilot feature: an alignment angle between a scan line direction and an alignment direction; and, an initial registration in a direction perpendicular to the alignment direction; detecting a registration marker in a registration feature in the alignment data; determining, using the registration marker, a gross registration in the alignment direction; detecting, using the gross registration, a registration clock indicator in the alignment data; determining, using the registration clock indicator, a fine registration in the alignment direction; detecting, using the fine registration and the alignment angle and the initial registration, at least one alignment line; updating, using the at least one detected alignment line, the fine registration; determining, using the updated fine registration, the position of two data clock tracks in the alignment data; detecting, using the position of the data clock tracks, a data clock indicator on each data clock track; determining, using each data clock indicator, an updated alignment angle and an updated registration in a direction perpendicular to the alignment direction; detecting at least part of the at least one data portion; and, decoding, using the updated alignment angle and the fine registration and the updated registration, at least some of the at least one detected data portion part.

In another broad form the present invention provides system for decoding data encoded on or in a surface, the encoded data including at least one data portion arranged on or in the surface, wherein the coded data is encoded by: segmenting the data into a plurality of data portions each data portion being decodable independently from other data portions; causing the data portions to be disposed on or in the surface such that each data portion extends in an alignment direction, and such that at least one first data portion is displaced from at least one second data portion in at least one of: the alignment direction; and, a direction perpendicular to the alignment direction; generating alignment data indicative of an arrangement of at least some of the data portions; and, causing the alignment data to be disposed on or in the surface, such that when the surface is provided in a sensing region of a sensing device, the sensing region defining a scanline, the sensing device: senses at least part of the alignment data; determines, using the sensed alignment data, an angle between the scanline and the alignment direction; senses at least part of the at least one first data portion; and, at least partially decodes, using the determined angle, the at least one sensed first data portion part before the at least one second data portion is sensed.

In another broad form the present invention provides system for decoding data encoded on or in a surface, the encoded data including at least one data portion arranged on or in the surface, the coded data including: at least one data portion arranged at a respective position on or in the surface; and, alignment data arranged on or in the surface, the alignment data being at least partially indicative of at least two registration positions, the registration positions being at least partially indicative of a relative position of the at least one data portion with respect to the surface, thereby allowing the at least one data portion to be at least partially decoded.

In another broad form the present invention provides system for decoding data encoded on or in a surface, the surface having disposed therein or thereon coded data, the coded data including: at least one data portion arranged on or in the surface; and, alignment data at least partially indicative of at least one clock indicator; the method including, in a decoder: sensing, using a sensor which senses data provided in a sensing region: at least part of the alignment data; and, at least part of the at least one data portion; determining, using the sensed alignment data part, the clock indicator; updating, using the clock indicator, a PLL; determining, using the PLL, a relative position between the sensing region and the at least one sensed data portion part; and, at least partially decoding, using the relative position, the at least one data portion part.

In another broad form the present invention provides system for decoding data encoded on or in a surface, the surface having disposed therein or thereon coded data, the coded data including: at least one data portion arranged on or in the surface; and, alignment data at least partially indicative of at least one clock indicator; the system including: a sensor which senses data provided in a sensing region, the sensor sensing: at least part of the alignment data; and, at least part of the at least one data portion; a decoder for: determining, using the sensed alignment data part, the clock indicator; updating, using the clock indicator, a PLL; determining, using the PLL, a relative position between the sensing region and the at least one sensed data portion part; and, at least partially decoding, using the relative position, the at least one data portion part.

In another broad form the present invention provides system for decoding data encoded on or in a surface, the surface having disposed therein or thereon coded data, the coded data including: at least one data portion arranged at a respective position on or in the surface; and, alignment data arranged on or in the surface, the alignment data being at least partially indicative of at least two registration positions, the registration positions being at least partially indicative of a relative position of the at least one data portion with respect to the surface, thereby allowing the at least one data portion to be at least partially decoded.

In another broad form the present invention provides system for decoding data encoded on or in a surface, the encoded data including at least one data portion arranged on or in the surface, the surface having disposed therein or thereon coded data, wherein the coded data is at least one of printed and sensed using a monolithic integrated circuit including: an elongate printhead having at least one row of nozzles for printing on a surface; and, an elongate image sensor having at least one row of pixel sensors for sensing markings on a surface.

In another broad form the present invention provides system for decoding data encoded on or in a surface, the encoded data including at least one data portion arranged on or in the surface, wherein the coded data is at least one of printed and sensed using a monolithic integrated circuit including: a printhead for printing coded data on a surface; and, a sensing device used for sensing coded data on the surface; wherein, in use, the integrated circuit is provided adjacent a transport module to allow the surface to be moved past the printhead and sensing device for printing or sensing coded data respectively.

In another broad form the present invention provides system for decoding data encoded on or in a surface, the encoded data including at least one data portion arranged on or in the surface, wherein the coded data is decoded by a system which includes: a store for storing the coded data, a decoder for: determining a codeword format for the coded data; reading from the store, using the determined format, coded data, the coded data being read so as to de-interleave the encoded bit stream and the redundancy data into each of a number of codewords, each codeword including a bit stream part and corresponding redundancy data; correcting, using the bit stream part and the corresponding redundancy data, errors in the encoded bit stream; and, writing the corrected data to the store.

In another broad form the present invention provides system for decoding data encoded on or in a surface, the encoded data including at least one data portion arranged on or in the surface, wherein the coded data includes: an encoded bit stream; and, redundancy data associated with the bit stream; and wherein the coded data is decoded by: determining a codeword format for the coded data; reading from the store, using the determined format, coded data, the coded data being read so as to de-interleave the encoded bit stream and the redundancy data into each of a number of codewords, each codeword including a bit stream part and corresponding redundancy data; correcting, using the bit stream part and the corresponding redundancy data, errors in the encoded bit stream; and, writing the corrected data to the store.

In another broad form the present invention provides system for decoding data encoded on or in a surface, the encoded data including at least one data portion arranged on or in the surface, wherein the coded data is a bit stream encoded by a format including: at least one data portion, the at least one data portion encoding a data sequence including the bit stream followed by corresponding redundancy data, the data sequence forming interleaved codewords, each codeword encoding at least part of the bit stream and redundancy data associated with the respective bit stream part.

In a thirteenth broad form the present invention provides a method of decoding coded data using a sensing device for sensing coded data provided in a sensing region extending in a scanline direction, the coded data including at least one data portion and alignment data defining a position of the at least one data portion, wherein the method includes: detecting a pilot feature in the alignment data, the pilot feature being detected at least two locations; determining, using the pilot feature: an alignment angle between a scanline direction and an alignment direction; and, an initial registration in a direction perpendicular to the alignment direction; detecting a registration marker in a registration feature in the alignment data; determining, using the registration marker, a gross registration in the alignment direction; detecting, using the gross registration, a registration clock indicator in the alignment data; determining, using the registration clock indicator, a fine registration in the alignment direction; determining, using the alignment angle and the fine registration and the initial registration, the position of two data clock tracks in the alignment data; detecting, using the position of the data clock tracks, a data clock indicator on each data clock track; determining, using each data clock indicator, an updated alignment angle and an updated registration in a direction perpendicular to the alignment direction; detecting at least part of the at least one data portion; and, decoding, using the updated alignment angle and the fine registration and the updated registration, at least some of the at least one detected data portion part.

Optionally the method includes: detecting, using the fine registration and the alignment angle and the initial registration, at least one alignment line; updating, using the at least one detected alignment line, the fine registration; and, determining, using the updated fine registration, the position of the data clock tracks.

Optionally the method includes, repeatedly: detecting the at least one alignment line; updating the fine registration; determining using the updated fine registration and the updated registration, the position of the data clock tracks; detecting a data clock indicator on each data clock track; updating the updated alignment angle and the updated registration; and, detecting at least part of the at least one data portion, to thereby allow the at least one data portion to be decoded.

Optionally the method includes: detecting, at two locations in the pilot feature, a clock indicator; synchronising a respective pilot PLL with each clock indicator to thereby track the pilot feature; determining, using the pilot PLLs: the alignment angle; and, the initial registration; initialising, using the initial registration and the alignment angle, two data clock PLLs; detecting, the registration marker in the alignment data; determining, using the registration marker, the gross registration; synchronising, using the gross registration, a registration PLL with the registration clock indicator in the alignment data to thereby track the registration feature; determining, using the registration PLL, the fine registration; initialising, using the fine registration, two alignment PLLs; synchronising the alignment PLLs with alignment markers to thereby track the data clock tracks; determining, using the alignment PLLs, the position of two data clock tracks in the alignment data; detecting, using the position of the data clock tracks, a data clock indicator on each data clock track; synchronising each data clock PLL with a corresponding data clock indicator to thereby track the registration of the data in the direction perpendicular to the alignment direction; and, determining, using the data clock PLLs, at least one of: the updated alignment angle; and, the position of coded data on the surface.

Optionally data is encoded on the surface using a format.

Optionally the format is: suitable for encoding a bitstream; adapted for optical imaging and decoding; two-dimensional; suitable for printing onto a surface; adapted for real-time decoding while being transported past a linear image sensor; and, adapted to be decoded from a set of successive sample lines without reference to more than two successive sample lines.

Optionally the sample lines are perpendicular to a decoding direction.

Optionally the format encodes the bitstream substantially in increasing bit order with respect to the decoding direction.

Optionally the alignment data includes a registration feature to allow registration of a data portion in an alignment direction to be determined, the registration feature being at least one of: formed from regularly-spaced gross registration markers; formed from regularly-spaced fine registration marks; and, formed from fine registration marks disposed between gross registration markers.

Optionally the format includes a clocking feature which allow clocking of a data portion to be determined one-dimensionally in the decoding direction.

Optionally the clocking feature allows the clocking of the data portion to be determined anew for each sample line.

Optionally the clocking feature is a clock track consisting of regularly spaced clock marks.

Optionally the format represents an individual encoded data bit by the presence or absence of a mark at a predetermined location in relation to the registration feature and the clocking feature.

Optionally the format allows an additional bitstream to be appended.

In a fourteenth broad form the present invention provides a method of decoding the format of the fourth broad form.

Optionally the method includes processing a succession of sample lines obtained by sampling the format in the decoding direction.

Optionally the method includes detecting the pilot feature.

Optionally the method includes recognising the pilot sequence.

Optionally the method includes recognising the pilot sequence in the presence of errors.

Optionally the method includes using a PLL to track the pilot feature during detection.

Optionally the method includes determining initial registration in the decoding direction from the pilot feature.

Optionally the method includes determining initial registration in the direction orthogonal to the decoding direction from the registration feature.

Optionally the method includes using a PLL to track the registration feature during registration.

Optionally the method includes determining registration in the decoding direction anew for each sample line from the clocking feature.

Optionally the method includes determining registration in the decoding direction at two different locations on the sample line anew for each sample line from the two clocking feature.

Optionally the method includes using PLLs to track the clocking features.

Optionally the method includes using PLLs to track the centre of each clocking feature in the direction orthogonal to the decoding direction.

Optionally the method includes computing a transform for sampling bit values for each sample line anew.

Optionally the method includes computing the transform from the two clocking features.

Optionally the method includes computing two-dimensional sample-line coordinates for each bitstream bit-encoding location.

Optionally the method includes computing the coordinates of the bit-encoding location using the transform.

Optionally the method includes determining a bit-encoding value by interpolating sample values from two successive sample lines.

Optionally the method includes computing the coordinates of the sample values from the coordinates of the bit-encoding location.

Optionally the method includes assigning a temporary value to the decoded bitstream bit which has more than two possible values.

Optionally the method includes resolving a binary value for the bit based on the temporary or resolved values of surrounding bits in the data-encoding area.

Optionally the method includes writing resolved encoded bitstream bit values to a storage device in bitstream order.

Optionally the method includes writing redundancy data at the end of the stored bitstream.

Optionally the method includes using the redundancy data to correct any errors in the bitstream.

Optionally the method includes retrieving the symbols of each codeword from the storage device, correcting errors in the codeword, and writing corrected symbols back to the storage device.

Optionally the method includes generating storage device addresses of interleaved symbols to enable retrieval of symbols from and subsequent writing back of corrected symbols to the storage device.

Optionally the method includes identifying a set of parameters with a valid checksum.

Optionally the method includes determining the bitstream size from the parameters.

Optionally the method includes determining the encoded data size from the parameters.

Optionally the method includes determining the interleave factor from the parameters.

Optionally the system includes at least one of: a linear image sensor interface; a general-purpose input/output (GPIO) interface; a storage device interface; a serial interface for receiving configuration and control data from a host device; an interrupt interface for signalling events to the host device; and, a decoder controller for controlling and synchronising a decoding operation.

Optionally the storage device interface is a memory interface.

Optionally the decoder controller is configured to control at least one of: at least one illumination LED via the GPIO interface; at least one media transport motor via the GPIO interface; and, at least one linear image sensor via the GPIO interface.

Optionally the decoder controller is configured to at least one of: accept notification of the presence of a medium from at least one medium detector via the GPIO interface; detect the presence of a medium via the linear image sensor; initiate medium transport, linear imaging and decoding on detection of the presence of a medium; initiate medium transport, linear imaging and decoding on detection of the presence of a medium in at least two locations; control the operation of the raw decoder during transport of a format-bearing medium past the linear image sensor, to effect raw bitstream decoding;

and, control the operation of the redundancy decoder after completion of raw bitstream decoding, to effect bitstream error correction.

Optionally the system includes a set of line buffers configured to receive sample lines from a linear image sensor via the linear image sensor interface.

Optionally the system includes a raw decoder configured to read sample data from the line buffers, decode bitstream bit values from the sample data, and write bit values to a storage device via the storage device interface.

Optionally the system includes a redundancy decoder configured to correct errors in the bitstream data stored in the storage device.

Optionally the system is implemented in a monolithic integrated circuit (IC).

Optionally the IC includes the storage device.

Optionally the storage device is a solid-state memory.

Optionally the system forms part of a reader for reading and decoding a surface according to the fourth broad form.

Optionally the reader includes at least one of: a decoding system for decoding the medium; a linear image sensor for capturing sample lines from the medium; at least one illumination LED for illuminating the medium; at least one transport motor for transporting the medium past the image sensor; a storage device for storing bitstream data; at least one medium detector for detecting the presence of the medium; and, a host controller for controlling the decoding system.

In a fifteenth broad form the present invention provides a monolithic integrated circuit (IC) which includes a linear image sensor and a printhead.

Optionally the printhead is at least one of: an inkjet printhead; and, a Memjet™ printhead.

Optionally the image sensor is at least one of: an active pixel CMOS image sensor; and, a CCD image sensor.

In a sixteenth broad form the present invention provides a printer for printing the format according to the fourth broad form onto a medium.

Optionally the printer incorporates at least one of: an inkjet printhead; and, a Memjet™ printhead.

Optionally the printer is configured to print at least one of: the format using substantially invisible ink; the format using an infrared-absorptive ink; visible information using visible inks; visible information and the substantially invisible format in substantially the same area of the medium; and, the visible information and the substantially invisible format at substantially the same time. netpage coded data.

In a seventeenth broad form the present invention provides a printer-reader configured to print the format according to the fourth broad form onto a medium and for reading a format-bearing medium and decoding the format.

Optionally the device includes at least one of: a printer; a reader; and, a linear image sensor and printhead IC according to the sixth broad form.

In a eighteenth broad form the present invention provides a camera incorporating a printer.

Optionally the camera is configured to print at least one of: a digital image corresponding to a captured photo onto a medium, encoded according to the format of the fourth broad form; and, a visual image corresponding to the photo onto the medium using visible inks, and to print the encoded digital image using a substantially invisible ink.

Optionally the camera includes a reader according to the fourth aspect.

Optionally the camera is configured to read a digital image from a medium encoded according to the fourth broad form and decode it.

Optionally the camera includes a display.

Optionally the camera is configured to display the decoded image on the display.

Optionally the camera includes a storage device.

Optionally the camera is configured to store the decoded image in the storage device.

Optionally the camera includes a transmitter.

Optionally the camera is configured to transmit the decoded image to a separate computer system using the transmitter.

Optionally the camera is incorporated in a mobile phone.

In nineteenth broad form the present invention provides a mobile phone incorporating a printer.

Optionally the phone is configured to print at least one of: an audio bitstream corresponding to captured audio onto a media, encoded according to the format of the fourth broad form; and, a visual image representative of the audio onto the medium using visible inks, and to print the encoded audio bitstream using a substantially invisible ink.

Optionally the phone includes a reader.

Optionally the phone is configured to read an audio bitstream from a medium encoded according to the fourth broad form and decode it.

Optionally the phone includes an audio output device.

Optionally the phone is configured to play the decoded audio via the audio output device.

Optionally the phone includes a storage device.

Optionally the phone is configured to store the decoded audio in the storage device.

Optionally the phone includes a transmitter.

Optionally the phone is configured to transmit the decoded audio to a separate computer system using the transmitter.

In a twentieth broad form the present invention provides a medium bearing at least one bitstream encoded according to the format of the fourth broad form.

Optionally the medium is constructed from at least one of: paper, cardboard, plastic, metal, and glass.

Optionally the medium is laminar. Alternatively the medium is solid.

DETAILED DESCRIPTION OF PREFERRED EXAMPLES

1. Introduction

Mnem is a robust two-dimensional optical encoding scheme for storing digital data on physical surfaces. Its data capacity scales linearly with surface area. It fundamentally supports read-only (RO) and write-once read-many (WORM) applications, and includes the ability to append data. It incorporates optional fault tolerance to cope with real-world surface degradation.

Mnem is suitable for inkjet printing. When printed using an invisible ink such as an infrared absorptive or fluorescent ink, Mnem-encoded data may be superimposed on visible text and colour graphics. This allows, for example, a digital negative of a photograph to be superimposed on a colour print of the photograph.

Mnem is optimised for efficient real-time decoding during a linear scan of Mnem-encoded data. A compact Mnem decoder chip implements the decoding function. In an application where data is encoded on card media, the decoder chip is typically coupled with a linear image sensor and a card transport mechanism. The decoder then functions in real time as the card is transported past the linear image sensor.

The Mnem decoder operates entirely without software intervention, and writes decoded data contiguously to external memory. It provides both raw and fault-tolerant operating modes, and in fault-tolerant mode requires only a small amount of additional external memory for temporary storage of parameter and redundancy data. The decoder optionally controls image acquisition and media transport.

This document describes the Mnem format, the decoding algorithm, and the architecture of a decoder and a complete reader.

The Mnem design builds on the earlier dotCard design, which is described in detail in a series of granted patents and pending patent applications, including U.S. patent application Ser. No. 09/112,781 entitled "Data distribution mechanism in the form of ink dots on cards", all other patents and pending applications on this technology are provided in the cross-references section above. It differs from dotCard in being optimised for efficient decoding. Differences between the two approaches are described in detail below.

2. Format

A Mnem area encodes one or more bitstreams of data. These are numbered sequentially from zero. The bits within a bitstream are also numbered sequentially from zero.

Figure 1:
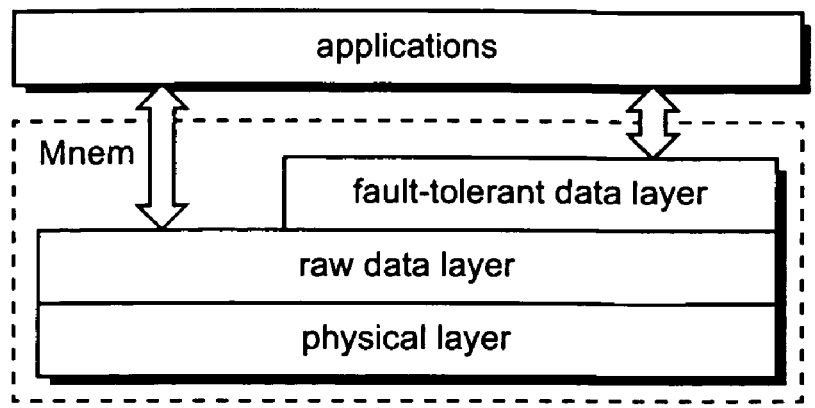
FIG. 1 is an example of an arrangement of Mnem encoding layers.

As illustrated in FIG. 1, the Mnem encoding has a physical layer, a raw data layer, and a fault-tolerant data layer. The raw data layer represents each bitstream using a two-dimensional encoding scheme. The physical layer implements the encoding scheme in a form suitable for optical sensing and imaging. The fault-tolerant data layer encodes each bitstream redundantly for fault tolerance.

The physical layer can vary according to application. A Mnem application can choose to use Mnem's fault-tolerant data layer or implement its own.

2.1 Raw Data Layer

2.1.1 Bitstream Segmentation

Each bitstream is partitioned into a sequence of segments. Within a bitstream, these are numbered sequentially from zero. The segment size is fixed for a particular application.

Each segment is represented by a two-dimensional block, and a bitstream is therefore represented by a sequence of blocks. Each block includes sufficient structure to allow it to be detected, and its segment data decoded, independently of other blocks. The block structure of a Mnem area serves two purposes: (a) it allows required optical tolerances to be met locally per block rather than globally for the entire Mnem area; and (b) it provides the basis for appending a new bitstream to an existing Mnem area.

Figure 2:
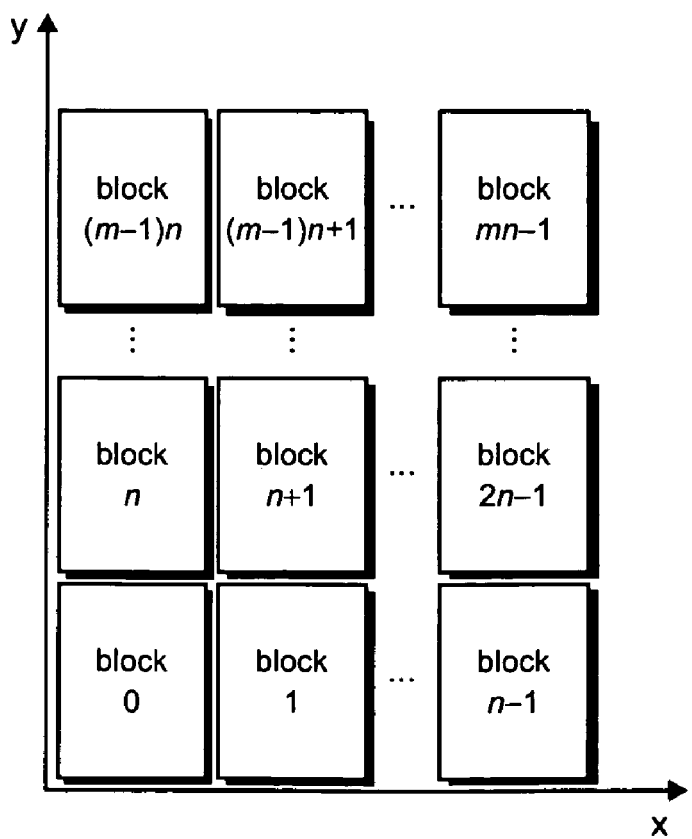
FIG. 2 is an example of an arrangement of a Mnem area, with m rows of n blocks, in Mnem space.

The structure of a Mnem area is defined within a Cartesian coordinate space referred to as Mnem space, as illustrated in FIG. 2. Each block has a corresponding location within the area. Increasing block numbers correspond to block locations with increasing x coordinates within increasing y coordinates, thus defining a set of block rows. The first block of a stream follows the last block of the previous stream, if any.

There is a nominal edge-to-edge spacing $\Delta_b$ between blocks, and each block has a nominal position based on the nominal spacing. The actual position of a block is allowed to vary by up to $\pm\Delta_b/2$ in either or both dimensions. The spacing is application specific.

There is a nominal minimum spacing $\Delta_m$ in the x dimension between the edge of the Mnem area and the edge of the scan. The actual position of the Mnem area with respect to the scan is allowed to vary in x by $\pm\Delta_m$. The spacing is application specific.

Assuming a maximum allowed block height of $H_{b\ max}$, a maximum allowed block width of $W_{b\ max}$, Mnem area height of $H_m$, and a Mnem area width of $W_m$, the number m of block rows and the number n of block columns in the Mnem area are given by:

$$m = \left\lfloor \frac{H_m}{H_{b_{max}} + \Delta_b} \right\rfloor \quad (EQ\ 1)$$

$$n = \left\lfloor \frac{W_m}{W_{b_{max}} + \Delta_b} \right\rfloor \quad (EQ\ 2)$$

The nominal height $H_b'$ and actual width $W_b$ of a block are then given by:

$$H_b' = \left\lfloor \frac{H_m}{m} \right\rfloor - \Delta_b \quad (EQ\ 3)$$

$$W_b = \left\lfloor \frac{W_m}{n} \right\rfloor - \Delta_b \quad (EQ\ 4)$$

The actual height $H_b$ of a block is derived in Section 2.1.6.

Figure 3:
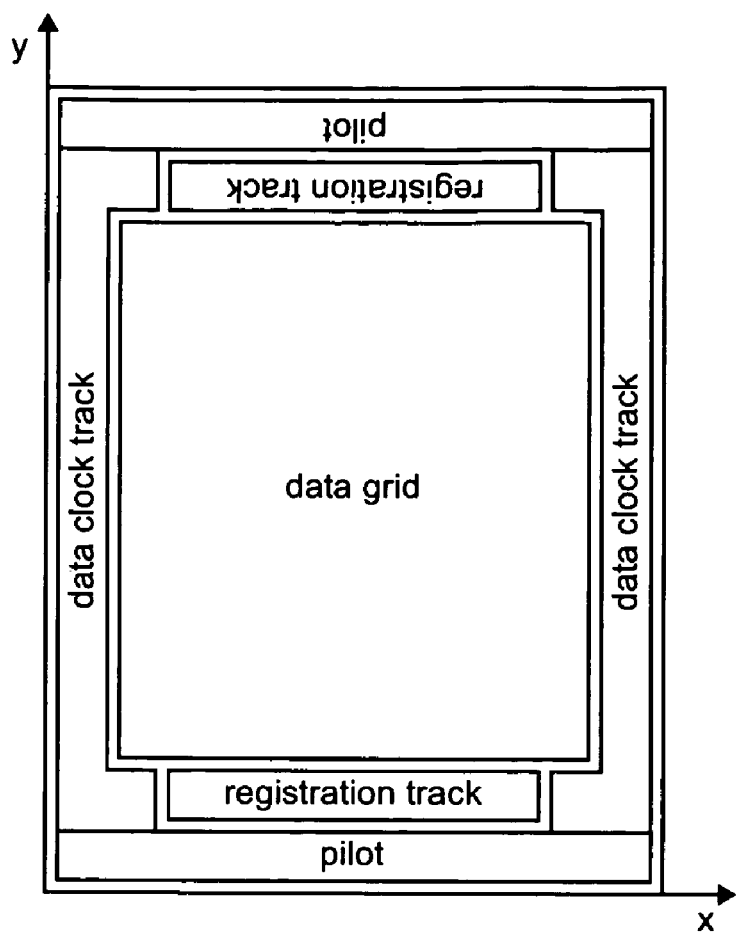
FIG. 3 is an example of an arrangement of the block structure in block space.

The structure of the block is defined within a Cartesian coordinate space referred to as block space, as illustrated in FIG. 3. Note that the various block components shown in the figure are not to scale.

Block space and Mnem space have the same scale and rotation. They are related by a translation. The block in column i and row j has a block space to Mnem space translation vector $T_{bm}$:

$$T_{bm}(i,j) = [\Delta_b + i(W_b + \Delta_b), \Delta_b + j(H_b + \Delta_b), 0]^T \quad (EQ\ 5)$$

2.1.2 Data Grid

Within the block each data bit of the segment has a corresponding encoding location, and the value of the bit is encoded by the presence or absence of a mark at that location. The presence of a mark encodes a one bit; the absence of a mark encodes a zero bit. The bit encoding locations are arranged on a regular rectangular grid. Each location has integer coordinates and the spacing of adjacent locations is one unit in both x and y. Increasing bit numbers correspond to locations with increasing y coordinates within increasing x coordinates, thus defining a row of data columns.

The width $W_d$ and height $H_d$ of the data grid are derived from the block dimensions in Section 2.1.6. The height of the data grid is always a multiple of 8.

2.1.3 Pilot

The block is designed to be scanned in the y direction, i.e. using a set of scanlines more or less parallel to the x axis. It therefore includes a pilot sequence at the bottom to allow initial block detection. The structure of the block is rotationally symmetric to allow it to be scanned bottom-to-top or top-to-bottom. It includes a different pilot sequence at the top to allow the decoder to detect the scan direction and correct for it. Support for bi-directional scanning may be omitted for applications which don't require it.

The block is designed to allow scanning and decoding even when slightly rotated with respect to the scan direction, up to a maximum rotation $\alpha_{max}$, to accommodate real-world tolerances in a reader as well as in the encoding itself (e.g. due to the original printing process). The pilot therefore allows the decoder to determine the actual rotation $\alpha$ of the block with respect to the scan direction.

The pilot consists of a binary sequence encoded at odd y coordinates, i.e. using a return-to-zero representation. This allows it to be self-clocking. The presence of a line parallel to the x axis encodes a one bit; the absence of a line encodes a zero bit.

The pilot sequence consists of a lead-in which assists initial synchronisation, followed by a unique code sequence which allows recognition and registration. The lead-in consists of five consecutive ones. The bottom pilot code sequence is 1101011001000011; the top pilot code sequence is 1100100011111010, i.e. a left cyclic 5-shift of the bottom pilot code sequence. The height $H_p$ of the pilot is 40 units. The width $W_p$ of the pilot is defined relative to the width of the data grid and the width of the data clock tracks (see Section 2.1.5).

The two pilot code sequences are selected to maximise their binary Hamming distance. This allows the decoder to perform maximum-likelihood detection of the pilots even in the presence of errors. The pilots are also selected to maximise their Hamming distance from sequences which result from an arbitrary prefix of one bits, e.g. such as when preceded by the lead-in.

Once the decoder detects the pilot sequence it knows the y registration of the block with respect to the scan. By detecting the pilot sequence at two different x offsets it obtains two potentially different y registrations for the block. From these it can compute the slope of the pilot lines and hence the initial slope of the data grid. By attempting to detect the pilot at more than two locations the decoder can more robustly detect the pilot.

2.1.4 Registration Tracks

The block contains a registration track following each pilot. Each registration track consists of a clock track interspersed with registration markers at regular intervals. The markers allow the decoder to determine the gross x registration of the block, i.e. to within a clock period (or equivalently $\pm 1$ unit). The clock track allows the decoder to determine the fine x registration of the block, i.e. to within a fraction of a clock period.

The clock track consists of a sequence of clock ticks positioned on successive odd x coordinates.

Each clock tick consists of a short line, parallel to the y axis.

The registration markers have a width $W_f$ and an edge-to-edge spacing $\Delta_f$ sufficiently large to allow the decoder to unambiguously locate and identify each marker even if the deviation in the x position of the block from its nominal x position is the maximum allowed:

$$W_f = \Delta_m + \Delta_b + W_{f\ min} \quad (EQ\ 6)$$

$$\Delta_f = \Delta_m + \Delta_b + \Delta_{f\ min} \quad (EQ\ 7)$$

$W_{f\,min}$ is the minimum marker size. It has a fixed value defined in Table 2. $\Delta_{f\,min}$ is the minimum marker separation. It has a fixed value defined in Table 2.

The left-most marker associated with the bottom pilot is aligned with the first column of the registration track, and the remaining markers are positioned relative to the left-most marker. The right-most marker associated with the top pilot is aligned with the last column of the registration track, and the remaining markers are positioned relative to the right-most marker. The width $W_r$ of the marker track is defined relative to the width of the data grid and the width of the data clock tracks (see Section 2.1.5).

The registration markers and clock ticks have a height $H_r$ sufficient to guarantee that the decoder encounters the entire registration track before encountering the start of the data grid, even if the rotation of the block with respect to the scan direction is the maximum allowed:

$$H_r = 2(\lfloor(\lfloor W_r \tan \alpha_{max}\rfloor + H_{r\,min}-1)/2\rfloor+1) \quad (EQ\ 8)$$

The height is even to correspond to an integer number of data clocks. $H_{r\,min}$ is the minimum distance required to allow an individual marker to be detected. It has a fixed value defined in Table 2.

There are a redundant number of markers. At a minimum the decoder need only detect one marker and process its adjacent clock.

2.1.5 Data Clock Tracks

The block contains two clock tracks running along the two vertical sides of the data grid, for the full height of the block. Each clock track consists of a sequence of clock ticks positioned on successive odd y coordinates. Each clock tick consists of a short line, parallel to the x axis. Each clock track also contains two alignment lines parallel to the y axis, running the full height of the clock track. The alignment lines are separated from each other and from the clock ticks by a blank line. With respect to the data grid, the alignment lines run along the outside edge of each clock track.

Once the decoder knows the y and x registration of the block and the initial slope of the data grid via the pilot and registration track, it is able to track the two clocks from one scanline to the next. It thus obtains two potentially different y registrations for the two ends of each scanline, and from these it can compute the slope of the scanline and sample each bit-encoding location the scanline intersects. The decoder can use the slope of the scanline to update its estimate of the slope of the clock tracks, to help it track the centre of each clock track.

The decoder tracks the centre of each clock track by tracking the centre of the blank line between the two alignment lines.

The width $W_c$ of each clock track is the width of a clock tick, alignment lines and spacing:

$$W_c = W_{ct} + 4 \quad (EQ\ 9)$$

The width $W_{ct}$ of a clock tick has a fixed value defined in Table 2.

Where the clock tracks run alongside registration track they have a greater width $W_W$ to allow the decoder to acquire and track the clocks before it acquires x registration via the registration track:

$$W_w = \lceil W_c(1+\sin \alpha_{max})\rceil + \Delta_m + \Delta_b \quad (EQ\ 10)$$

2.1.6 Block Component Spacing

There is a blank border around the entire block one unit wide. This ensures separation of adjacent blocks' pilots and alignment lines even when $\Delta_b = 0$.

Each pilot is separated from its corresponding registration track by a blank line.

There is a blank border around the entire data grid one unit wide. This simplifies assumptions during decoding about the values of bit-encoding locations in the neighbourhood of any given bit-encoding location.

Because the height of the data grid is even but the height of the data clock tracks is odd, the border between the top registration track and the data grid is two units high.

The non-data height overhead $H_h$ and width overhead Wh are given by:

$$H_h = 2(H_p + H_r + 3) + 1 \quad (EQ\ 11)$$

$$W_h = 2(W_c + 2) \quad (EQ\ 12)$$

The overall height $H_d$ and width $W_d$ of the data grid are given by:

$$H_d = 8\left\lfloor \frac{H_b' - H_h}{8} \right\rfloor \quad (EQ\ 13)$$

$$W_d = W_b - W_h \quad (EQ\ 14)$$

The raw byte capacity $D_m$ of a Mnem area is given by:

$$D_m = \frac{mnH_dW_d}{8} \quad (EQ\ 15)$$

Given the data grid height $H_d$, the actual height $H_b$ of the block is given by:

$$H_b = H_h + H_d \quad (EQ\ 16)$$

The position $P_{f0}$ of the bottom right corner of the first gross registration marker is given by:

$$P_{f0} = (x_{f0}, y_{f0}, 1)^T = (W_w + 2 + W_f, H_p + 2, 1)^T \quad (EQ\ 17)$$

The position $P_f$ of the bottom right corner of gross registration marker j is given by:

$$P_f(i) = (x_f(i), y_{f0}, 1)^T = P_{f0} + [i(\Delta_f + W_f), 0, 0]^T \quad (EQ\ 18)$$

The position $P_{d0}$ of the first (i.e. bottom left) bit-encoding location in the data grid is given by:

$$P_{d0} = (x_{d0}, y_{d0}, 1)^T = (W_c + 2, H_p + H_r + 3, 1)^T \quad (EQ\ 19)$$

The position $P_d$ of the bit-encoding location in column i and row j of the data grid is given by:

$$P_d(i,j) = P_{d0} + [i,j,0]^T \quad (EQ\ 20)$$

For completeness, the width of the pilots and the registration tracks are given by:

$$W_p = W_b - 2 \quad (EQ\ 21)$$

$$W_r = W_b - 2(W_w + 2) \quad (EQ\ 22)$$

2.2 Physical Layer

Figure 4:
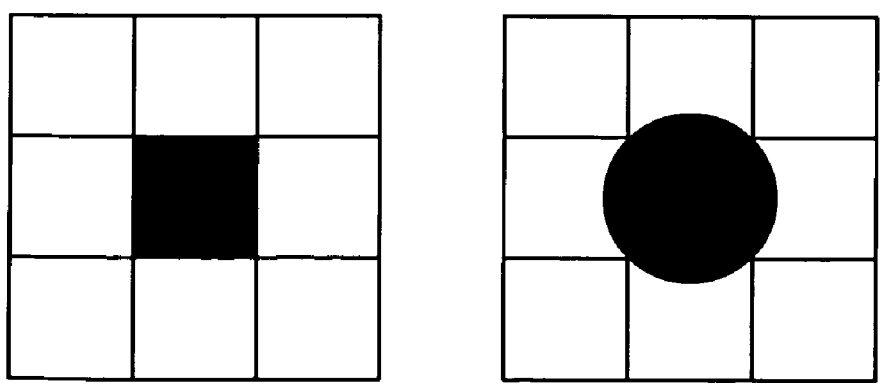
FIG. 4 is an example of a minimum extent of a mark (left) and maximum extent of a mark (right) on a unit block-space grid.

A mark has a position with integer coordinates. As illustrated in FIG. 4, it has a minimum extent equal to the area of a unit square centred at its position, and a maximum extent equal to the area of the circle circumscribing this unit square.

A line is parallel to the x axis or to the y axis, and its endpoints have integer coordinates. It traverses a set of points with integer coordinates. Its extent is identical to that of a set of marks placed at these points.

A mark, when illuminated and imaged optically, has a response which contrasts with that of the unmarked surface.

Although the spectral characteristics of the unmarked surface, the mark, and the imaging system are application specific, the surface is typically broadband reflective while the mark is typically broadband or narrowband absorptive.

Example representations include a black mark on a white surface, and an near-infrared-absorptive mark on a white surface.

For clarity in the remainder of this document, marks are referred to and shown as black, while unmarked surface areas are referred to and shown as white. The absence of a mark is also referred to as a hole.

The real space to Mnem space scale factor R determines the real spatial density of the Mnem area.

When printed using a 1600 dpi Memjet printing system, the design of which has been disclosed in a series of Granted patents and pending patent applications listed in the cross references above, and which is described in more detail in Section 9, with each mark corresponding to a single Memjet dot, R is 1600 per inch or 63 per mm, and the extent of each mark is at its allowed maximum.

2.3 Fault-Tolerant Data Layer

As described above, the block structure of the raw data layer is inherently fault tolerant. The fault-tolerant data layer adds data fault-tolerance.

Mnem uses Reed-Solomon redundancy coding and interleaving to provide data fault tolerance. Each bitstream is interpreted as a stream of 8-bit symbols for the purposes of encoding. During encoding the symbol stream is interleaved according to an interleave factor, Reed-Solomon encoded, and then de-interleaved. This leaves the bitstream in its original state, but ensures maximum separation between symbols belonging to the same Reed-Solomon codeword. The interleave factor is chosen to match the number of Reed-Solomon codewords required to encode the entire bitstream. This ensures that after de-interleaving all redundancy data appears appended to the end of the original bitstream. The original bitstream is zero-padded to make its size an integer multiple of the code's dimension (i.e. the codeword's data capacity).

An application can choose to replicate a short bitstream any number of times to increase fault tolerance. Both the replication and the increased interleaving increase fault tolerance.

Mnem uses the 8-bit (255,233) CCSDS code (CCSDS, *Recommendations for Telemetry Channel Coding*, CCSDS 101.0-B-6, October 2002), which has an error-correcting capacity of 16 symbols per codeword.

To allow the decoder to decode an encoded bitstream, it must know the interleave factor of the bitstream and the number of codewords in the bitstream. In Mnem these are the same. The fault-tolerant layer encodes the number and the size of the encoded bitstream alongside the bitstream itself. Since these parameters cannot benefit from the fault tolerance of the encoded bitstream, the bitstream parameters are replicated multiple times in each block. A cyclic redundancy check (CRC) sequence is appended to each copy to allow the decoder to detect a good copy. Alternatively or additionally, the bitstream parameters can be Reed-Solomon encoded independently of the bitstream, using a shorter Reed-Solomon code with more redundancy.

The first and last columns of the data grid of each block are set aside for encoding the bitstream parameters and their CRC. These are repeated as many times as will fit in the height of the data column. The bitstream number is encoded as a 16-bit integer. The bitstream size is encoded as a 32-bit unsigned integer. The CRC is the 16-bit CRC defined by the CCITT (ITU, Interface between Data Terminal Equipment (*DTE*) and Data Circuit-terminating Equipment (*DCE*) for terminals operating in the packet mode and connected to public data networks by dedicated circuit, ITU-T X.25 (10/96)). Both the parameters and the CRC are encoded most-significant byte and bit first, i.e. with the lowest bit number and y coordinate.

The encoded byte capacity $E_m$ of a Mnem area is given by:

$$E_m = 223 \left\lfloor \frac{mnH_d(W_d - 2)}{255 \times 8} \right\rfloor \quad \text{(EQ 23)}$$

2.4 Summary of Parameters

Table 1, Table 2 and Table 3 summarise the variable, fixed and derived parameters which define the Mnem format.

TABLE 1

Variable parameters

| parameter | description |
|---|---|
| $\alpha_{max}$ | Maximum $\alpha$, the rotation of the block in scan space. |
| $\Delta_b$ | The nominal edge-to-edge spacing between adjacent blocks, and twice the maximum block misalignment. |
| $\Delta_m$ | The nominal minimum x spacing between the edge of the Mnem area and the edge of the scan, and the maximum horizontal Mnem area misalignment. |
| $H_{b\,max}$ | The maximum height of a block. |
| $H_m$ | The height of the Mnem area. |
| N | The sampling rate, i.e. the nominal block space to scan space scale factor. |
| R | The real space to Mnem space scale factor. |
| $W_{b\,max}$ | The maximum width of a block. |
| $W_m$ | The width of the Mnem area. |
| $W_s$ | The width of the scanline. |

TABLE 2

Fixed Parameters

| parameter | value | description |
|---|---|---|
| $\Delta_{f\,min}$ | 20 | Minimum $\Delta_f$, the edge-to-edge spacing between adjacent registration markers. |
| $H_p$ | 40 | The height of the pilot. |
| $H_{r\,min}$ | 3 | Minimum $H_r$, the height of the registration track. |
| $W_{ct}$ | 3 | The width of a data clock tick. |
| $W_{f\,min}$ | 20 | Minimum $W_f$, the width of a registration marker. |

TABLE 3

Derived parameters

| parameter | equation | description |
|---|---|---|
| $\Delta_f$ | EQ 7 | The edge-to-edge spacing between adjacent registration markers. |
| $D_m$ | EQ 15 | The raw bit capacity of the Mnem area. |
| $E_m$ | EQ 23 | The encoded bit capacity of the Mnem area. |
| $H_b$ | EQ 16 | The height of the block. |
| $H_b'$ | EQ 3 | The nominal height of the block. |
| $H_d$ | EQ 13 | The height of the data grid (always a multiple of 8). |
| $H_h$ | EQ 11 | The height of the block overhead. |
| $H_r$ | EQ 8 | The height of the registration track. |
| m | EQ 1 | The number of block rows in the Mnem area. |
| n | EQ 2 | The number of block columns in the Mnem area. |
| $T_{bm}$ | EQ 5 | The block space to Mnem space translation vector. |
| $W_b$ | EQ 4 | The width of the block. |
| $W_c$ | EQ 9 | The width of the data clock track. |
| $W_d$ | EQ 14 | The width of the data grid. |

TABLE 3-continued

Derived parameters

| parameter | equation | description |
|---|---|---|
| $W_f$ | EQ 6 | The width of a registration marker. |
| $W_h$ | EQ 12 | The width of the block overhead. |
| $W_p$ | EQ 21 | The width of the pilot. |
| $W_r$ | EQ 22 | The width of the registration track. |
| $W_w$ | EQ 10 | The width of the wide data clock track. |

3. Decoding Algorithm 3.1 Raw Data Layer Decoding

A Mnem block is designed to be scanned in the y direction, i.e. using a set of scanlines more or less parallel to the x axis. Furthermore, it is designed to be incrementally decodable using only the two most recent scanlines. The decoder is therefore only required to buffer the last two scanlines (or three, depending on image sensor performance), and this in turn makes it practical to buffer scanlines in on-chip memory rather than in off-chip memory.

Scanline decoding makes it practical to decode a Mnem area in real time during scanning. In a typical configuration, a Mnem area is encoded on the surface of a laminar medium such as a paper or plastic sheet, and the decoder operates while the encoded sheet is transported past a linear image sensor.

Although the decoder only requires incremental scanline access to a Mnem area, this does not preclude area scanning of a Mnem area.

As illustrated in FIG. 2, a Mnem area encodes m block rows of n blocks each. For the purposes of scan decoding, this can be thought of as n block columns of m blocks each. Note that trailing blocks in the last row need not be present. Furthermore, when scan processing is proceeding top-to-bottom rather than bottom-to-top, this can manifest itself as the absence of leading blocks in the first row.

Figure 5:
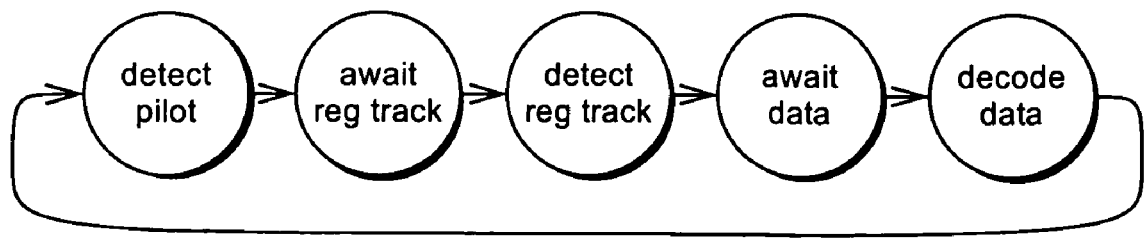
FIG. 5 is an example of a block column state machine.

During the processing of a single scanline, the decoder operates on each of the n block columns in the Mnem area. It maintains a state for each column, reflecting the state of the decoding algorithm for that column. The block columns need not be in the same state during the processing of a single scanline. The block column state machine is shown in FIG. 5 and is described below.

Figure 6:
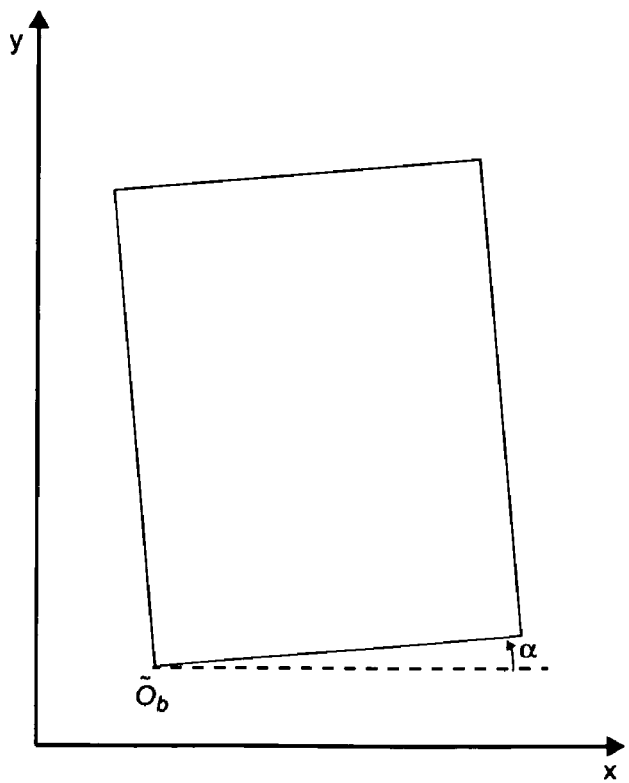
FIG. 6 is an example of a rotated block in scan space.

The scan proceeds within a Cartesian coordinate space referred to as scan space, as illustrated in FIG. 6. An x unit in scan space corresponds to the spatial sampling period $d_x$ of the scanline, i.e. the horizontal pixel pitch of the scanline. A y unit in scan space corresponds to the spatial sampling period $d_y$ of the scan, i.e. the vertical pitch of the scan. These units are nominally equal. As described earlier, the block is rotated by $\alpha$ with respect to scan space, up to a maximum $\alpha_{max}$. The block is also arbitrarily translated with respect to scan space. Scan space and block space are therefore related by an arbitrary affine transform.

Throughout this document, scan-space quantities are indicated by a tilde.

Given a scan sampling rate N with respect to block space, the width $\tilde{W}_s$ of scan space is sufficient to image the Mnem area throughout the scan:

$$\tilde{W}_s \geq N(W_m + 2\Delta_m) + 2NH_m \sin \alpha_{max} \quad \text{(EQ 24)}$$

The reader informs the decoder of the nominal scan-space position $\tilde{O}_m$ of the origin of Mnem space. In some applications this will be a fixed parameter, e.g. where the Mnem area has a fixed location relative to the edges of a card medium. In other applications the reader may utilise additional information, such as additional target structures encoded on the medium, to determine the origin dynamically.

The decoder uses the scan-space position $\tilde{O}_m$ of the origin of Mnem space to compute the nominal scan-space position $\tilde{O}_b$ of the origin of block space for the first block in each block column i:

$$\tilde{O}_b(i) = (\tilde{x}_{ob}(i), \tilde{y}_{ob}, 1)^T = \tilde{O}_m + NT_{bm}(i,0) \quad \text{(EQ 25)}$$

where $T_{bm}$ is the block space to Mnem space translation vector defined in EQ 5.

3.1.1 Detect Pilot

When the block decoder is in the <detect pilot> state, it attempts to detect the pilot at two (or more) different x locations in the scan. At each location it uses a PLL to lock onto the clock inherent in the pilot, and samples and accumulates pilot bit values according to the clock as the scan progresses. It uses the fractional y coordinate of the clock peak to linearly interpolate the bit value.

In general, assuming two adjacent scan-space samples yield clock phases $\theta_a$ and $\theta_b$ respectively, detecting a clock peak in scan space involves detecting a transition across a $2\pi$ boundary:

$$\left\lfloor \frac{\theta_a}{2\pi} \right\rfloor < \left\lfloor \frac{\theta_b}{2\pi} \right\rfloor \quad \text{(EQ 26)}$$

Once a peak is detected, its fractional scan-space displacement $\tilde{g}$ (in the x or y dimension as appropriate) is defined as follow:

$$\tilde{g} = \frac{2\pi - \text{mod}(\theta_a, 2\pi)}{2\pi - \text{mod}(\theta_a, 2\pi) + \text{mod}(\theta_b, 2\pi)} \quad \text{(EQ 27)}$$

$$\text{mod}(\theta, p) = \theta - \left\lfloor \frac{\theta}{p} \right\rfloor \quad \text{(EQ 28)}$$

where:

The decoder uses a maximum-likelihood decoder to decode the accumulated pilot sequence and detect pilot acquisition. When it acquires the pilot at two locations it computes the initial y registration and rotation $\alpha$ of the block in scan space. The decoder then enters the <await registration track> state.

Assuming two scan-space pilot acquisition points of $(\tilde{x}_a, \tilde{y}_a, 1)^T$ and $(\tilde{x}_b, \tilde{y}_b, 1)^T$, the block rotation $\alpha$ is given by:

$$\tan \alpha = \frac{\tilde{y}_b - \tilde{y}_a}{\tilde{x}_b - \tilde{x}_a} \quad \text{(EQ 29)}$$

$$\alpha = a\tan\left(\frac{\tilde{y}_b - \tilde{y}_a}{\tilde{x}_b - \tilde{x}_a}\right) \quad \text{(EQ 30)}$$

The two acquisition points have the same clock phase $\theta_p$, defined to be $2\pi H_p$ based on the first lead-in line having a phase of $2\pi$.

In general, it is useful to know the clock phase difference $\delta$ which corresponds to one scan-space unit. Given phases $\theta_u$ and $\theta_v$ measured at recent scan-space locations $(\tilde{x}, \tilde{y}_u, 1)^T$ and $(\tilde{x}, \tilde{y}_v, 1)^T$, $\delta$ is given by:

$$\delta = \frac{\theta_u - \theta_v}{\tilde{y}_u - \tilde{y}_v} \quad \text{(EQ 31)}$$

Since the frequency of all Mnem clocks is the same, $\delta$ can be computed from any recently-measured data clock phases, in either the x or y dimension.

$\delta$ is inversely proportional to the scale and rotation term X in the block space to scan space transform developed in Section 5:

$$X = S \cos\alpha \quad \text{(EQ 32)}$$
$$= \frac{2\pi}{\delta}$$

After pilot acquisition, the decoder computes the correct initial phase for each wide data clock, i.e. corresponding to the scanline immediately after pilot acquisition.

Figure 7:
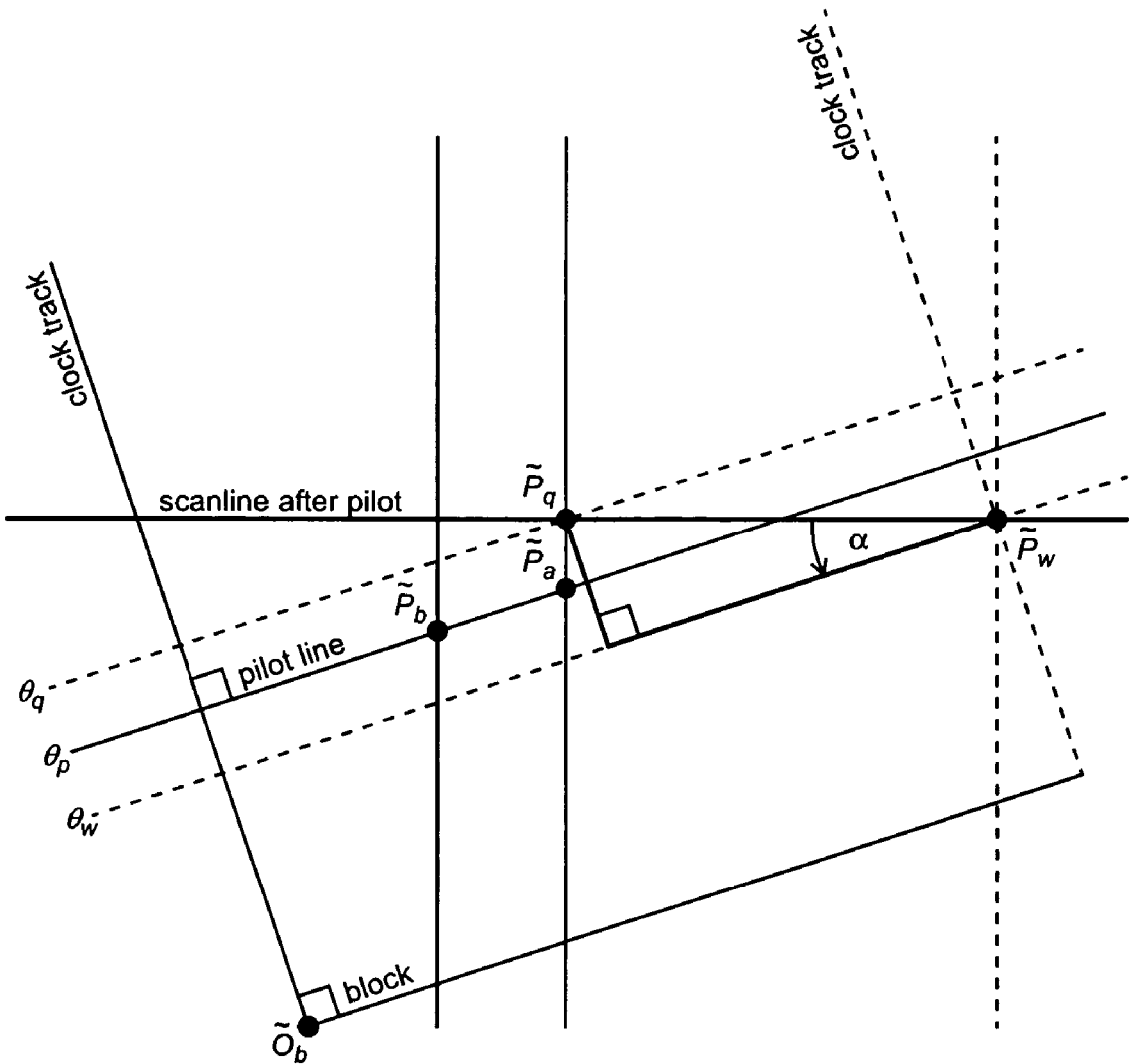
FIG. 7 is an example of the rotated block in scan space, showing pilot acquisition points.

Given the pilot processing point $\tilde{P}_q = (\tilde{x}_q, \tilde{y}_q, 1)^T$ on the next scanline after pilot acquisition, as shown in FIG. 7, the decoder computes the scan-space x coordinates $\tilde{x}_{wl}$ and $\tilde{x}_{wr}$ of the nominal centres of the left and right wide data clocks from the scan-space position $\tilde{O}_b$ of the origin of block space, the block space to scan space scale and rotation term X, and the block rotation $\alpha$:

$$\tilde{x}_{wl} = \tilde{x}_{ob} + X\frac{W_w}{2} + (\tilde{y}_q - \tilde{y}_{ob})\tan\alpha \quad \text{(EQ 33)}$$

$$\tilde{x}_{wr} = \tilde{O}_b + X\left(W_b - \frac{W_w}{2}\right) + (\tilde{y}_q - \tilde{y}_{ob})\tan\alpha \quad \text{(EQ 34)}$$

In the figure, solid lines indicate integer coordinates and dashed lines indicate fractional coordinates.

Assuming the pilot processing point $\tilde{P}_q$ has a clock phase $\theta_q$, the decoder first adjusts its clock phase relative to the known phase of the pilot before using it:

$$\theta_q' = \theta_p + \text{mod}(\theta_q, 2\pi) \quad \text{(EQ 35)}$$

Given the desired nominal scan-space x coordinate $\tilde{x}_w$ of the centre of a wide data clock, the decoder computes the correct phase $\theta_w$ for the clock:

$$\theta_w = \theta_q' - (\tilde{x}_q - \tilde{x}_w)\delta \tan\alpha \quad \text{(EQ 35)}$$

Note that if the decoder chooses to acquire the pilot at x locations which lie within the bounds of the wide data clocks, then it can continue to track the data clocks at the same x locations, with only the phase adjustment indicated by EQ 35.

The decoder continuously tracks the two data clocks throughout the subsequent decoding stages. This includes computing the intersection point of each scanline with the centre of each data clock track, as described in Section 4. The decoder uses these intersection points to compute the block space to scan space transform, as described in Section 5, and to identify which scanline pixels to use to update the data clocks.

3.1.2 Await and Detect Registration Track

In the <await registration track> state the decoder skips scanlines until the current scanline lies within the registration track. It then enters the <detect registration track> state.

In the <detect registration track> state the decoder searches for one or more registration markers within the registration track. Once it detects a good marker it computes the initial gross x registration of the block in scan space. It then uses a PLL to lock onto the clock adjacent to the marker, to determine the fine x registration of the block. The decoder may repeat this process multiple times with different markers to achieve redundancy, e.g. three times with a majority vote on the result.

The nominal scan-space position $\tilde{P}_j$ of each gross registration marker i is given by:

$$\tilde{P}_j(i) = \tilde{O}_b + N P_j(i)(1 + \sin\alpha) \quad \text{(EQ 37)}$$

This is based on the actual block-space position $P_f$ and the nominal scan-space position $\tilde{O}_b$ of the block origin.

When the decoder detects the right edge of a marker at a scan-space x coordinate $\tilde{x}_f$, it computes the corresponding marker index by solving for integer i in EQ 37:

$$i = \left\lfloor \frac{\tilde{x}_f - \tilde{x}_{ob}}{N(\Delta_f + W_f)(1 + \sin\alpha)} + 0.5 \right\rfloor \quad \text{(EQ 38)}$$

The decoder uses the marker index i to compute the correct block-space x coordinate $x_f$ of the marker using EQ 17.

Since the decoder detects the edge of a marker at a y coordinate $y_f'$ which is typically larger than the starting y coordinate $y_f$ of the marker (as given by EQ 17), the decoder adjusts the detected x coordinate $x_f$ according to the block rotation $\alpha$ and y offset:

$$x_f' = x_f + (y_f' - y_f)\tan\alpha \quad \text{(EQ 39)}$$

Since there is some uncertainty in the decoder's estimate of the scan-space x coordinate $\tilde{x}_f$ of the right edge of the marker, the decoder uses the clock adjacent to the marker to refine the estimate.

The decoder uses a PLL to lock onto and track the x registration clock. It initialises the phase of the PLL to zero, and then iterates the PLL using successive scanline pixels. Assuming the phase of the clock is $\theta_r$ at a scan-space x coordinate $\tilde{x}_r$ some distance along the scanline from the x coordinate $\tilde{x}_f$ at which the decoder detected the right edge of the marker, the decoder refines the block-space x coordinate $x_f$ using a correction factor based on the difference between the expected and actual phase at $\tilde{x}_r$:

$$x_f' = x_f + \frac{\text{mod}(\delta(\tilde{x}_r - \tilde{x}_f), \pi) - \text{mod}(\theta_r, \pi)}{\pi} \quad \text{(EQ 40)}$$

After determining x registration via the registration track, the decoder computes the correct initial phase for each narrow data clock PLL and its associated alignment PLL, i.e. corresponding to the last scanline used to acquire registration.

Given the registration processing point $\tilde{P}_s = (\tilde{x}_s, \tilde{y}_s, 1)^T$, the decoder computes the scan-space x coordinates $\tilde{x}_{cl}$ and $\tilde{x}_{cr}$ of the centres of the left and right data clocks from the scan-space position $\tilde{O}_b$ of the origin of block space, the block space to scan space scale and rotation term X, and the block rotation $\alpha$:

$$\tilde{x}_{cl} = \tilde{x}_{ob} + X\frac{W_c}{2} + (\tilde{y}_s - \tilde{y}_{ob})\tan\alpha \quad \text{(EQ 41)}$$

$$\tilde{x}_{cr} = \tilde{x}_{ob} + X\left(W_b - \frac{W_c}{2}\right) + (\tilde{y}_s - \tilde{y}_{ob})\tan\alpha \quad \text{(EQ 42)}$$

Assuming the registration processing point $\tilde{P}_s$ has a vertical clock phase $\theta_s$, and given the desired scan-space x coordinate $\tilde{x}_c$ of the centre of a data clock, the decoder computes the correct phase $\theta_c$ for the clock:

$$\theta_c = \theta_s - (\tilde{x}_s - \tilde{x}_s)\delta \tan \alpha \qquad (EQ\ 43)$$

Although phase values are computed in radians throughout this specification, in the decoder implementation it may be convenient to compute phase values in cycle or half-cycle units, and convert to radians explicitly or implicitly as required. Half-cycle units are attractive because they unify block space units and phase units.

3.1.3 Await and Decode Data

In the <await data> state the decoder skips scanlines until the current scanline intersects the data area. It then enters the <decode data> state.

In the <decode data> state the decoder attempts to decode bit data from each successive scan line.

Although two bits in adjacent data columns may have adjacent bit-encoding locations in block space, the decoder may decode these bits from different scanlines since scanlines are not in general parallel to the x axis in block space. The decoder therefore maintains a current bit index i for each data column, which identifies the encoding location of the next bit to be decoded for that column.

To decode bit data from the current scanline, the decoder visits each data column in turn and computes the fractional scan-space ("pixel") coordinates $\tilde{P}_d = (\tilde{x}_d, \tilde{y}_d, 1)^T$ of its pending bit-encoding location. To compute the coordinates of the first column's bit-encoding location, the decoder uses the block space to scan space transform M just computed from the two data clocks, as described in Section 5:

$$\tilde{P}_d(0,j) = M \cdot P_{d0} + j\tilde{d}_y \qquad (EQ\ 44)$$

To compute the coordinates of a subsequent column's bit-encoding locations, the decoder adds the column increment vector $\tilde{d}_x$ the coordinates of the previous column's bit-encoding location:

$$\tilde{P}_d(i,j) = \tilde{P}_d(i-1,j) + \tilde{d}_x \qquad (EQ\ 45)$$

If the bit index changes from one column to the next, then the decoder also adds (or subtracts) the row increment vector $\tilde{d}_y$:

$$\tilde{P}_d(i,j) = \tilde{P}_d(i-1,j\pm 1) + \tilde{d}_x \pm \tilde{d}_y \qquad (EQ\ 46)$$

If the integer portion of the pixel y coordinate of the bit-encoding location matches the y coordinate $\tilde{y}_s$ of the current scanline, i.e.:

$$\tilde{y}_s = \lfloor \tilde{y}_d \rfloor \qquad (EQ\ 47)$$

then the decoder computes the grayscale value v of the corresponding bit by bi-linearly interpolating the values of the corresponding four pixels from the current and next scanline, i.e. the four pixel values $v_{00}$, $v_{01}$, $v_{10}$, and $v_{11}$ at:

$$\tilde{P}_{00} = (\lfloor \tilde{x}_d \rfloor, \tilde{y}_s, 1)^T,\ \tilde{P}_{01} = (\lfloor \tilde{x}_d \rfloor + 1, \tilde{y}_s, 1)^T,\ \tilde{P}_{10} = (\lfloor \tilde{x}_d \rfloor, \tilde{y}_s + 1, 1)^T,\ \text{and}\ \tilde{P}_{11} = (\lfloor \tilde{x}_d \rfloor + 1, \tilde{y}_s + 1, 1)^T:$$

$$v_0 = v_{00} + f_x(v_{01} - v_{00}) \qquad (EQ\ 48)$$

$$v_1 = v_{10} + f_x(v_{11} - v_{10}) \qquad (EQ\ 49)$$

$$v = v_0 + f_y(v_1 - v_0) \qquad (EQ\ 50)$$

The interpolation factors $f_x$ and $f_y$ are the fractional parts of the encoding location's pixel coordinates:

$$f_x = \tilde{x}_d - \lfloor \tilde{x}_d \rfloor \qquad (EQ\ 51)$$

$$f_y = \tilde{y}_d - \lfloor \tilde{y}_d \rfloor \qquad (EQ\ 51)$$

The decoder computes the coordinates of the first column's bit-encoding location using the transform from block space to scan space. It computes the coordinates of subsequent columns' bit-encoding locations by adding an x delta for every column and a y delta for every column which has a different block-space y coordinate to its predecessor. Because the maximum block rotation is constrained, the maximum block-space y delta between adjacent columns is plus or minus one.

Correct thresholding of the grayscale value v to obtain the bit value is aided by knowledge of the values of neighbouring bits, since bit-encoding marks are allowed to overlap. Since subsequent bit values in the scan direction are not yet available, an un-resolved multi-level value is temporarily recorded. This is resolved into a bit value once the subsequent bit values are known.

Figure 8:
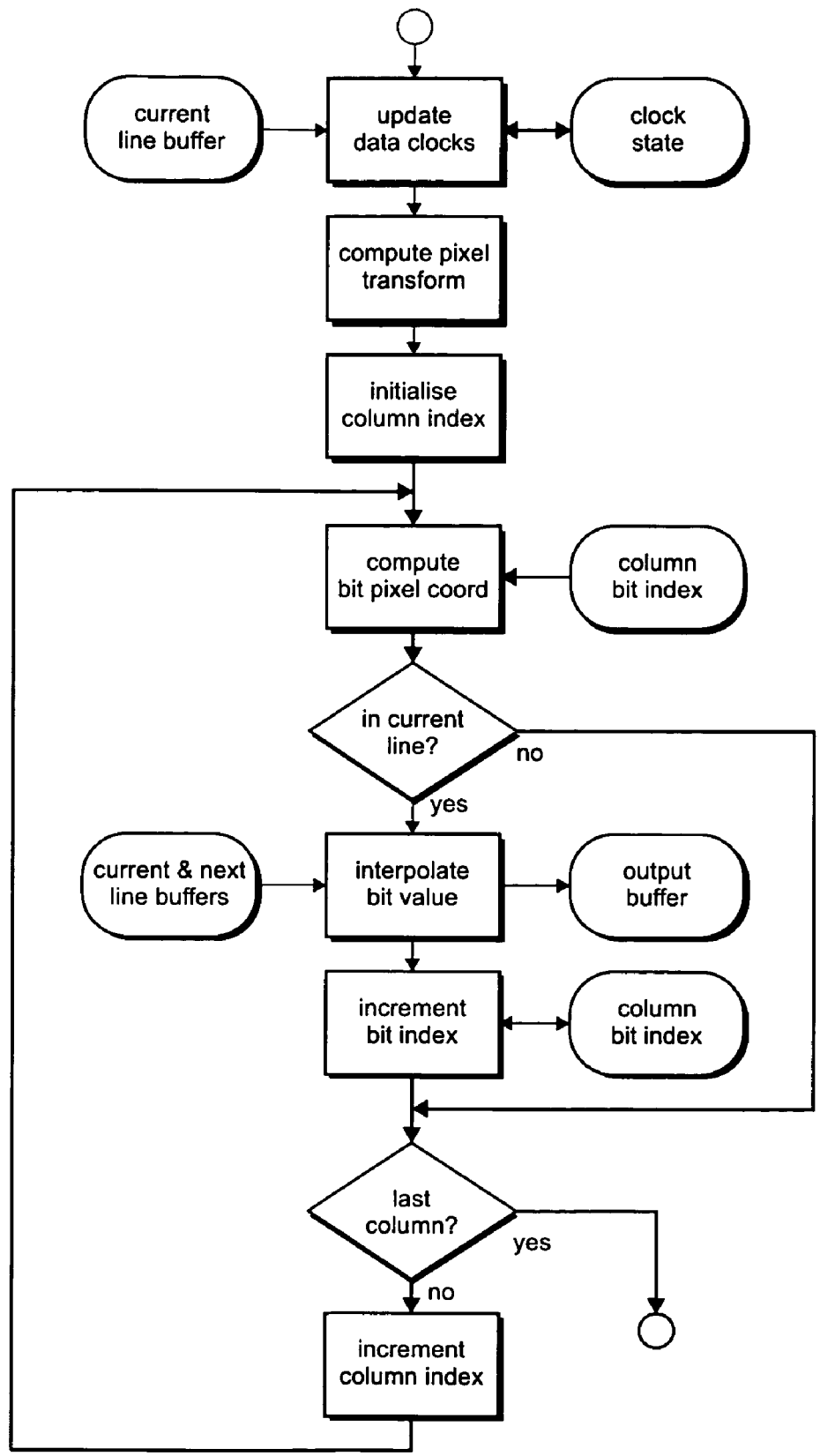
FIG. 8 is flowchart of an example of a data decoding process.

FIG. 8 shows a flowchart of the data decoding process.

Section 12 shows the distribution of imaged grayscale values for a central bit-encoding location for all possible arrangements of its eight neighbouring marks. As image blur increases, the separation between the range of possible values representing a mark and the range of possible values representing a hole decreases to zero.

Potential sources of image blur include motion blur, defocus blur, and intrinsic imaging blur. Motion blur typically occurs in the scan direction if the encoded medium is scanned while in continuous motion.

A Mnem reader typically incorporates a well-controlled imaging environment. This allows a nominal threshold separating the mark and hole ranges to be calibrated. If blur is well-controlled, then this single threshold allows accurate decoding. To deal with blur-induced ambiguity in the vicinity of the threshold, a further two thresholds are introduced above and below the first.

Once the decoder interpolates the bit-encoding value, it uses these three thresholds to assign one of four values to the bit-encoding value, representing unambiguous black, ambiguous dark gray, ambiguous light gray, or unambiguous white. The decoder therefore records two bits per output bit.

Once a given output bit's eight neighbours are available, the decoder uses a maximum-likelihood decoder to decode the correct value of the bit. A simpler decoder can be used if only two thresholds and three values (black, gray, and white) are used. Note also that bit values from the previous row and column are already resolved to a single bit.

Given the histograms shown in Section 12, typical thresholds might be 0.125, 0.25 and 0.5 respectively. These would vary with the dynamic range of the reader's actual imaging system, and might be generated dynamically based on the range of values observed during processing of the pilot, registration track, clock tracks and data.

The decoder buffers the output for each column to allow it to perform efficient word-oriented writes to external memory. It uses an address generator to compute the next output address for each data column as required, based on block number, column number, row number and word size.

As described earlier, the decoder is able to detect from the pilot when block space is 180 degrees rotated with respect to scan space, i.e. when blocks are being scanned from top to bottom rather than from bottom to top. When this is the case the decoder reverses the bit order of output words, and the address generator generates output addresses in reverse order. After raw data decoding is completed, the decoder moves the raw data in external memory so that its beginning is properly aligned.

Depending on the characteristics of the reader, both the spatial sampling period of the scan and the rotation of the block in scan space may vary due to non-linearities in the reader's mechanical transport. Since the transform which transforms block space to scan space may vary from one scanline to the next, the decoder re-computes the transform (and its corresponding deltas) for each scanline of each block, as described in Section 5.

3.2 Fault-Tolerant Data Layer Decoding

Figure 9:
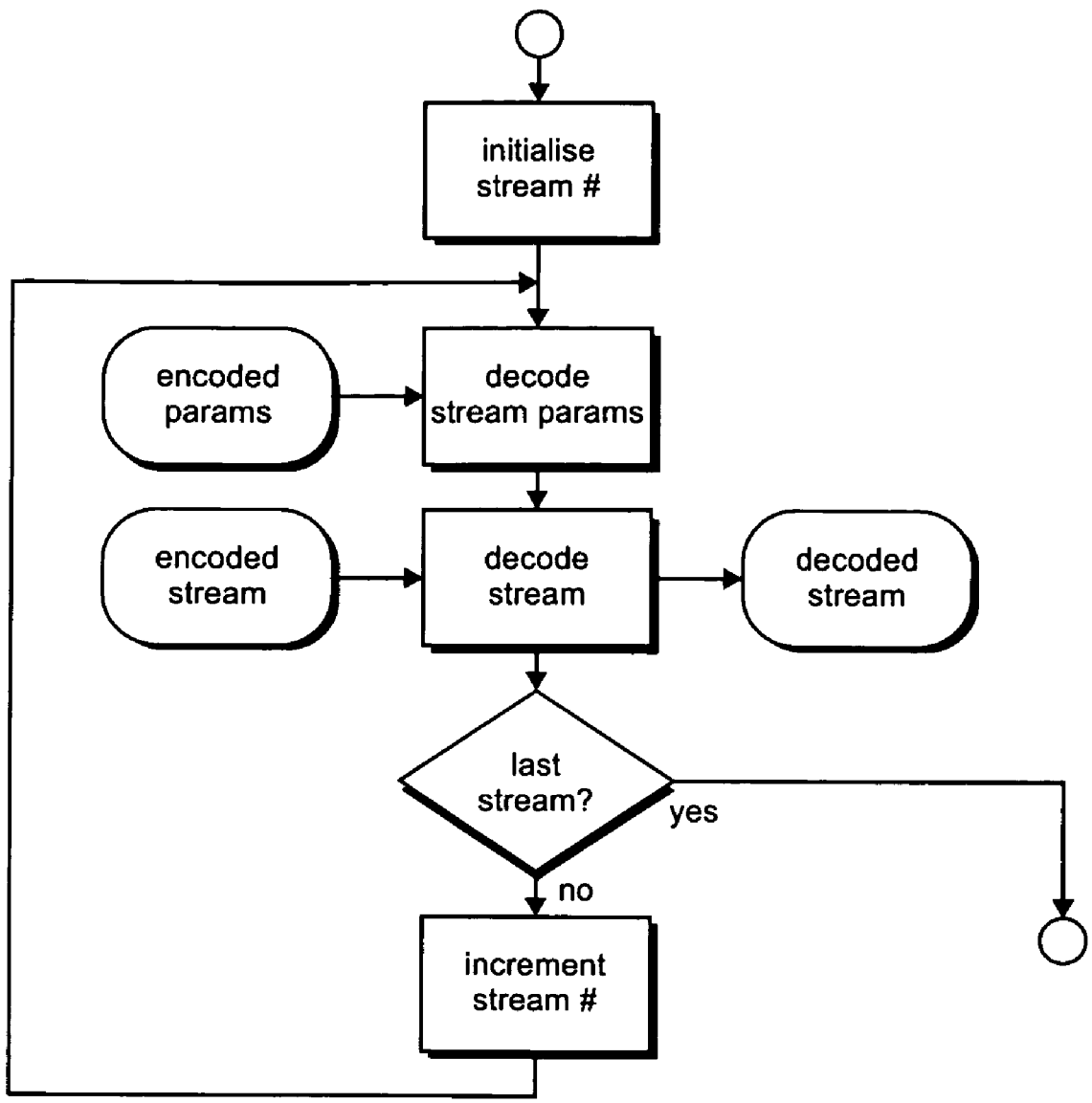
FIG. 9 is flowchart of an example of a redundancy decoding process.

Decoding of the fault-tolerant data layer consists of two repeated steps: decoding of bitstream parameters, followed by decoding of the corresponding bitstream. As shown in FIG. 9, these are repeated for each encoded bitstream until the number of raw blocks is exhausted.

The design of the Mnem decoder includes optional hardware support for these decoding functions. However, since they are not required to be performed in real time during scanning, they can also be performed by software.

3.2.1 Decode Bitstream Parameters

As described earlier, in the fault-tolerant data layer the first and last column of each block encodes the parameters of the bitstream with a CRC, replicated as many times as will fit.

During scanline decoding, the decoder writes data from these columns to a contiguous area of external memory which is separate from the main data area.

Figure 10:
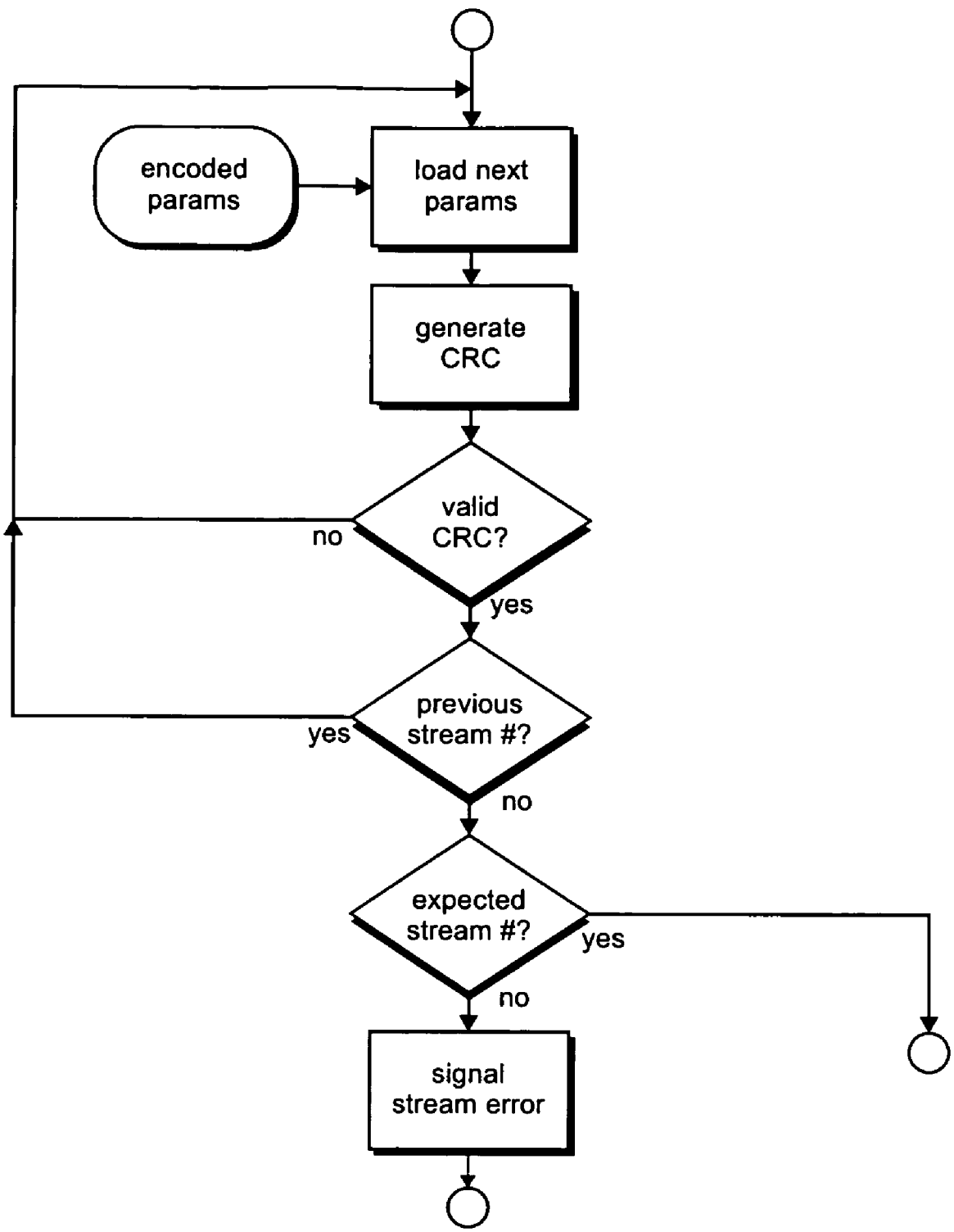
FIG. 10 is flowchart of an example of a bitstream parameters decoding process.

In preparation for redundancy decoding each bitstream, the decoder processes the bitstream parameter data sequentially to obtain a good bitstream size for that bitstream. The decoder uses the first bitstream size which has a good CRC, and ignores the rest. If a good bitstream size cannot be obtained then the decoder signals an error for that stream. The process is shown in FIG. 10.

3.2.2 Decode Bitstream

Having obtained a good bitstream size, the decoder computes the corresponding number of Reed-Solomon codewords and Mnem blocks. As described earlier, the number of codewords equals the interleave factor.

Figure 11:
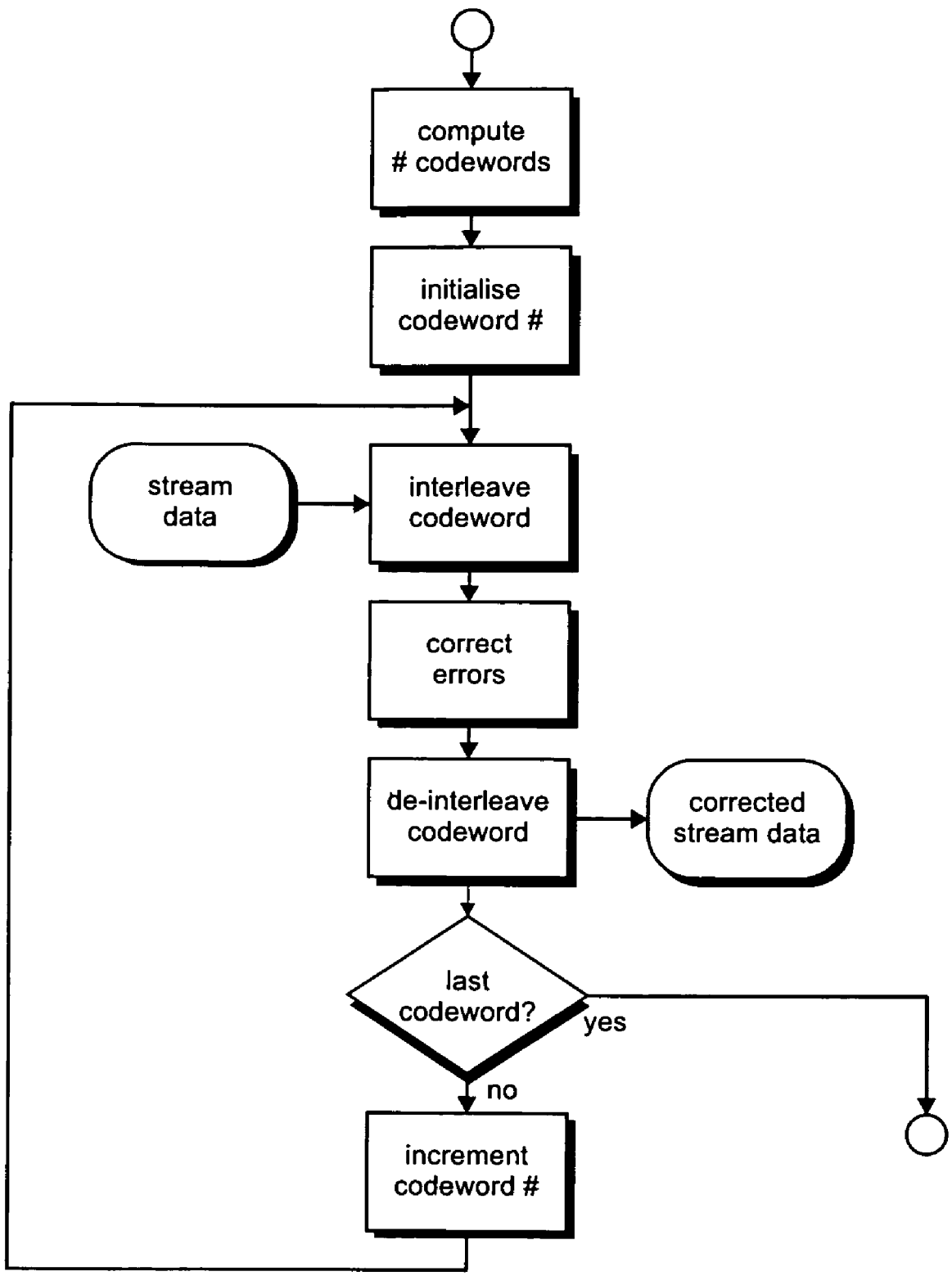
FIG. 11 is flowchart of an example of a bitstream decoding process.

The decoder uses an address generator to generate the addresses of interleaved symbols within a codeword, allowing it to interleave each codeword as it reads the codeword from external memory and de-interleave it as it writes it back. It uses a Reed-Solomon decoder to decode the codeword, and only writes the codeword back to external memory if it contains corrected errors. The process is shown in FIG. 11.

4. Track Data Clocks

The decoder continuously tracks the two data clocks throughout the subsequent decoding stages. This includes computing the intersection point of each scanline with the centre of each data clock track.

The scan-space y coordinate of the intersection point is simply the y coordinate of the scanline. Similarly, the block-space x coordinate of the intersection point is simply the x coordinate of the clock track.

The decoder uses a PLL to track each data clock. The block-space y coordinate of the intersection point is proportional to the phase $\theta_c$ of the clock:

$$y = \frac{\theta_c}{\pi} \quad \text{(EQ 53)}$$

Before the decoder acquires x registration, as described in Section 3.1.2, it predicts the scan-space x coordinate $\tilde{x}'$ of the intersection of the data clock with the new scanline from the intersection $\tilde{x}$ with the previous scanline and the block rotation α:

$$\tilde{x}' = \tilde{x}(1+\sin \alpha) \quad \text{(EQ 54)}$$

Once the decoder acquires x registration, it uses a PLL to track the alignment lines of each narrow data clock. The alignment PLL implements an accurate line-tracking servo with noise immunity. The decoder computes the scan-space x coordinate of the intersection point from the phase of the alignment PLL.

As described earlier, each data clock's two alignment lines are separated by a blank line. For the purposes of tracking the centre of the data clock from one scanline to the next, the alignment lines are treated as two ticks of a clock orthogonal to the data clock. On each new scanline, the decoder iterates each alignment PLL across the two clock ticks, i.e. over k pixels corresponding to a phase distance of about $3\pi$ or one-and-a-half clock cycles:

$$k = \left\lceil \frac{3\pi}{\delta} \right\rceil \quad \text{(EQ 55)}$$

where $\delta$ is the phase difference corresponding to one scan-space unit (EQ 31).

Before iterating the alignment PLL, the decoder copies the clock's initial phase $\theta_{I0}'$ from the final phase $\theta_I$ of the previous scanline, adjusted to account for the approximately $3\pi$ phase difference, and for the estimated phase error between one scanline and the next due to the block rotation α:

$$\theta_I' = \theta_I + \delta(k + \sin \alpha) \quad \text{(EQ 56)}$$

If the maximum block rotation $\alpha_{max}$ is small, then the effect of block rotation can be safely ignored.

The decoder preserves the alignment PLL's loop filter context (as described in Section 6) from one scanline to the next.

To initialise the alignment PLL immediately after the acquisition of x registration, the decoder computes the integer scan-space x coordinate $\tilde{x}_{I0}'$ and phase $\theta_{I0}'$ of the first pixel used to update the PLL.

The centre of the first alignment line has a defined alignment phase $\theta_{I0}$ of zero:

$$\theta_{I0} = 0 \quad \text{(EQ 57)}$$

The centre of the data clock track has a fixed alignment phase $\theta_{Ic}$ derived from the width of the clock track and a clock tick:

$$\theta_{Ic} = \pi\left(W_c - \frac{(W_{ct}-1)}{2}\right) \quad \text{(EQ 58)}$$

The fractional scan-space x coordinate $\tilde{x}_{I0}$ of the centre of the first alignment line is given by:

$$\tilde{x}_{I0} = \tilde{x}_c - \frac{(\theta_{Ic} - \theta_{I0})}{\delta} \quad \text{(EQ 59)}$$

Since the alignment PLL is updated with pixels with integer x coordinates, the decoder computes the integer scan-space x coordinate $\tilde{x}_{I0}'$ of the first pixel $$\tilde{x}_{I0}' = \lfloor \tilde{x}_{I0} + 0.5 \rfloor \quad \text{(EQ 60)}$$

and hence its phase $\theta_{I0}'$:

$$\theta_{I0}' = \theta_{I0} + \delta(\tilde{x}_{I0}' - \tilde{x}_{I0}) \quad \text{(EQ 61)}$$

Given the scan-space x coordinate $\tilde{x}_l$ and phase $\theta_l$ of the final pixel used to update the alignment PLL on a given scanline, the decoder computes the scan-space x coordinate $\tilde{x}'$ of the intersection of the data clock with the scanline from the known phase $\theta_{lc}$ of the centre of the clock track:

$$\tilde{x}' = \tilde{x}_l + \frac{(\theta_{lc} - \theta_l)}{\delta} \quad \text{(EQ 62)}$$

For the purpose of updating the data clock PLL, the decoder interpolates the pixels at $\lfloor \tilde{x}' \rfloor$ and $\lfloor \tilde{x}' \rfloor+1$, using a linear interpolation factor $\tilde{x}'-\lfloor \tilde{x}' \rfloor$, to produce the input sample to the data clock PLL. If the maximum block rotation $\alpha_{max}$ is small, then the pixel at $\lfloor \tilde{x}' \rfloor$ can be used directly rather than interpolating adjacent pixels.

When the decoder iterates the alignment PLL, it starts a fixed scan-space distance from the integer coordinate of the centre of the data clock. If the integer coordinate of centre of the data clock changes from one scanline to the next, then the decoder adjusts the initial phase of the alignment PLL accordingly, i.e. by $\pm\delta$.

5. Block Space to Scan Space Transform

The general affine transform relating block space to scan space is composed of a scale, a rotation and a translation.

The horizontal and vertical sampling rates are assumed to be equal. Actual deviations in the scanline period have little effect since all operations other than interpolation are relative to the current scanline.

Figure 12:
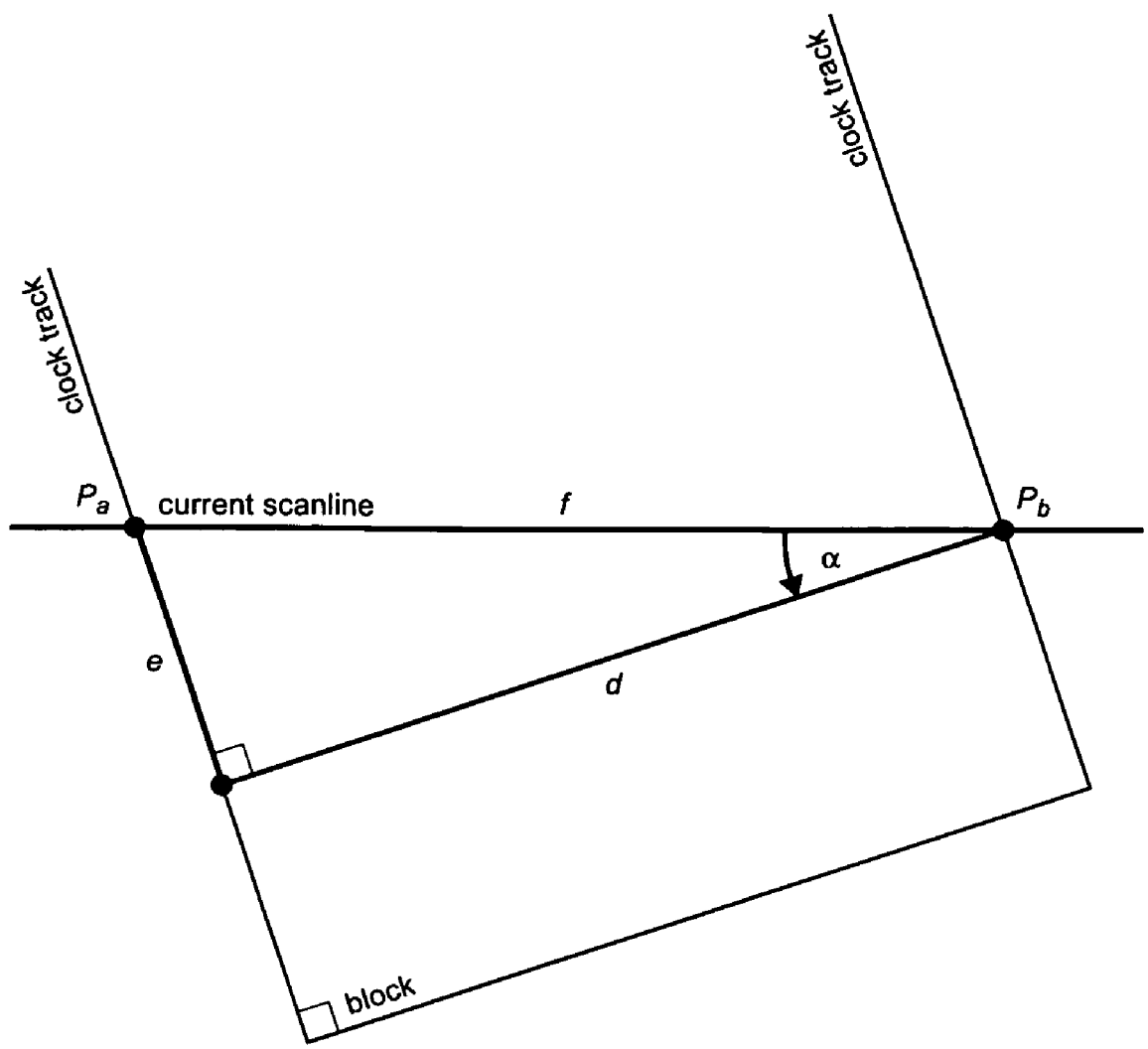
FIG. 12 is an example of a rotated block in scan space showing points of intersection between current scanline and data clocks.

FIG. 12 shows a rotated block in scan space.

In block space, let the two data clock tracks intersect the current scanline at $P_a$ and $P_b$:

$$P_a = (x_a, y_a, 1)^T \quad \text{(EQ 63)}$$

$$P_b = (x_b, y_b, 1)^T \quad \text{(EQ 64)}$$

and correspondingly in scan space:

$$\tilde{P}_a = (\tilde{x}_a, \tilde{y}_s, 1)^T \quad \text{(EQ 65)}$$

$$\tilde{P}_b = (\tilde{x}_b, \tilde{y}_s, 1)^T \quad \text{(EQ 66)}$$

where $\tilde{y}_s$ is the y coordinate of the current scanline.

The transform M relating block space to a scan space is:

$$M = \begin{bmatrix} S\cos\alpha & S\sin\alpha & T_x \\ -S\sin\alpha & S\cos\alpha & T_y \\ 0 & 0 & 1 \end{bmatrix} \quad \text{(EQ 67)}$$

where S is the scale factor and $\alpha$ is the block rotation.

Transforming a known point allows us to solve for $T_x$ and $T_y$:

$$\tilde{P}_a = M \cdot P_a \quad \text{(EQ 68)}$$

$$\begin{bmatrix} \tilde{x}_a \\ \tilde{y}_a \\ 1 \end{bmatrix} = \begin{bmatrix} S\cos\alpha x_a + S\sin\alpha y_a + T_x \\ -S\sin\alpha x_a + S\cos\alpha y_a + T_y \\ 1 \end{bmatrix} \quad \text{(EQ 69)}$$

$$T_x = \tilde{x}_a - S\cos\alpha x_a - S\sin\alpha y_a \quad \text{(EQ 70)}$$

$$T_y = \tilde{y}_a + S\sin\alpha x_a - S\cos\alpha y_a \quad \text{(EQ 71)}$$

Define orthogonal x and y displacement vectors in block space:

$$d_x = [1,0,0]^T \quad \text{(EQ 72)}$$

$$d_y = [0,1,0]^T \quad \text{(EQ 73)}$$

Transform into scan space:

$$\tilde{d}_x = M \cdot d_x \quad \text{(EQ 74)}$$

$$\tilde{d}_y = M \cdot d_y \quad \text{(EQ 75)}$$

$$\tilde{d}_x = [S\cos\alpha, -S\sin\alpha, 0]^T \quad \text{(EQ 76)}$$

$$\tilde{d}_y = [S\sin\alpha, S\cos\alpha, 0]^T \quad \text{(EQ 77)}$$

As shown in FIG. 12, let:

$$d = x_b - x_a \quad \text{(EQ 78)}$$

$$e = y_a - y_b \quad \text{(EQ 79)}$$

$$f^2 = d^2 + e^2 \quad \text{(EQ 80)}$$

$$\tilde{f} = \tilde{x}_b - \tilde{x}_a \quad \text{(EQ 81)}$$

Then:

$$\sin\alpha = \frac{e}{f} \quad \text{(EQ 82)}$$

$$\cos\alpha = \frac{d}{f} \quad \text{(EQ 83)}$$

And the scale factor S relating block space to scan space is:

$$S = \frac{\tilde{f}}{f} \quad \text{(EQ 84)}$$

Hence:

$$\tilde{d}_x = \left[\frac{\tilde{f}d}{f}, -\frac{\tilde{f}e}{f}, 0\right]^T \quad \text{(EQ 85)}$$

$$\tilde{d}_y = \left[\frac{\tilde{f}e}{f}, \frac{\tilde{f}d}{f}, 0\right]^T \quad \text{(EQ 86)}$$

Define the bit-encoding location of the $j^{th}$ bit of the $i^{th}$ data column:

$$P_d(i,j) = P_{d0} + [i,j,0]^T \quad \text{(EQ 87)}$$

$$\tilde{P}_d(i,j) = M \cdot P_d(i,j) \quad \text{(EQ 88)}$$

Its scan-space transform can be decomposed as follows:

$$\tilde{P}_d(i,j) = M \cdot P_{d0} + M \cdot [i,0,0]^T + M \cdot [0,j,0]^T \quad \text{(EQ 89)}$$

$$\tilde{P}_d(i,j) = M \cdot P_{d0} + i\tilde{d}_x + j\tilde{d}_y \quad \text{(EQ 90)}$$

This final form is suitable for incrementally computing $\tilde{P}_d$ for successive columns, since i increases by one for each successive column, and j changes by a maximum of one for each successive column.

6. Clocking and PLLS

Phase-locked loops (PLLs) are used variously to lock onto the pilot, lock onto the horizontal registration clock, track the vertical data clocks, and track the vertical data clocks' alignment lines.

All of the clocks have the same period, and the largest source of clock frequency variation is the rotation of the block in scan space. The PLLs are therefore required to support a relatively small lock range which is proportional to the sine of the maximum block rotation.

The two primary purposes of the PLLs are (a) to suppress relatively low-frequency noise due to surface damage and contamination; and (b) to track the clocks in the presence of low-frequency variation, for example due to the vagaries of the media transport mechanics, and without exact knowledge of block rotation and scale.

Different strategies may be employed for effectively imaging a Mnem area. These typically reflect trade-offs between sampling rate and sample resolution for a given data rate. At one extreme, multi-level samples of the image can be taken at close to the Nyquist rate of the image. At the other extreme, bi-level samples of the image can be taken at a correspondingly higher rate. Because of the potentially high density of a Mnem data grid, it is more practical to perform multi-level Nyquist-rate sampling.

The possibility of surface contamination and damage motivates the use of a PLL which is resistant to missing pulses. This in turn motivates the use of a level-sensitive phase detector rather than an edge-sensitive phase detector.

The Nyquist rate image sampling frequency is at least twice the frequency of the data grid. Since the various clocks' ticks are defined on odd coordinates, the sampling frequency is at least four times the clock frequency. In a Mnem reader the samples are intrinsically low-pass filtered by the optics and by the two-dimensional extent of each image sensor element. However, due to the sharp edges of the clock ticks, frequencies above the clock frequency but below half the sampling rate are likely to be present, and these can benefit from further digital-domain low-pass filtering. More generally, it is useful to band-limit the input signal to a PLL to the frequency range of interest. Depending on the design of the PLL phase detector, it may also be necessary to expand the dynamic range of the input samples to the available dynamic range, to normalise the amplitude of the input signal.

The use of an image sensor with an on-board analog-to-digital converter (ADC) and a digital interface implies a PLL with a digital design. However, with Nyquist-rate sampling, the sampling rate is too low for a conventional binary digital PLL design. Instead a digital version of a linear PLL is appropriate, operating on multi-level signals.

The pilot clock PLL is initially unlocked. A PLL design which locks quickly is therefore desired, since this allows the size of the pilot lead-in to be minimised. This motivates, but does not necessitate, the use of a phase detector which computes the phase error directly, as discussed further below. The size of the lead-in can ultimately be tuned to match the performance of the pilot clock PLL. Similar reasoning applies to the initially unlocked registration clock PLL, although the registration clock is typically not as size-constrained as the pilot. The pilot and registration clock PLLs contrast with the data clock and alignment PLLs which are both initially locked. For similar reasons it is possible to use different loop filter parameters for these various PLLs.

6.1 Discrete-Time Digital PLL

Figure 13:
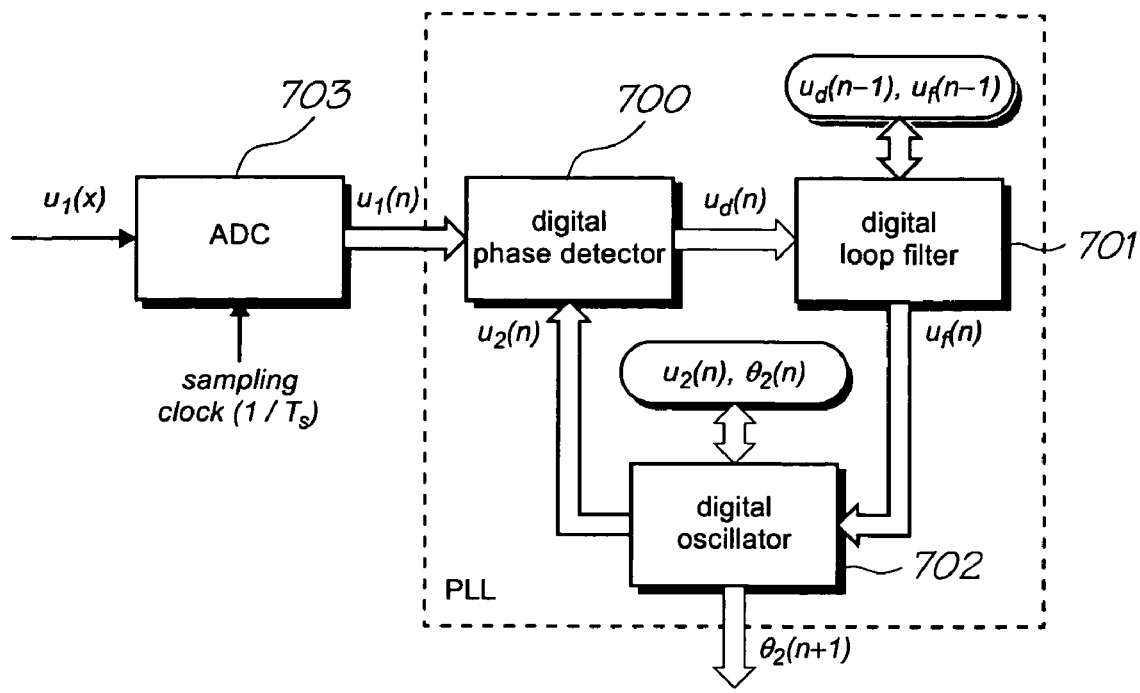
FIG. 13 is a block diagram an example of a discrete-time digital PLL

FIG. 13 shows the generic structure of a discrete-time digital PLL with a first-order loop filter, described for example in Best, R. E., *Phase-Locked Loops, Design, Simulation, and Applications*, Fifth Edition, McGraw-Hill 2003. The digital phase detector 700 generates an output signal $u_d$ which is proportional to the phase difference $\theta_e$ between the phase $\theta_1$ of the input reference signal $u_1$ and the phase $\theta_2$ of the oscillator output signal $u_2$. The digital loop filter 701 suppresses input signal noise manifest in the phase detector output, and extracts the DC component of the phase detector output as the phase error (although this latter function is sometimes performed by a separate low-pass filter, as described for example in Abramovitch, D., *Phase-Locked Loops: A Control Centric Tutorial*, Proceedings of the American Control Conference 2002). The loop filter output $u_f$ provides the control input to the digital oscillator 702, pulling it from its central frequency $\omega_0$ towards lock with the reference signal, where the frequency $\omega_2$ and phase $\theta_2$ of the oscillator match the frequency $\omega_1$ and phase $\theta_1$ of the reference signal. The PLL is clocked by the sampling clock with period $T_s$, obtained from the ADC 703.

For each input sample $u_1(n)$, the PLL is updated as follows:

$$u_d(n) \leftarrow K_d \text{PhaseDetector}(u_1(n), u_2(n)) \qquad (EQ\ 91)$$

$$u_f(n) \leftarrow -a_1 u_f(n-1) + b_0 u_d(n) + b_1 u_d(n-1) \qquad (EQ\ 92)$$

$$\theta_2(n+1) \leftarrow \theta_2(n) + (\omega_0 + K_0 u_f(n)) T_s \qquad (EQ\ 93)$$

$$u_2(n+1) \leftarrow \cos(\theta_2(n+1)) \qquad (EQ\ 94)$$

$$u_d(n-1) \leftarrow u_d(n) \qquad (EQ\ 95)$$

$$u_f(n-1) \leftarrow u_f(n) \qquad (EQ\ 96)$$

$$\theta_2(n) \leftarrow \theta_2(n+1) \qquad (EQ\ 97)$$

$$u_2(n) \leftarrow u_2(n+1) \qquad (EQ\ 98)$$

where $K_d$ and $K_0$ represents the phase detector and oscillator gains respectively.

The first-order loop filter parameters $a_1$, $b_0$ and $b_1$ are calculated to provide the desired PLL performance in the presence of noise as described for example in Best, R. E., *Phase-Locked Loops, Design, Simulation, and Applications*, Fifth Edition, McGraw-Hill 2003.

For Mnem decoder PLLs the oscillator phase $\theta_2$ is proportional to block-space displacement s:

$$s = \theta_2 / \pi \qquad (EQ\ 99)$$

6.2 Phase Detection Approaches

The input signal $u_1$ and output signal $u_2$ are modelled as follows:

$$u_1(n) = A \sin(\omega_1 x + \theta_1) \qquad (EQ\ 100)$$

$$u_2(n) = \cos(\omega_2 x + \theta_2) \qquad (EQ\ 101)$$

where:

$$x = nT_s \qquad (EQ\ 102)$$

The simplest phase detector is a multiplier. The product of the reference signal $u_1$ and oscillator signal $u_2$ has a DC level which is proportional to the sine of the phase difference between them:

$$\int u_1(n) u_2(n) dn \infty \sin(\omega_1 x - \omega_2 x + \theta_1 - \theta_2) \qquad (EQ\ 103)$$

When the PLL is frequency locked, the reference frequency $\omega_1$ and oscillator frequency $\omega_2$ are the same, and the DC level is proportional to the sine of the phase error $\theta_e$ alone:

$$\int u_1(n) u_2(n) dn \infty \sin(\theta_1 - \theta_2) = \sin(\theta_e) \qquad (EQ\ 104)$$

For small phase errors the sine of the phase error approximates the phase error itself, and this is the basis for the linearised model of the PLL:

$$u_d = K_d \sin(\theta_e) \rightarrow K_d \theta_e \text{ as } \theta_e \rightarrow 0 \qquad (EQ\ 105)$$

When the PLL is not frequency locked, then the difference between the reference frequency $\omega_1$ and oscillator frequency $\omega_2$ contributes to the phase error, pulling the oscillator towards lock.

A more economical square-wave oscillator is often used in place of a sinusoidal oscillator in conjunction with a multiplier phase detector, since the fundamental component of the Fourier series expansion of the square wave is proportional to the desired cosine term, and higher-frequency components are eliminated by the loop filter. However, for close to Nyquist-rate sampling rates, a PLL with a sinusoidal oscillator performs better.

The phase detector benefits from the availability of both in-phase I and quadrature Q signals for both the reference input and the oscillator output:

$$I_1(n) = A \cos(\omega_1 x + \theta_1) \quad \text{(EQ 106)}$$

$$Q_1(n) = u_1(n) = A \sin(\omega_2 x + \theta_1) \quad \text{(EQ 107)}$$

$$I_2(n) = u_2(n) = \cos(\omega_2 x + \theta_2) \quad \text{(EQ 108)}$$

$$Q_2(n) = \sin(\omega_2 x + \theta_2) \quad \text{(EQ 109)}$$

Minimally this allows the phase detector to compute the instantaneous sine of the phase error, which for small phase errors approximates the phase error itself (as noted above):

$$Q_1 I_2 - I_1 Q_2 = A \sin(\theta_1 - \theta_2) = A \sin(\theta_e) \quad \text{(EQ 110)}$$

In general, when the phase detector outputs a signal proportional to the sine of the phase error, the effective phase detector gain $K_d'$ is proportional to the sinc of the phase error, which diminishes to zero as the phase error approaches its maximum of $\pm \pi$:

$$K_d' = K_d \frac{\sin(\theta_e)}{\theta_e}$$

For larger phase errors, we are therefore motivated to compute the phase error directly. When the phase detector computes the phase error directly, the effective phase detector gain is independent of phase error, allowing more rapid phase lock.

The phase detector can compute the phase error directly as follows:

$$Q_1 Q_2 + I_1 I_2 = A \cos(\theta_1 - \theta_2) = A \cos(\theta_e) \quad \text{(EQ 112)}$$

$$\frac{Q_1 I_2 - I_1 Q_2}{Q_1 Q_2 + I_1 I_2} = \frac{A \sin(\theta_e)}{A \cos(\theta_e)} = \tan(\theta_e) \quad \text{(EQ 113)}$$

$$\operatorname{atan}(\tan(\theta_e)) = \theta_e \quad \text{(EQ 114)}$$

Since in-phase and quadrature signals are generally not directly available for the reference input, a Hilbert transformer can be used to generate one from the other (see for example Best, R. E., *Phase-Locked Loops, Design, Simulation, and Applications*, Fifth Edition, McGraw-Hill 2003, and Stein, J. Y., Digital Signal Processing, Wiley-Interscience, 2000). Since the frequency range of the Mnem PLLs is highly constrained, a simpler $\pi/2$ delay filter may also be used.

Many other phase detector approaches are possible, including interpolation-based detection of zero crossings, and interpolation-based detection of peaks, the design of which has been disclosed in a series of Granted patents and pending patent applications listed in the cross references above.

7. Reader Architecture

For the purposes of reader and decoder design, it is assumed that a card-based Mnem medium is transported past a linear image sensor at constant speed, the linear image sensor scans the card's Mnem area line by line, and the decoder decodes the scan data in real time during the scan.

Figure 14:
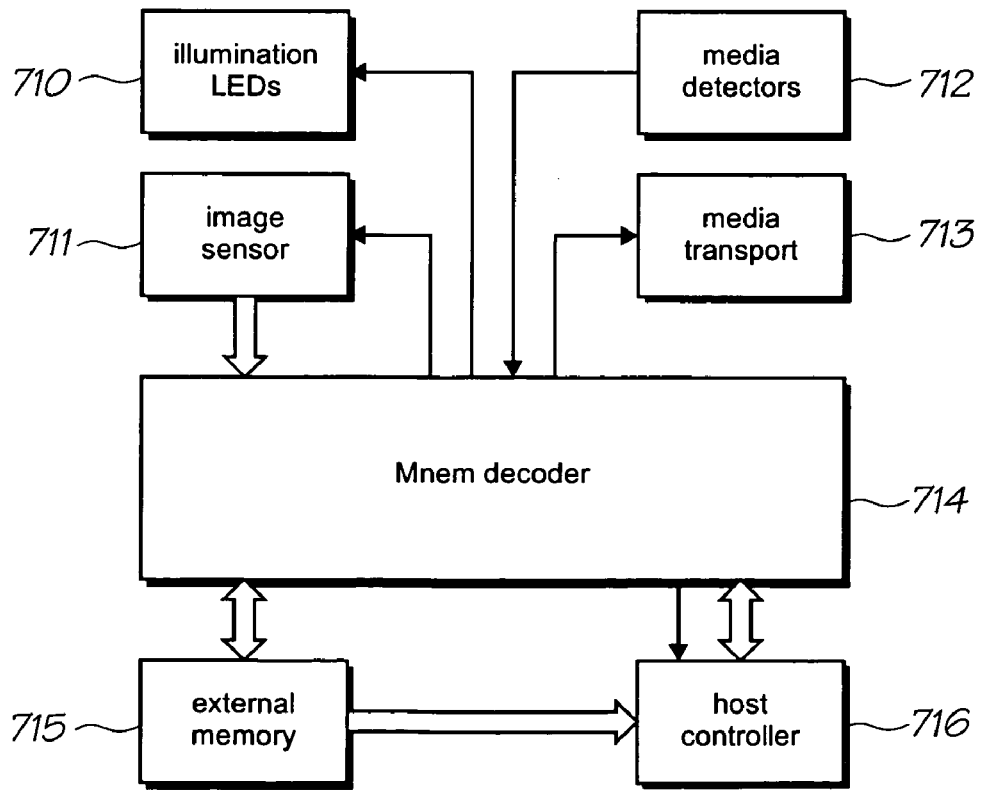
FIG. 14 is a high-level block diagram an example of a Mnem reader.

FIG. 14 shows a high-level block diagram of a Mnem reader. The reader contains an imaging system, a transport system, an integrated Mnem decoder, external memory for decoded data, and a host controller.

The reader's imaging system consists of illumination LEDs 710 and a linear image sensor 711. The reader's media transport system consists of dual media detectors 712 and a transport motor 713. Once the controller detects card insertion via the media detectors, it generates scanline clock pulses for the duration of the scan which control the exposure of the image sensor and the speed of the motor.

Each scanline clock pulse signals the image sensor to begin acquisition of the scanline. The exposure period is pre-configured in the image sensor. On each clock pulse the decoder also generates a level signal which switches on the illumination LEDs for the duration of the exposure period.

During the scan the decoder 714 writes decoded raw data to external memory 715. After the scan is complete the decoder optionally performs redundancy decoding to correct errors in the raw data. Alternatively the host controller 716 performs its own redundancy decoding.

The decoder informs the host controller of decoding completion via an interrupt (if enabled). Alternatively the host controller polls a decoder status register.

After decoding completion the host controller reads the decoded data from external memory for application-specific use.

The host controller configures operation of the decoder via a set of configuration registers. Configuration parameters include the variable parameters defined in Table 1, as well as the image sensor exposure period and decoding options. Allowable parameter ranges are decoder-specific.

7.1 Data Rates

Given a real-space transport speed $v_r$ in the direction normal to the scanline, the approximate block-space transport speed $v_m$ is given by:

$$v_m = v_r R \quad \text{(EQ 115)}$$

where R is the real-space to block-space scale factor.

The block-space data rate $r_d$ (in bits per second) is then given by:

$$r_d = W_m v_m \quad \text{(EQ 116)}$$

where $W_m$ is the block-space width of the Mnem area.

This is the rate at which the decoder generates bit values, and represents the average data rate between the decoder and external memory during raw decoding.

The scan-space transport speed $\tilde{v}_s$ (in scanlines per second) is given by:

$$\tilde{v}_s = v_m N \quad \text{(EQ 117)}$$

where N is the sampling rate.

The scan-space data rate $\tilde{r}_s$ (in samples per second) is given by:

$$\tilde{r}_s = \tilde{W}_s \tilde{v}_s \approx r_d N^2 \quad \text{(EQ 118)}$$

where $\tilde{W}_s$ is the scanline width (EQ 24).

This is the rate at which the decoder consumes samples from the image sensor, and represents the average date rate between the image sensor and the decoder during the scan.

Assuming the decoder supports a maximum scan data rate $\tilde{r}_s$, the reader can adjust the transport speed $v_r$ for a given scan width $\tilde{W}_s$ to satisfy EQ 118. This implies different static settings for readers configured for different media widths, and different dynamic settings for readers which support multiple media widths.

The minimum total scan time $t_{scan}$ for a Mnem area height $H_m$ is given by:

$$t_{scan} = \frac{H_m}{v_m} \quad \text{(EQ 119)}$$

This can be used to compute the velocity (and hence scan data rate) required to provide a particular desired scan time.

7.2 Mechanical Considerations

Scan transport only commences once the two media detectors simultaneously detect the presence of a card. This minimises the initial rotation of the card, and minimises progressive rotation due to collision between the card and the internal side walls of the transport path.

Figure 15:
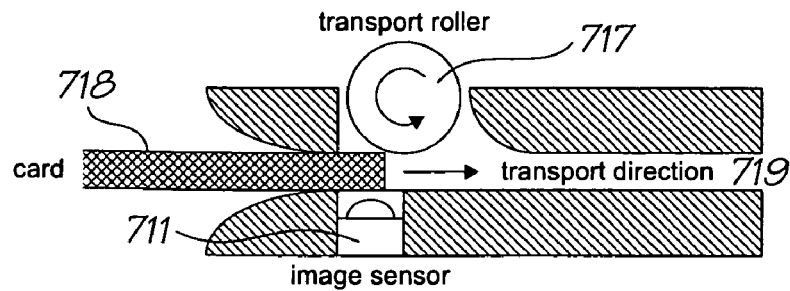
FIG. 15 is a schematic side view of an example of a media detection, image sensing and transport.

As shown FIG. 15, if the image sensor is placed close to the transport roller 717, then it may also be used for detection of the media 718 as it moves in a transport direction, as shown by the arrow 719. This has the additional advantage of allowing different media widths to be detected.

If the transport roller is sprung, e.g. to comply with different media thicknesses, then placing the image sensor close to the roller also minimises the required depth of field.

The reader may optionally incorporate a motion sensor, such as a texture displacement sensor, as described for example in Gordon, G., Seeing eye mouse for a computer system, U.S. Pat. No. 6,433,780, to allow it to synchronise scanning with the actual motion of the medium.

7.3 Imaging Considerations

The motion-induced block-space blur radius $b_v$ is a function of the transport speed $v_m$ and the exposure time $t_e$:

$$b_v = v_m t_e \quad \text{(EQ 120)}$$

Assuming a maximum allowed block-space blur radius $b_{max}$, and a blur radius $b_f$ associated with the imaging optics, the exposure time is then bounded as follows:

$$b_f + b_v \le b_{max} \quad \text{(EQ 121)}$$

$$t_e = \frac{b_v}{v_m} \le \frac{b_{max} - b_f}{v_m} \quad \text{(EQ 122)}$$

Since the allowed motion blur radius is bounded by the size of a block-space unit, the exposure time is a bounded by the block-space line time or N times the scanline time:

$$t_e \le \frac{1}{v_m} = \frac{N}{\tilde{v}_s} \quad \text{(EQ 123)}$$

In practice, to allow image sensor read-out at least once per scanline, and assuming no buffering in the image sensor, the exposure time is bounded by the scanline time less the read-out time $t_i$:

$$t_i = \frac{\tilde{W}_s}{r_i} \quad \text{(EQ 124)}$$

$$t_e \le \frac{1}{\tilde{v}_s} - t_i \quad \text{(EQ 125)}$$

where $r_i$ is the image sensor data read-out rate (in samples per second).

As discussed in Section 6, the reader uses the imaging system to perform multi-level Nyquist-rate sampling of the Mnem area. The sampling rate N is therefore normally chosen between 2 and 3.

The *Kodak KLI*-8811 8800 *Element Linear CCD Image Sensor Performance Specification*, Revision 0, Oct. 3, 2000 is an example of a linear image sensor suitable for imaging a Mnem area with a data density R of 1600 per inch, as supported by Memjet-based printers described in more detail in Section 9 below. It has a width of 8800 pixels, each 7 μm wide, giving a sampling rate N of approximately 2.3, and supporting a scan width $\tilde{W}_s$ up to approximately 62 mm.

7.4 Encoding and Printing Considerations

When the reader is part of a device which is also capable of printing Mnem areas, it can be useful to combine the Mnem encoding and decoding functions in a single integrated encoder/decoder.

Encoding is the inverse process of decoding. It consists of a redundancy encoding phase, following by a raw data encoding phase. The raw data encoding phase usefully takes place in real time during printing, to eliminate the need for buffer memory for the rendered Mnem area image.

As noted elsewhere, scanline decoding assumes and therefore requires block-space uniformity, at least locally. This in turn requires a constant print speed.

When the reader is part of a device which is capable of printing Mnem areas, it can also be useful to combine the linear image sensor and the printhead into a single integrated device. This is efficacious because the two devices have a similar form factor, they are usefully co-located in the host device since printing and scanning can share the same media transport, the linear image sensor adds only a small overhead to the printhead silicon, and device packaging and handling costs are effectively halved.

Section 8 describes a Memjet printhead with an integrated row of active pixel sensors, details of which are provided in a series of granted patents and pending patent applications, including U.S. Granted Pat. No. 6,302,528 entitled "Thermal actuated ink jet printing mechanism". All other patents and pending applications on this technology are provided in the cross-references section above. Several high-sensitivity active pixel designs which may be adapted for integration with a Memjet printhead are described in a series of patent applications U.S. Ser. Nos. 10/778,057, 10/778,061, 10/778,062, 10/778,063, 10/778,059, 10/778,060, 10/778,058, 10/778,056 filed 17 Feb. 2004, including an application entitled "Image sensor with digital framestore," the details of all other applications in this series are provided in the cross-references section above. The sampling rate N is 2.5 in the arrangement shown.

8. Printhead with Integral Image Sensor Architecture

Mnem is a robust two-dimensional optical encoding scheme for storing digital data on physical surfaces. Its data capacity scales linearly with surface area. It fundamentally supports read-only (RO) and write-once read-many (WORM)

applications, and includes the ability to append data. It incorporates optional fault tolerance to cope with real-world surface degradation.

Mnem is suitable for inkjet printing. When printed using an invisible ink such as an infrared absorptive or fluorescent ink, Mnem-encoded data may be superimposed on visible text and colour graphics. This allows, for example, a digital negative of a photograph to be invisibly superimposed on a colour print of the photograph.

When a Mnem reader is part of a device which is capable of printing Mnem areas, it is useful to combine the linear image sensor and the printhead into a single integrated device. This is efficacious because the two devices have a similar form factor, they are usefully co-located in the host device since printing and scanning can share the same media transport, the linear image sensor adds only a small overhead to the printhead silicon, and device packaging and handling costs are effectively halved.

If the printhead is only used for printing Mnem areas, then only a single row of nozzles is required.

If Mnem areas are superimposed on human-readable information such as text, graphics and images, then an invisible ink must be used. In Mnem areas are only printed in isolation, then either a visible or an invisible ink may be used.

If the Mnem printer is also used for printing human-readable information, then additional rows of nozzles must be provided for the corresponding monochrome or coloured inks. Memjet printheads, such as those discussed in Section 9 below, typically provide at least five rows of nozzles for jetting cyan, magenta, yellow, black and infrared inks.

8.1 Memjet Printhead with Integral Image Sensor

Figure 16:
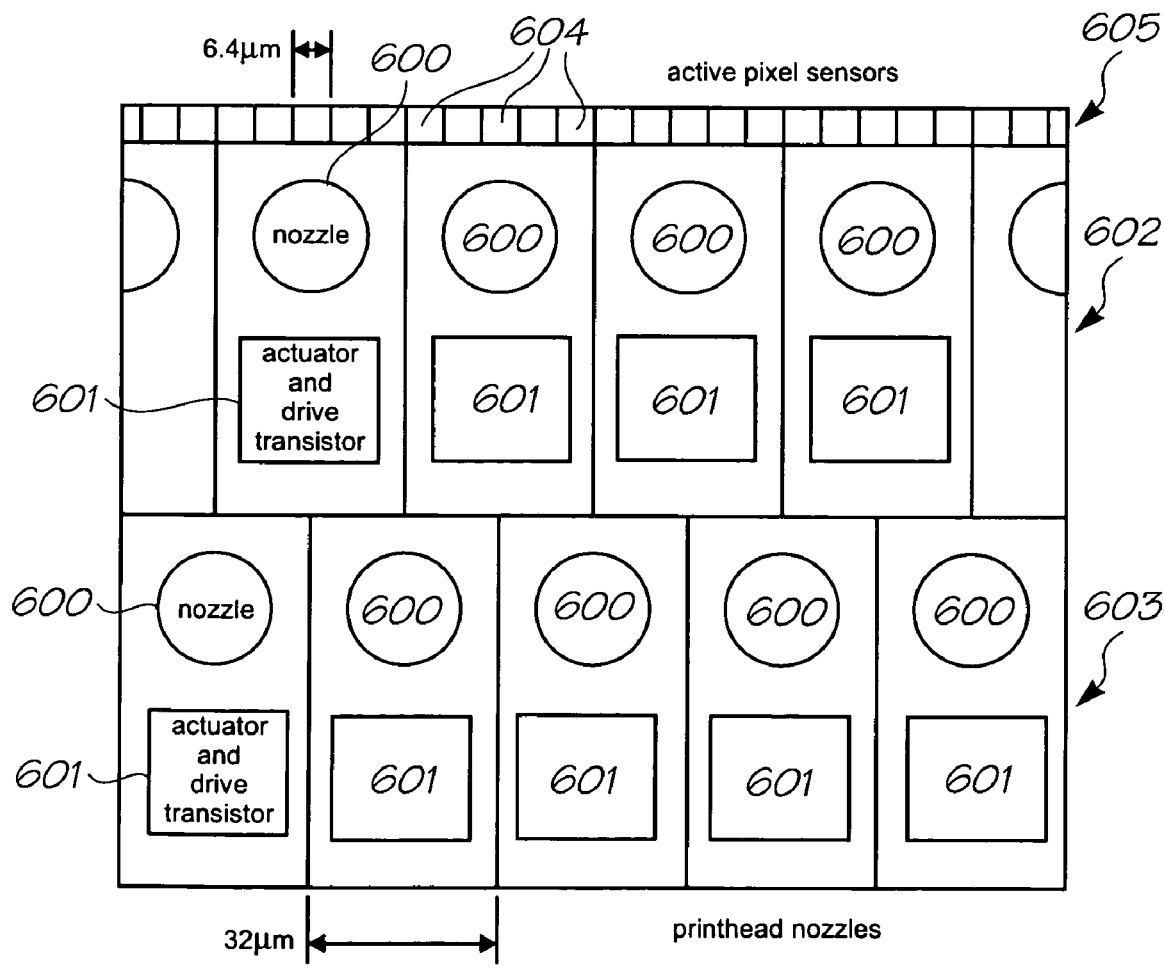
FIG. 16 is a detailed physical view of a Memjet printhead IC with an integral image sensor.

FIG. 16 shows a detailed physical view of a Memjet printhead IC with an integral image sensor. For simplicity the figure only shows a single row of 1600 dpi nozzles 600, mounted adjacent associated actuators and drive circuitry shown generally at 601. Note that because the 32-micron width of each nozzle unit cell exceeds the 16-micron dot pitch required for 1600 dpi printing, each row of nozzles is composed of two staggered half-rows 602, 603. The Mnem sampling rate N is 2.5 in the arrangement shown.

Although a Mnem area may utilise a single printed dot to represent a single encoded bit, it may also utilise more than one printed dot to represent a single encoded bit. For example, a Mnem area may utilise a 2×2 array of printed dots to represent a single bit. Thus if the printer resolution is 1600 dpi, the Mnem area resolution is only 800 dpi. In certain applications, reducing the print resolution of a Mnem area may provide more robust Mnem performance, such as in the presence of particular sources of surface degradation or damage.

If the Mnem area resolution is lower than the printer resolution, then the ratio of the pixel count to the nozzle count can be reduced accordingly, and larger pixel sensors can be employed. For example, in the case of the Memjet printhead shown in FIG. 16, a 12.8 micron pixel sensor can be utilised in place of two 6.4 micron pixel sensors.

Figure 17:
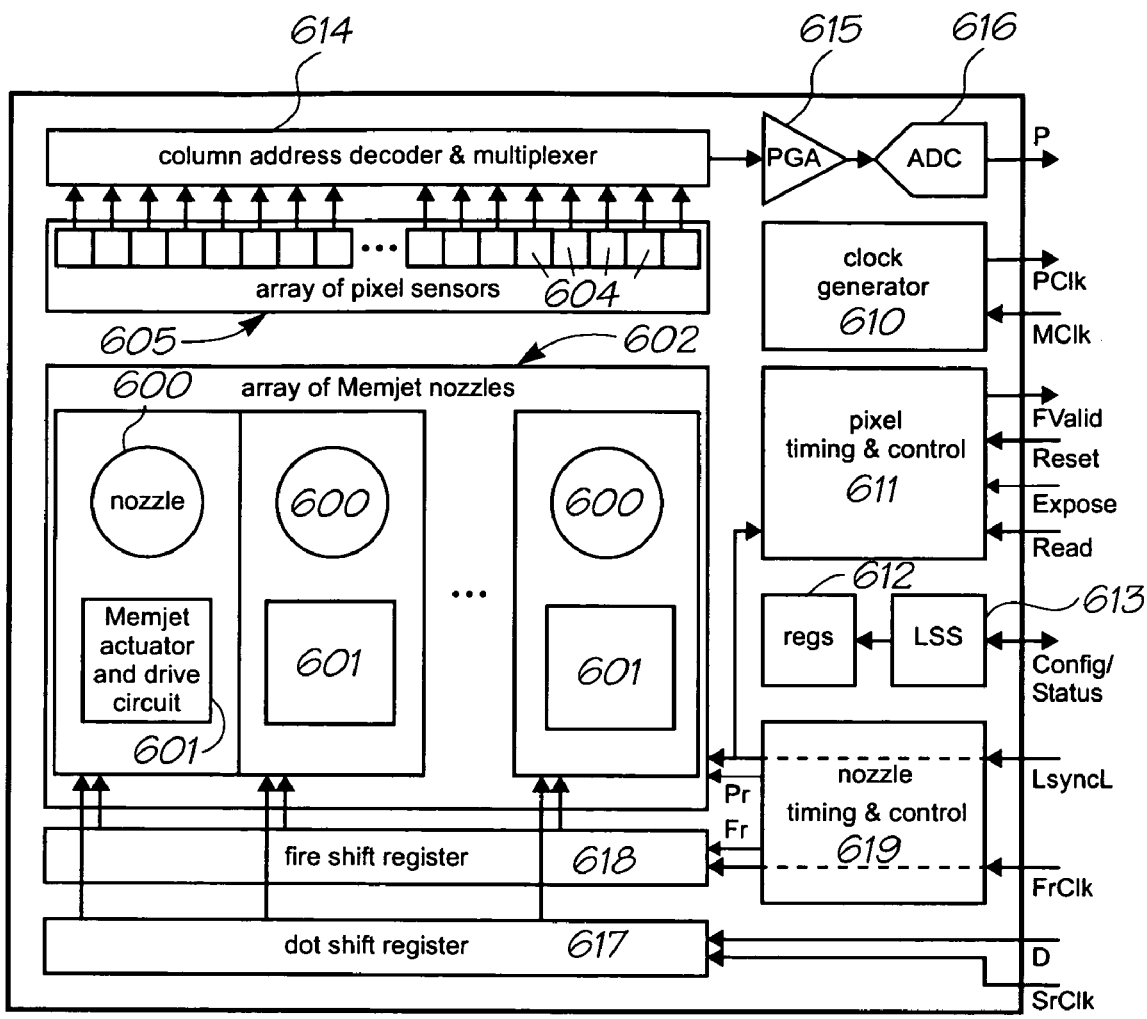
FIG. 17 is a logical view of the printhead and integral image sensor of FIG. 16.

FIG. 17 shows a logical view of the IC of FIG. 16. For simplicity the figure only shows one half-row of Memjet nozzles.

The IC exposes a number of status and configuration registers via a low-speed serial (LSS) link. These allow image capture and printing parameters to be configured and status information to be read back by an external controlling device.

8.2 Linear Image Sensor

Figure 18:
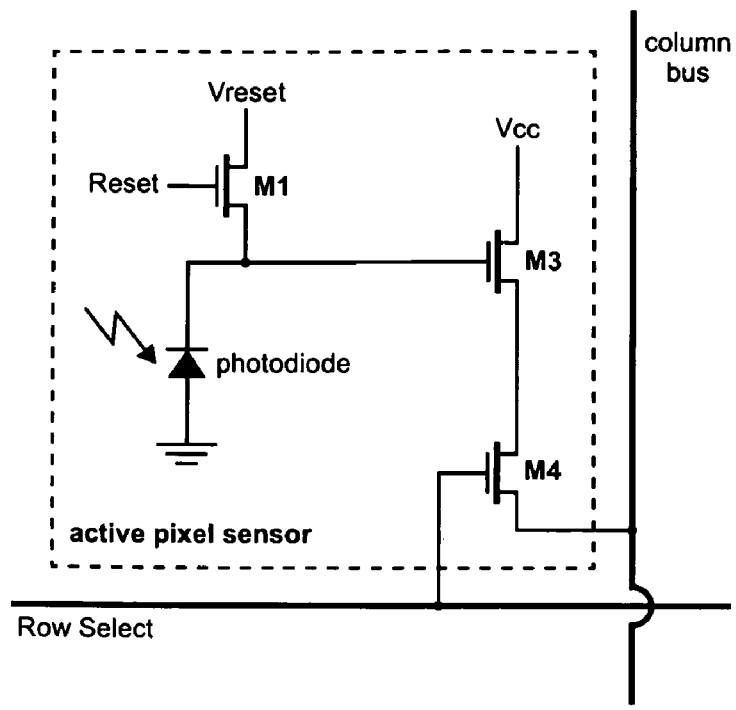
FIG. 18 is a schematic view of an example of an active pixel sensor.

The linear image sensor consists of an array of CMOS active pixel sensors (APSs) 604. Each pixel sensor may utilise a typical APS circuit as shown in FIG. 18 and discussed further below. For simplicity the figure only shows one row of pixel sensors.

In a monochrome linear image sensor only one row 605 of pixel sensors 604 is required. For example, if the sensor is only used for reading Mnem areas, then only one row of pixel sensors is required. In a colour linear image sensor multiple rows of pixel sensors may be utilised, and each row may have its own filter to select a particular wavelength range, either corresponding to a spectral colour such as red, green or blue, or to the absorption spectrum of the ink used to print the Mnem area, which may be an infrared ink. Colour filters may also be spatially interleaved within a single row to reduce the number of rows needed for colour scanning, with some loss in scan resolution. For example, the image sensor may contain a single row with red, green and blue filters, and a second row with an infrared filter.

Scan imaging typically utilises artificial illumination since it takes place inside a reader or scanner. Depending on application, the illumination may be broadband or narrowband.

Figure 19:
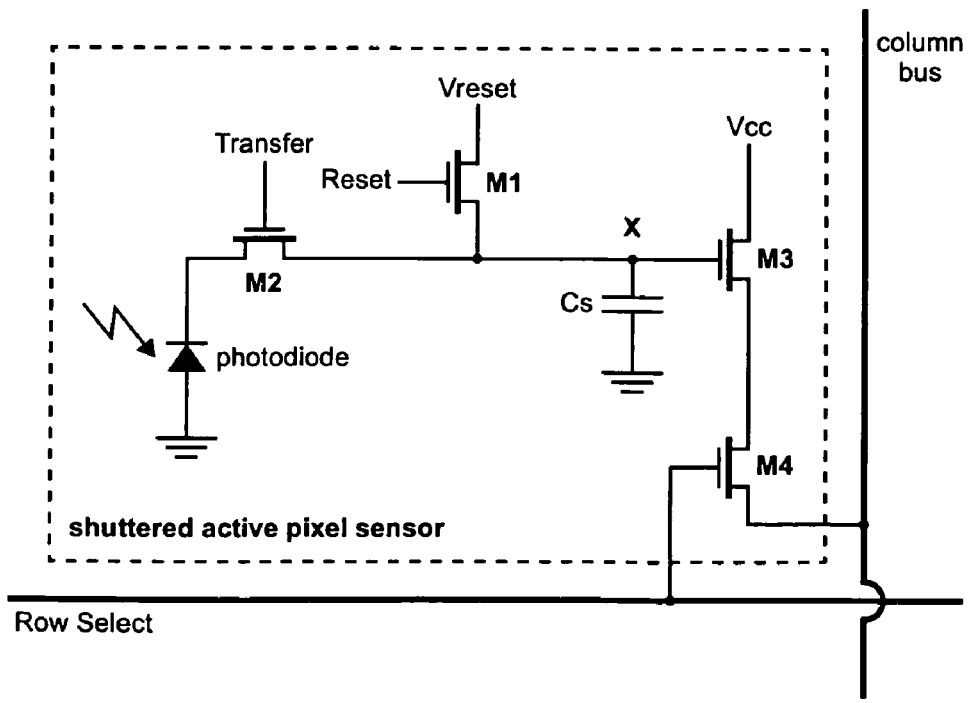
FIG. 19 is a schematic view of an example of a shuttered active pixel sensor.

Rather than (or in addition to) utilising spectral filters, multi-spectral imaging may be performed using multiple spectral light sources, for example using red, green, blue and infrared light sources. These can be strobed in rapid succession, interleaved with image readout from a single row of pixel sensors, to achieve multi-spectral imaging using only a single row of pixel sensors. Alternatively, multiple rows of pixel sensors can still be utilised, but each row can be exposed selectively in turn, in synchrony with the strobing of one spectral light source. In this case each pixel sensor may utilise a typical shuttered APS circuit as shown in FIG. 19 and discussed further below. This can have the advantage that almost simultaneous exposure of all spectral rows can be achieved, since the shuttered pixel sensors can decouple fast exposure from relatively slower readout.

A reader or scanner can support multiple scanning modes, selectable under user control, e.g. to scan colour images, scan Mnem areas, etc. A reader or scanner can also be adaptive, automatically detecting the presence of a Mnem area via a test scan in the infrared spectrum and as a result switching from colour scanning to Mnem area scanning.

The linear image sensor includes a clock generator 610 which accepts an external master clock signal (MClk) and generates a pixel clock (PClk). It may incorporate a programmable PLL and/or a clock divider or multiplier to allow it to flexibly generate the pixel clock from the master clock.

The linear image sensor operates under the control of a pixel timing and control block 611. Its configuration registers allow a number of image capture parameters to be set, including the master clock multiplier, the exposure time, and the analog offset and gain. It typically operates at the pixel clock rate or some integer multiple thereof.

The pixel control block is responsive to signals on the Reset, Expose and Read input pins to respectively reset, expose and read out the pixel sensor array. These control signals are also register-mapped and available from a register 612 via an LSS interface 613. The control block generates the appropriate timing and control signals to the pixel sensor array.

On reset, the pixel control block asserts a Reset signal to the entire pixel sensor array.

On expose, the pixel control block starts a timer with an initial value of the exposure time. If the pixel sensor array utilises shuttered pixel sensors, then the pixel control block asserts a Transfer signal for the duration of the exposure timer. If the pixel sensor array utilises non-shuttered pixel sensors, then the pixel control block may be configured to automatically trigger readout on expiry of the exposure timer.

On read, the pixel control block sequentially reads out the values of all of the pixel sensors in the array. If the linear image sensor contains more than one row of pixel sensors, as discussed earlier, then it may include a row address decoder (not shown in FIG. 17). The pixel control block generates each row address in turn, and the row address decoder decodes the row address into a unique Row Select signal. Each pixel sensor in the selected row asserts its value onto its corresponding column bus. Within each row, the pixel control block generates each column address in turn, and a column address decoder 614 decodes the column address into a unique Column Select signal which multiplexes a particular column bus onto the output stage. The output stage consists of a programmable gain amplifier (PGA) 615 followed by an analog-to-digital converter (ADC) 616. The PGA provides digital control over analog offset and gain. The ADC produces the digital pixel value which is subsequently output on a pixel-wide parallel output pins (P). The ADC typically has 8-bit or greater precision.

The pixel control block asserts the frame valid signal (FValid) on an output pin for the duration of the readout. Pixel values clocked by the pixel clock (PClk) during readout. The pixel clock is provided on the PClk output pin.

The pixel sensor array is also register-mapped via an address and data register. An individual pixel is read by writing its row and column address to the pixel address register and then reading the pixel data register.

The pixel control block supports two capture modes. In automatic mode the entire reset-expose-read cycle capture is triggered by an external line synchronisation signal (LsyncL). In manual mode each step in the capture cycle is triggered separately by its corresponding signal.

FIG. 18 shows a typical CMOS active pixel sensor, where M1 is the reset transistor, M3 is the output transistor, and M4 is the row-select transistor.

FIG. 19 shows a typical CMOS shuttered active pixel sensor, where the shuttering function is provided by the transfer transistor M2. Charge retention is provided by the parasitic capacitance at storage node X, represented by Cs. This can be augmented with explicit capacitance to increase charge retention. M2 is switched on by the Transfer signal for the duration of the pixel exposure period, after which the pixel value can be read out at leisure without contamination by further photodiode activity.

The design of an electronically-shuttered CMOS imager including enhancements to the typical shuttered APS design is described in more detail in, "Image sensor with digital framestore", U.S. patent application Ser. No. 10/778,056, filed 17 Feb. 2004, claiming priority from "Methods, systems and apparatus", Australian Provisional Patent Application 2003900746, filed 17 Feb. 2003.

8.3 Memjet Printhead

The Memjet printhead consists of an array of Memjet nozzles, each with a thermal bend or thermal bubble actuator as discussed in more detail in Section 9 below. Prior to the printing of a line of dots, the dot values for the line are shifted into a dot shift register 617 which has the same width as the line. The dot values are provided on a serial input pin (D) by the external host device, clocked by a serial clock (SrClk). On receipt of a line synchronisation signal (LsyncL), each dot value in the shift register is transferred to a dot latch associated with a corresponding nozzle. The fire enable signals for an entire line are contained in a fire shift register 618. This shift register contains a firing pattern which ensures that only a subset of nozzles fire simultaneously, to limit instantaneous power consumption. The shift register is clocked by the fire clock signal (FrClk) provided by the external host. Each nozzle's actuator is controlled by its corresponding dot value, its fire enable signal (Fr) derived from the fire shift register, and a pulse profile signal (Pr), and fires for a duration equal to the AND of these three signals.

The nozzle array is controlled by the nozzle timing and control block 619. The nozzle control block seeds the fire shift register with the firing pattern, and provides the pulse profile signal (Pr) during nozzle firing.

8.4 Multi-Segment Device

The IC is usefully designed so that multiple ICs can be abutted to form a single larger device with a correspondingly larger number of pixel sensors and nozzles. Linking Memjet printhead segments with this property are described in more detail in Section 9 below. The linking Memjet segment design is easily extended to include linking arrays of pixel sensors. Although the control and timing blocks of the IC are shown to the right of the pixel sensor and nozzle arrays in FIG. 17, they are physically laid out in the area below the pixel sensor and nozzle arrays when a linking design is desired.

Since both the pixel sensor array and nozzle array is displaced in the overlap region between two segments, hardware or software in the external controlling device must offset input image data and output print data in the overlap region according to the known transport velocity of the scan or print medium and the known array displacement.

Figure 20:
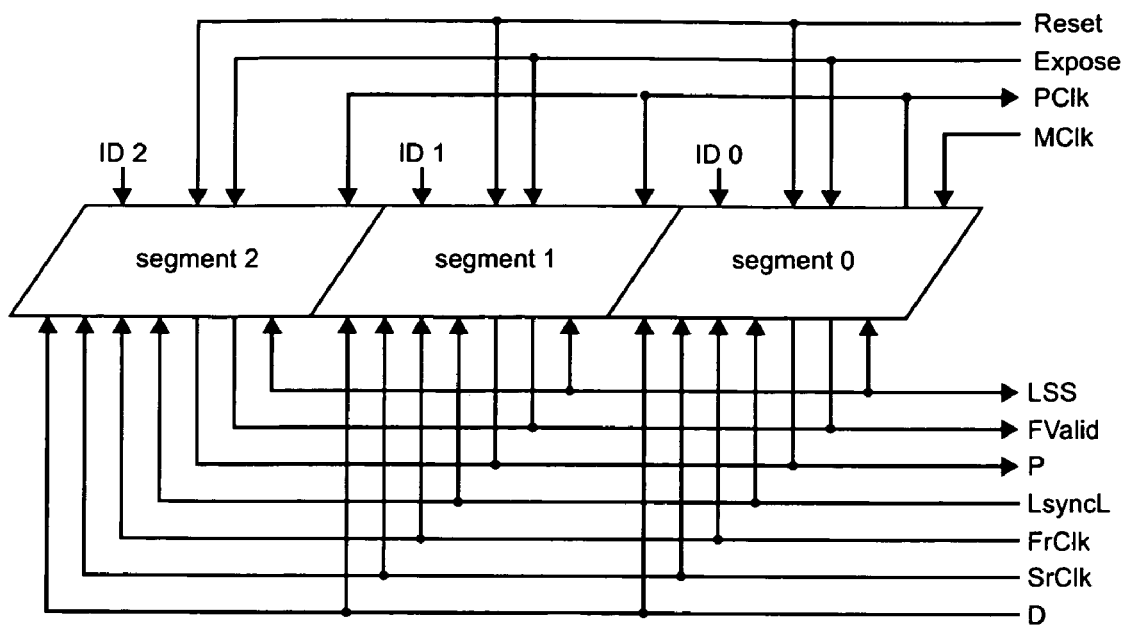
FIG. 20 is a schematic view of an example of three IC segments abutted to form a wider multi-segment device.

FIG. 20 shows three IC segments abutted to form a wider multi-segment device. Each IC has a set of ID pins which allow it to be statically configured with a unique address on the low-speed serial (LSS) bus. Segment 0 is configured to generate the pixel clock (PClk) from the master clock (MClk). The remaining segments are configured to accept the pixel clock from segment 0 as their master clock and pixel clock.

The Reset and Expose signals are routed to all segments simultaneously, but the Read signal is not used. Instead, readout from a particular segment is requested by asserting the Read flag in its control register. The pixel data output pins (P) and frame valid output pin (FValid) are normally tristated and are only driven by a segment during pixel readout.

The line synchronisation (LsyncL), fire clock (FrClk), and serial clock (SrClk) signals are routed to all segments simultaneously. The dot data lines (D) provide serial dot data to each segment in parallel.

8.5 Fabrication and Housing

Memjet nozzles and actuators are fabricated using microelectromechanical system (MEMS) fabrication techniques, as described in Section 9 below. Analog and digital electronic circuitry is fabricated using standard mixed-signal CMOS fabrication techniques. Ink channels etc. are fabricated using MEMS post-processing, also as described in Section 9 below.

Packaging of a Memjet printhead is described in Section 9 below. Post-processing and packaging of the IC for imaging purposes is discussed further here.

The linear image sensor is designed for 1:1 contact imaging. As such it requires per-pixel lensing to capture a reasonably sharp image of a scanline. Contact imaging systems typically utilise gradient-index (GRIN) rod lens arrays described for example in Bell, C. J., "Gradient index lens array assembly comprising a plurality of lens arrays optically coupled in a lengthwise direction", U.S. Pat. No. 6,011,888, issued 4 Jan. 2000, such as SELFOC™ arrays (Nippon Sheet Glass, Information Technology—Optoelectronics Products). They may also utilise clad fiber arrays (Schott A G, Leached Image Bundles), possibly with curved fiber ends for refractive focusing. Microlenses can also be applied at wafer scale as a post-processing step, where they are typically applied to increase effectively fill factor. This is described for example in Iwasaki, T. et al, "Method for producing a microlens array", U.S. Pat. No. 5,298,366, issued 29 Mar. 1994 Rhodes, H. E., "Microlens array with improved fill factor", U.S. Pat. No. 6,307,243, issued 23 Oct. 2001. However, they can also be stacked to support effective imaging (Voelker, R., M. Eisner and K. J. Weible, *"Miniaturized imaging systems"*, *Microelectronic Engineering* 67-68 (2003) 461-472).

Figure 21:
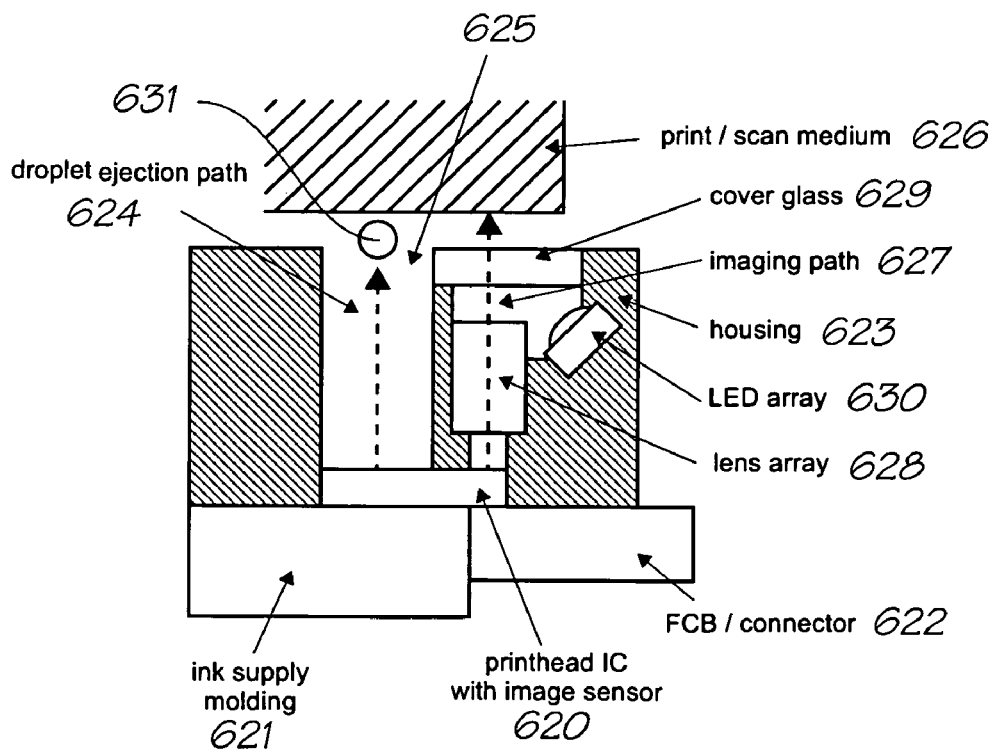
FIG. 21 is a schematic view of an example of the printhead IC packaged and mounted for printing or scanning a medium passing through the same transport mechanism.

FIG. 21 shows the printhead IC 620 packaged and mounted for both printing or scanning a medium passing through the same transport mechanism. The IC has an ink supply molding 621 connected which connects to an ink supply (not shown). It also has a flexible circuit board (FCB) 622 which connects it electrically to a host device and power.

The IC is mounted in a cavity in a housing 623 which in turn mounts flush with a transport path. In use, droplets 631 are ejected along a droplet ejection path 624 and pass through an open slot 625 in the housing 623 to allow droplets to be deposited on a print medium 626 in the transport path.

An imaging path 627 passes through an array of focusing elements 628, such as a lens array, and a cover glass 629 to image the scan medium 626 in the transport path. An array of illumination LEDs 630 are mounted at an angle below the cover glass to provide illumination of the scanline.

9. Printer Architecture

Mnem areas are preferably printed by MEMJET™ printheads. The fabrication and operation of many different MEMJET™ printheads are comprehensively described in the above cross referenced patents and applications. However, in the interests of brevity, an overview of the printhead operation and basic nozzle structures are set out below.

9.1 Printhead Assembly

Figure 22:
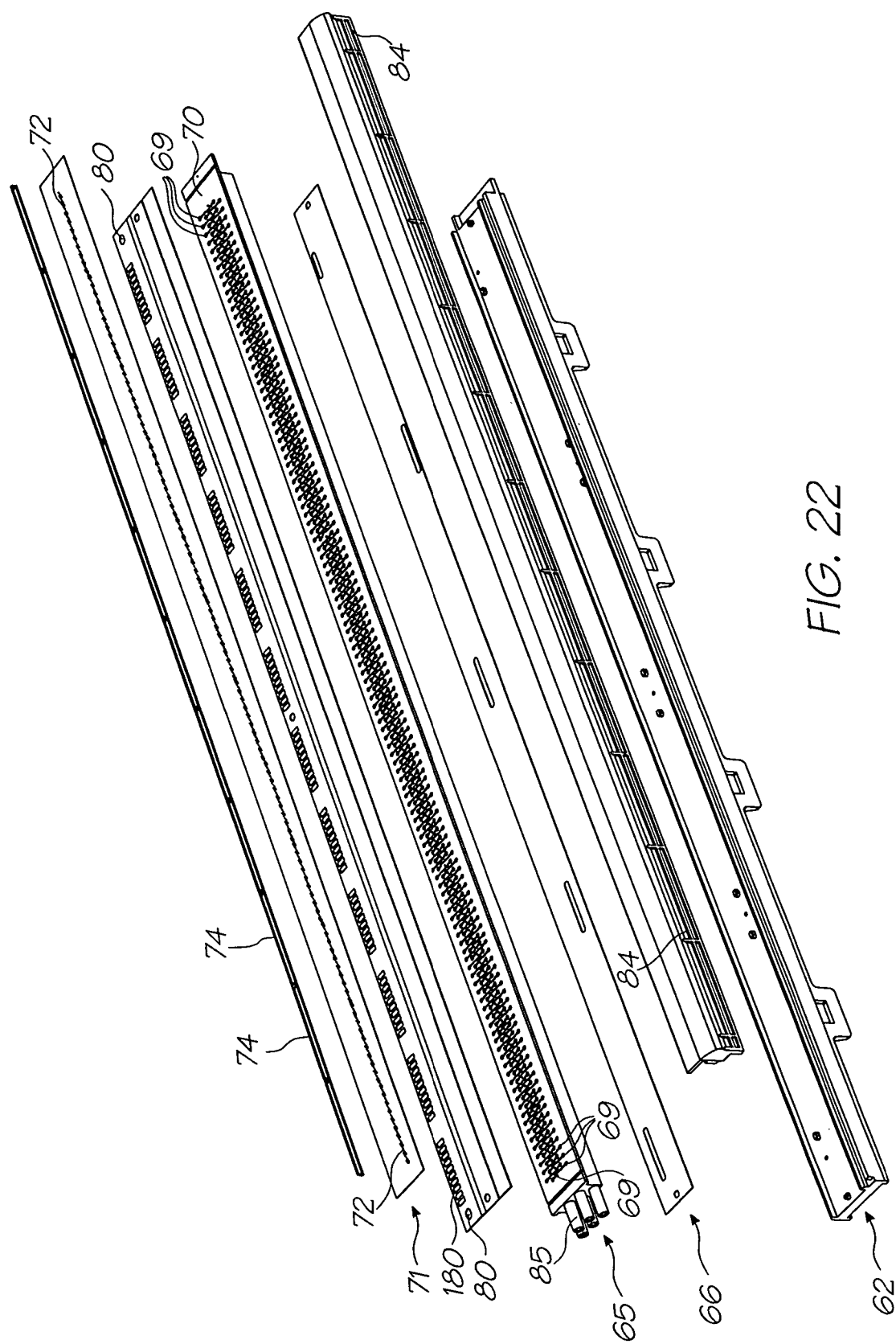
FIG. 22 is a schematic exploded perspective view of an example of a MEMJET™ printhead.

FIG. 22 is an exploded perspective of a typical MEMJET™ printhead. This particular printhead assembly is used in one of the Applicant's SOHO printers (see U.S. Ser. Nos. 11/014, 769, 11/014,729, 11/014,743, 11/014,733, 11/014,755) but it will be appreciated that Mnem areas may be printed by the many other MEMJET™ printheads disclosed in the cross referenced patents and applications.

Figure 23:
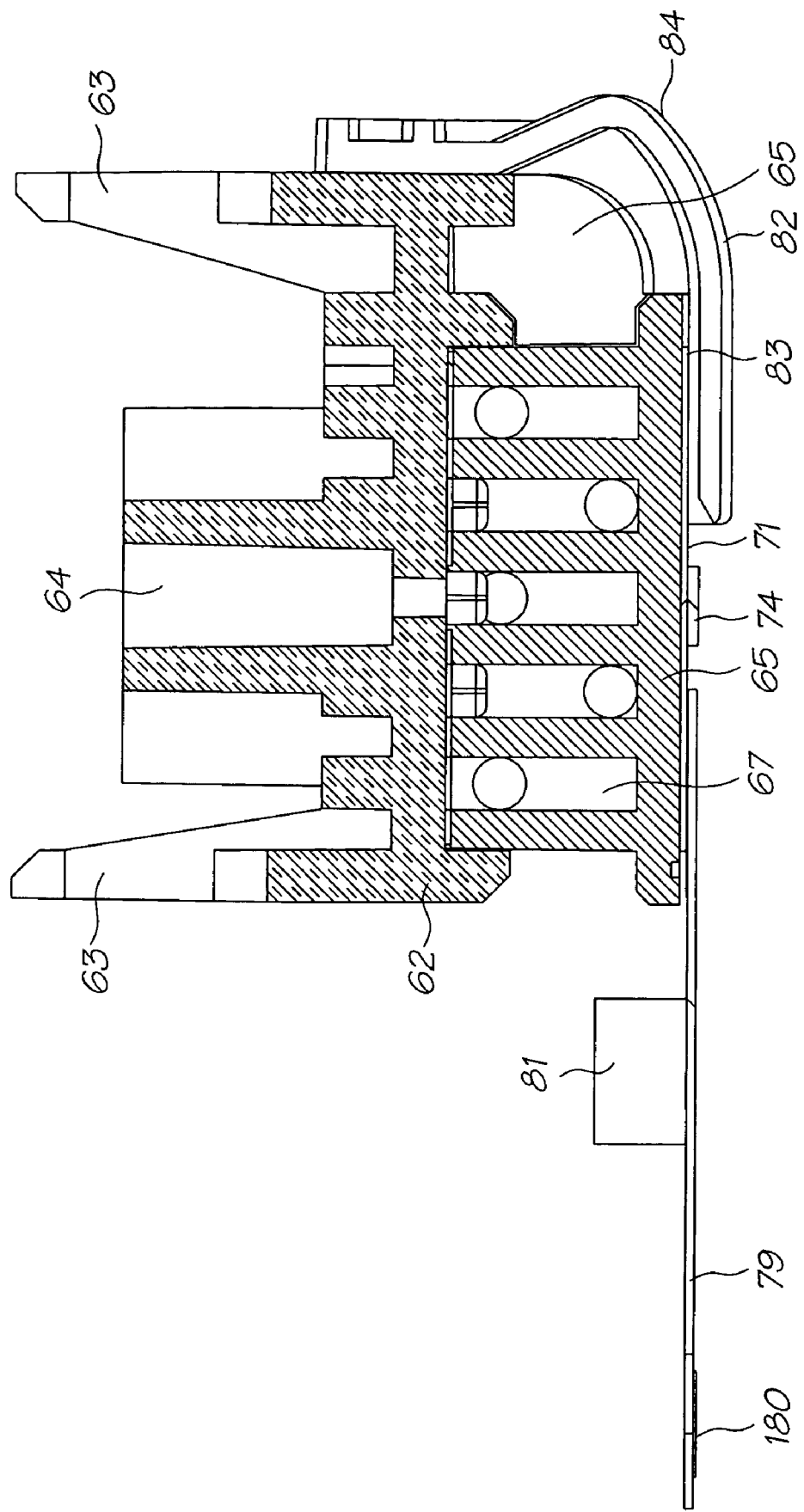
FIG. 23 is a schematic cross section of the printhead assembly of FIG. 22 in its assembled form and normal orientation.

FIG. 22 actually shows the underside of the assembly to clearly depict the ink feed system through the components to the printhead integrated circuit 74. FIG. 23 is a cross section of the printhead assembly 22 in its assembled form and normal orientation. The assembly comprises an elongate upper member 62 which is configured to mount to the printer chassis via U-shaped clips 63.

The upper element 62 has a plurality of feed tubes 64 that are received within the outlets in the outlet molding 27 when the printhead assembly 22 secures to the main body 20. The feed tubes 64 may be provided with an outer coating to guard against ink leakage.

The upper member 62 is made from a liquid crystal polymer (LCP) which offers a number of advantages. It can be molded so that its coefficient of thermal expansion (CTE) is similar to that of silicon. It will be appreciated that any significant difference in the CTE's of the printhead integrated circuit 74 (discussed below) and the underlying moldings can cause the entire structure to bow. However, as the CTE of LCP in the mold direction is much less than that in the non-mold direction (5 ppm/° C. compared to 20 ppm/° C.), care must be take to ensure that the mold direction of the LCP moldings is unidirectional with the longitudinal extent of the printhead integrated circuit (IC) 74. LCP also has a relatively high stiffness with a modulus that is typically 5 times that of 'normal plastics' such as polycarbonates, styrene, nylon, PET and polypropylene.

As best shown in FIG. 23, upper member 62 has an open channel configuration for receiving a lower member 65, which is bonded thereto, via an adhesive film 66 (see FIG. 22). The lower member 65 is also made from an LCP and has a plurality of ink channels 67 formed along its length. Each of the ink channels 67 receive ink from one of the feed tubes 64, and distribute the ink along the length of the printhead assembly 22. The channels are 1 mm wide and separated by 0.75 mm thick walls.

The lower member 65 has five channels 67 extending along its length. Each channel 67 receives ink from only one of the five feed tubes 64, which in turn receives ink from respective ink storage reservoirs to reduce the risk of mixing different colored inks. Adhesive film 66 also acts to seal the individual ink channels 67 to prevent cross channel mixing of the ink when the lower member 65 is assembled to the upper member 62.

Figure 24:
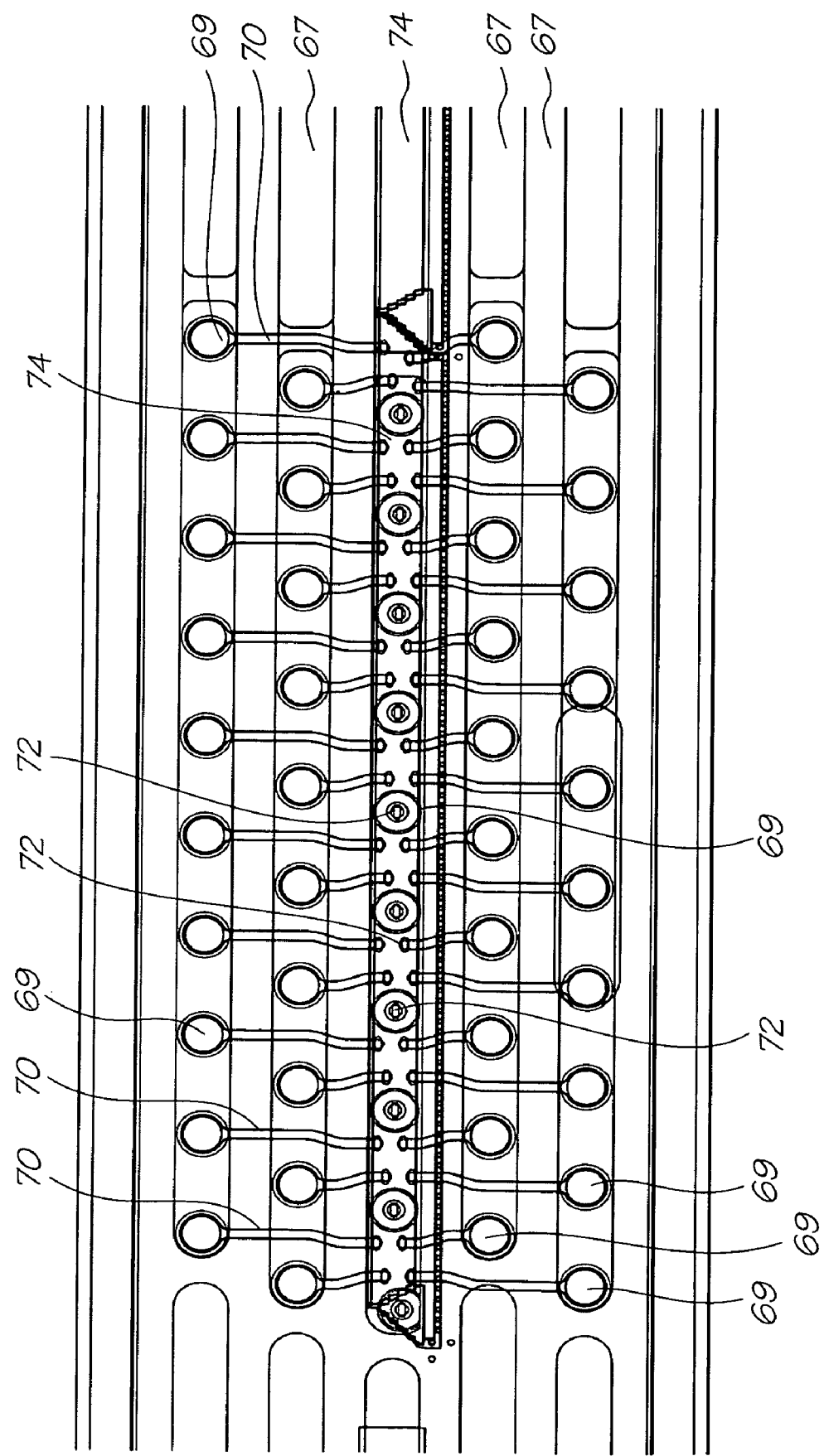
FIG. 24 is a schematic plan view of the printhead IC of FIG. 22.

A series of equi-spaced holes in five rows along the bottom of each channel 67 lead to holes 69 shown in the bottom surface of the lower member 65. An enlarged view of these holes 69 is shown in FIG. 24. The middle row of holes 69 extends along the centre-line of the lower member 65, directly above the printhead IC 74. Other rows of holes 69 on either side of the middle row need conduits 70 from each hole 69 to the centre so that ink can be fed to the printhead IC 74.

The printhead IC 74 is mounted to the underside of the lower member 65 by a polymer sealing film 71. This film may be a thermoplastic film such as a PET or Polysulphone film, or it may be in the form of a thermoset film, such as those manufactured by AL technologies and Rogers Corporation. The polymer sealing film 71 is a laminate with adhesive layers on both sides of a central film, and laminated onto the underside of the lower member 65. The holes 72 are laser drilled through the adhesive film 71 to coincide with the centrally disposed ink delivery points (the middle row of holes 69 and the ends of the conduits 70) for fluid communication between the printhead IC 74 and the channels 67.

The thickness of the polymer sealing film 71 is critical to the effectiveness of the ink seal it provides. The polymer sealing film seals the etched channels 77 on the reverse side of the printhead IC 74, as well as the conduits 70 on the other side of the film. However, as the film 71 seals across the open end of the conduits 70, it can also bulge or sag into the conduit. The section of film that sags into a conduit 70 runs across several of the etched channels 77 in the printhead IC 74. The sagging may cause a gap between the walls separating each of the etched channels 77. Obviously, this breaches the seal and allows ink to leak out of the printhead IC 74 and or between etched channels 77.

To guard against this, the polymer sealing film 71 should be thick enough to account for any sagging into the conduits 70 while maintaining the seal over the etched channels 77. The minimum thickness of the polymer sealing film 71 will depend on:

1. the width of the conduit into which it sags;
   2. the thickness of the adhesive layers in the film's laminate structure;
   3. the 'stiffness' of the adhesive layer as the printhead IC 74 is being pushed into it; and,
   4. the modulus of the central film material of the laminate.

A polymer sealing film 71 thickness of 25 microns is adequate for the printhead assembly 22 shown. However, increasing the thickness to 50, 100 or even 200 microns will correspondingly increase the reliability of the seal provided.

Ink delivery inlets 73 are formed in the 'front' surface of a printhead IC 74. The inlets 73 supply ink to respective nozzles 801 (described below with reference to Figures F to J) positioned on the inlets. The ink must be delivered to the IC's so as to supply ink to each and every individual inlet 73. Accordingly, the inlets 73 within an individual printhead IC 74 are physically grouped to reduce ink supply complexity and wiring complexity. They are also grouped logically to minimize power consumption and allow a variety of printing speeds.

Each printhead IC 74 is configured to receive and print five different colors of ink (C, M, Y, K and IR) and contains 1280 ink inlets per color, with these nozzles being divided into even and odd nozzles (640 each). Even and odd nozzles for each color are provided on different rows on the printhead IC 74 and are aligned vertically to perform true 1600 dpi printing, meaning that nozzles 801 are arranged in 10 rows, as clearly shown in FIG. 25. The horizontal distance between two adjacent nozzles 801 on a single row is 31.75 microns, whilst the vertical distance between rows of nozzles is based on the firing order of the nozzles, but rows are typically separated by an exact number of dot lines, plus a fraction of a dot line corresponding to the distance the paper will move between row firing times. Also, the spacing of even and odd rows of nozzles for a given color must be such that they can share an ink channel, as will be described below.

As alluded to previously, the present invention is related to page-width printing and as such the printhead ICs 74 are arranged to extend horizontally across the width of the printhead assembly 22. To achieve this, individual printhead ICs 74 are linked together in abutting arrangement across the surface of the adhesive layer 71. The printhead IC's 74 may be attached to the polymer sealing film 71 by heating the IC's above the melting point of the adhesive layer and then pressing them into the sealing film 71, or melting the adhesive layer under the IC with a laser before pressing them into the film. Another option is to both heat the IC (not above the adhesive melting point) and the adhesive layer, before pressing it into the film 71.

The length of an individual printhead IC 74 is around 20-22 mm. To print an A4/U.S. letter sized page, 11-12 individual printhead ICs 74 are contiguously linked together. The number of individual printhead ICs 74 may be varied to accommodate sheets of other widths.

Figure 25:
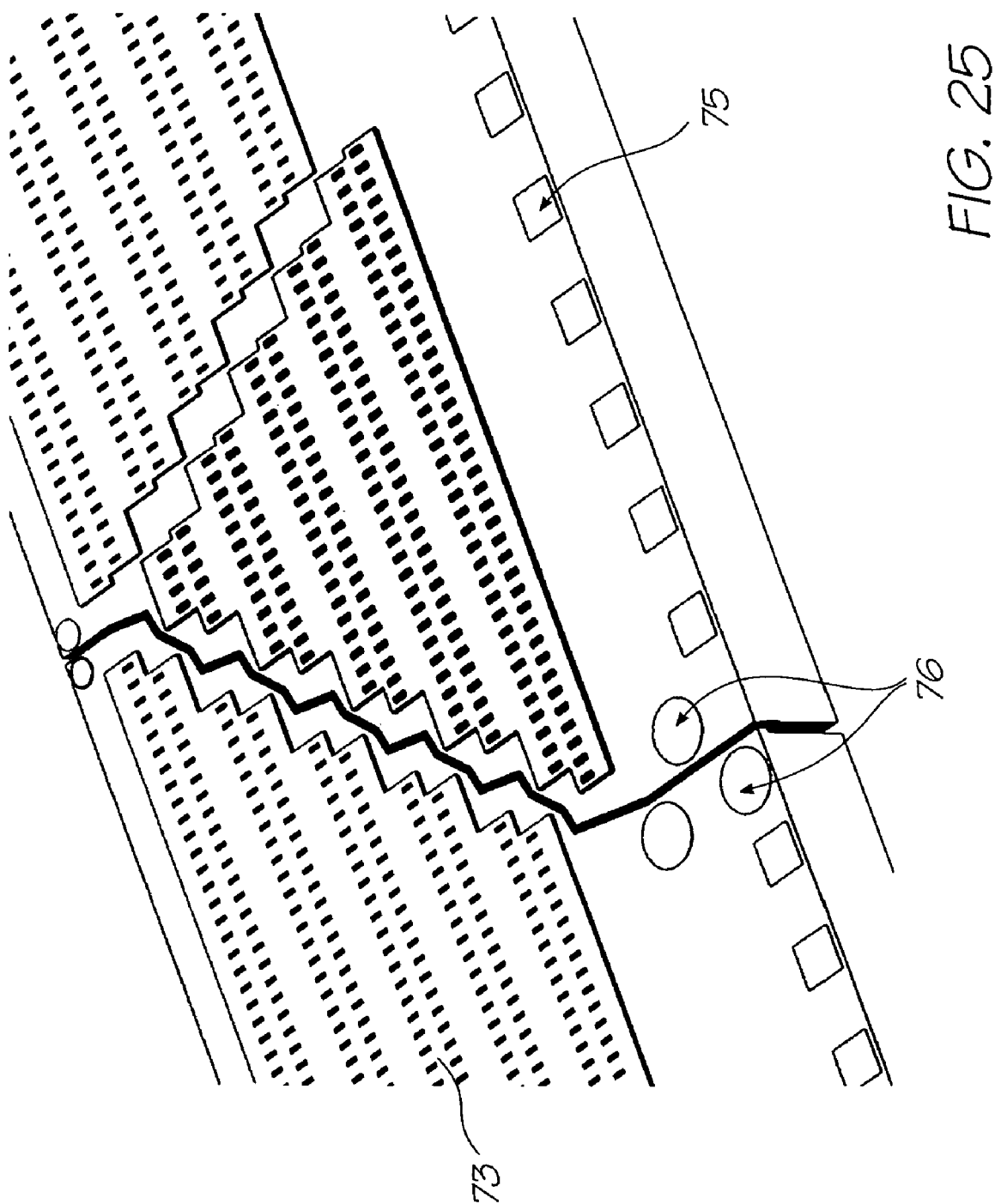
FIG. 25 is a schematic plan view of an example of a linking of printhead ICs.

The printhead ICs 74 may be linked together in a variety of ways. One particular manner for linking the ICs 74 is shown in FIG. 25. In this arrangement, the ICs 74 are shaped at their ends to link together to form a horizontal line of ICs, with no vertical offset between neighboring ICs. A sloping join is provided between the ICs having substantially a 45° angle. The joining edge is not straight and has a sawtooth profile to facilitate positioning, and the ICs 74 are intended to be spaced about 11 microns apart, measured perpendicular to the joining edge. In this arrangement, the left most ink delivery nozzles 73 on each row are dropped by 10 line pitches and arranged in a triangle configuration. This provides a degree of overlap of nozzles at the join and maintains the pitch of the nozzles to ensure that the drops of ink are delivered consistently along the printing zone. It also ensures that more silicon is provided at the edge of the IC 74 to ensure sufficient linkage.

Control of the operation of the nozzles is performed by the SoPEC (SOHO Print Engine Controller). It can compensate for the nozzles in the drop triangle, or this can be performed in the printhead, depending on the storage requirements. It will be appreciated that the dropped triangle arrangement of nozzles disposed at one end of the IC 74 provides the minimum on-printhead storage requirements. However where storage requirements are less critical, shapes other than a triangle can be used, for example, the dropped rows may take the form of a trapezoid.

The upper surface of the printhead ICs have a number of bond pads 75 provided along an edge thereof which provide a means for receiving data and or power to control the operation of the nozzles 73 from the SoPEC device. To aid in positioning the ICs 74 correctly on the surface of the adhesive layer 71 and aligning the ICs 74 such that they correctly align with the holes 72 formed in the adhesive layer 71, fiducials 76 are also provided on the surface of the ICs 74. The fiducials 76 are in the form of markers that are readily identifiable by appropriate positioning equipment to indicate the true position of the IC 74 with respect to a neighboring IC and the surface of the adhesive layer 71, and are strategically positioned at the edges of the ICs 74, and along the length of the adhesive layer 71.

Figure 26:
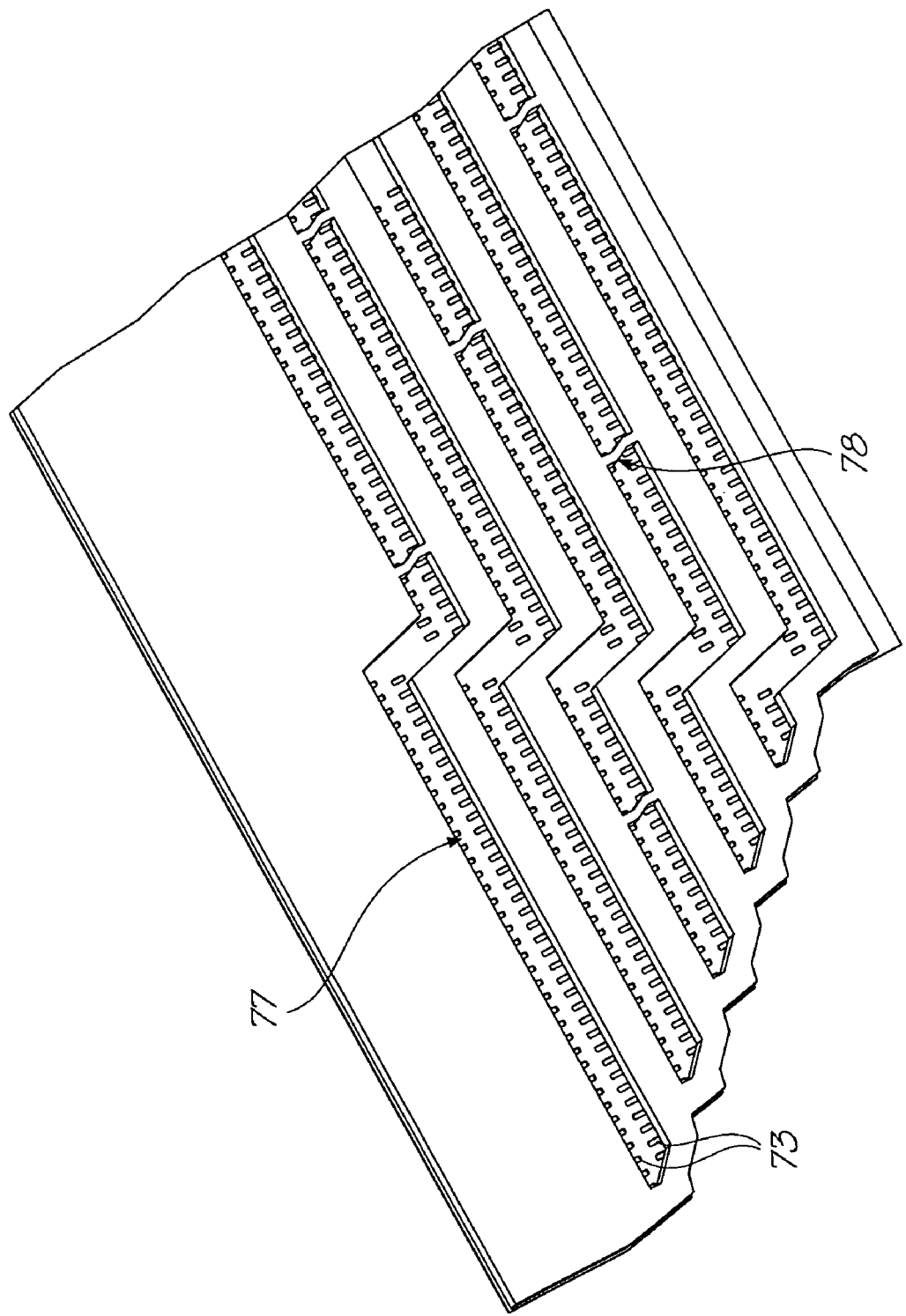
FIG. 26 is a schematic underside view of an example of the printhead ICs.

In order to receive the ink from the holes 72 formed in the polymer sealing film 71 and to distribute the ink to the ink inlets 73, the underside of each printhead IC 74 is configured as shown in FIG. 26. A number of etched channels 77 are provided, with each channel 77 in fluid communication with a pair of rows of inlets 73 dedicated to delivering one particular color or type of ink. The channels 77 are about 80 microns wide, which is equivalent to the width of the holes 72 in the polymer sealing film 71, and extend the length of the IC 74. The channels 77 are divided into sections by silicon walls 78. Each sections is directly supplied with ink, to reduce the flow path to the inlets 73 and the likelihood of ink starvation to the individual nozzles 801. Each section feeds approximately 128 nozzles 801 via their respective inlets 73.

The ink is fed to the etched channels 77 formed in the underside of the ICs 74 for supply to the nozzle ink inlets 73. As shown in FIG. 24, holes 72 formed through the polymer sealing film 71 are aligned with one of the channels 77 at the point where the silicon wall 78 separates the channel 77 into sections. The holes 72 are about 80 microns in width which is substantially the same width of the channels 77 such that one hole 72 supplies ink to two sections of the channel 77. This halves the density of holes 72 required in the polymer sealing film 71.

Following attachment and alignment of each of the printhead ICs 74 to the surface of the polymer sealing film 71, a flex PCB 79 (see FIG. 23) is attached along an edge of the ICs 74 so that control signals and power can be supplied to the bond pads 75 to control and operate the nozzles 801. The flex PCB 79 may also have a plurality of decoupling capacitors 81 arranged along its length for controlling the power and data signals received from the control circuitry.

As shown in FIG. 23, a media shield 82 protects the printhead ICs 74 from damage which may occur due to contact with the passing media. The media shield 82 is attached to the upper member 62 upstream of the printhead ICs 74 via an appropriate clip-lock arrangement or via an adhesive. The printhead ICs 74 sit below the surface of the media shield 82, out of the path of the passing media.

A space 83 is provided between the media shield 82 and the upper 62 and lower 65 members which can receive pressurized air from an air compressor or the like. As this space 83 extends along the length of the printhead assembly 22, compressed air can be supplied to either end of the printhead assembly 22 and be evenly distributed along the assembly. The inner surface of the media shield 82 is provided with a series of fins 84 which define a plurality of air outlets evenly distributed along the length of the media shield 82 through which the compressed air travels and is directed across the printhead ICs 74 in the direction of the media delivery. This arrangement acts to prevent dust and other particulate matter carried with the media from settling on the surface of the printhead ICs, which could cause blockage and damage to the nozzles.

9.2 Ink Ejection Nozzles

As discussed above, an array of ink ejection nozzles are formed on the printhead IC 74 over the ink inlets 73. The Applicant has developed many different nozzle structures suitable for this printhead. The fabrication and operation of each of these nozzle types is described in the cross referenced documents listed above. However, two of the more widely adopted nozzle designs are briefly described below.

9.3 Mechanical Bend Actuator

FIGS. 27 to 30 show an ink delivery nozzle 801 formed on a silicon substrate 8015. It will be appreciated that the substrate 8015 equates to the printhead IC 74 (see FIGS. 22 and 26) and a nozzle 801 overlays each of the nozzle ink inlets 73. Each of the nozzle arrangements 801 are identical, however groups of nozzle arrangements 801 are arranged to be fed with different colored inks or fixative. The nozzle arrangements are arranged in rows and are staggered with respect to each other, allowing closer spacing of ink dots during printing than would be possible with a single row of nozzles. Such an arrangement makes it possible to provide a high density of nozzles, for example, more than 5000 nozzles arrayed in a plurality of staggered rows each having an interspacing of about 32 microns between the nozzles in each row and about 80 microns between the adjacent rows. The multiple rows also allow for redundancy (if desired), thereby allowing for a predetermined failure rate per nozzle.

Each nozzle arrangement 801 is the product of an integrated circuit fabrication technique. In particular, the nozzle arrangement 801 defines a micro-electromechanical system (MEMS).

For clarity and ease of description, the construction and operation of a single nozzle arrangement 801 will be described.

The inkjet printhead integrated circuit 74 includes a silicon wafer substrate 8015 having 0.35 micron 1 P4M 12 volt CMOS microprocessing electronics is positioned thereon.

A silicon dioxide (or alternatively glass) layer 8017 is positioned on the substrate 8015. The silicon dioxide layer 8017 defines CMOS dielectric layers. CMOS top-level metal defines a pair of aligned aluminium electrode contact layers 8030 positioned on the silicon dioxide layer 8017. Both the silicon wafer substrate 8015 and the silicon dioxide layer 8017 are etched to define an ink inlet channel 8014 having a generally circular cross section (in plan). An aluminium diffusion barrier 8028 of CMOS metal 1, CMOS metal 2/3 and CMOS top level metal is positioned in the silicon dioxide layer 8017 about the ink inlet channel 8014. The diffusion barrier 8028 serves to inhibit the diffusion of hydroxyl ions through CMOS oxide layers of the drive electronics layer 8017.

A passivation layer in the form of a layer of silicon nitride 8031 is positioned over the aluminium contact layers 8030 and the silicon dioxide layer 8017. Each portion of the passivation layer 8031 positioned over the contact layers 8030 has an opening 8032 defined therein to provide access to the contacts 8030.

Figure 27:
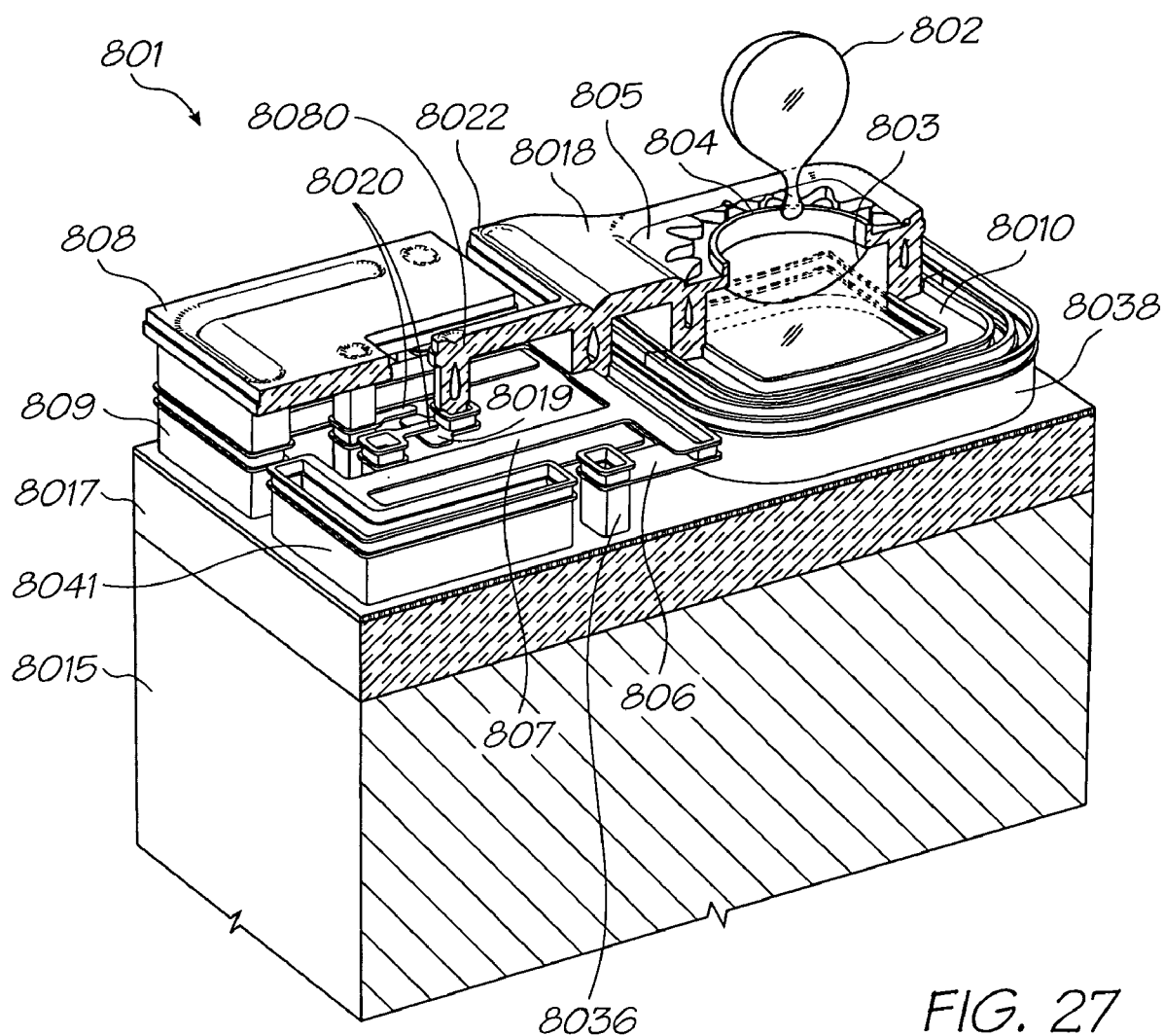
FIG. 27 is a schematic perspective view of an example of a printhead nozzle.
Figure 28:
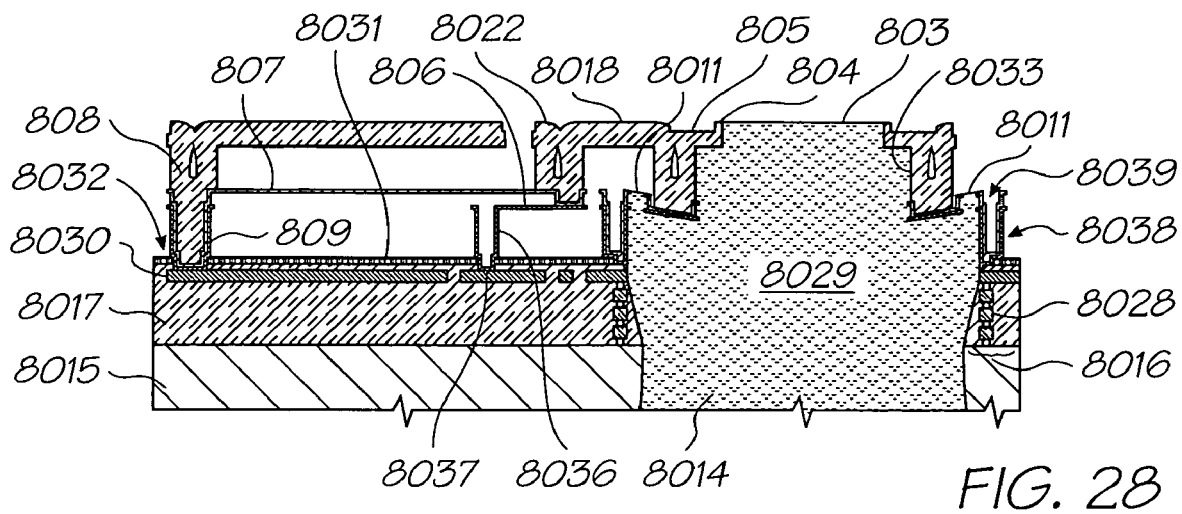
FIGS. 28 to 30 show schematic side views of the printhead nozzle of FIG. 27 in use.

The nozzle arrangement 801 includes a nozzle chamber 8029 defined by an annular nozzle wall 8033, which terminates at an upper end in a nozzle roof 8034 and a radially inner nozzle rim 804 that is circular in plan. The ink inlet channel 8014 is in fluid communication with the nozzle chamber 8029. At a lower end of the nozzle wall, there is disposed a moving rim 8010, that includes a moving seal lip 8040. An encircling wall 8038 surrounds the movable nozzle, and includes a stationary seal lip 8039 that, when the nozzle is at rest as shown in FIG. 27, is adjacent the moving rim 8010. A fluidic seal 8011 is formed due to the surface tension of ink trapped between the stationary seal lip 8039 and the moving seal lip 8040. This prevents leakage of ink from the chamber whilst providing a low resistance coupling between the encircling wall 8038 and the nozzle wall 8033.

FIG. 27 also shows a plurality of radially extending recesses in the roof about the nozzle rim 804. These recesses serve to contain radial ink flow as a result of ink escaping past the nozzle rim 804.

The nozzle wall 8033 forms part of a lever arrangement that is mounted to a carrier 8036 having a generally U-shaped profile with a base 8037 attached to the layer 8031 of silicon nitride.

The lever arrangement also includes a lever arm 8018 that extends from the nozzle walls and incorporates a lateral stiffening beam 8022. The lever arm 8018 is attached to a pair of passive beams 806, formed from titanium nitride (TiN) and positioned on either side of the nozzle arrangement. The other ends of the passive beams 806 are attached to the carrier 8036.

The lever arm 8018 is also attached to an actuator beam 807, which is formed from TiN. It will be noted that this attachment to the actuator beam is made at a point a small but critical distance higher than the attachments to the passive beam 806.

The actuator beam 807 is substantially U-shaped in plan, defining a current path between the electrode 809 and an opposite electrode 8041. Each of the electrodes 809 and 8041 are electrically connected to respective points in the contact layer 8030. As well as being electrically coupled via the contacts 809, the actuator beam is also mechanically anchored to anchor 808. The anchor 808 is configured to constrain motion of the actuator beam 807 to the left of FIG. 27 when the nozzle arrangement is in operation.

The TiN in the actuator beam 807 is conductive, but has a high enough electrical resistance that it undergoes self-heating when a current is passed between the electrodes 809 and 8041. No current flows through the passive beams 806, so they do not expand.

In use, the device at rest is filled with ink 8013 that defines a meniscus 803 under the influence of surface tension. The ink is retained in the chamber 8029 by the meniscus, and will not generally leak out in the absence of some other physical influence.

Figure 29:
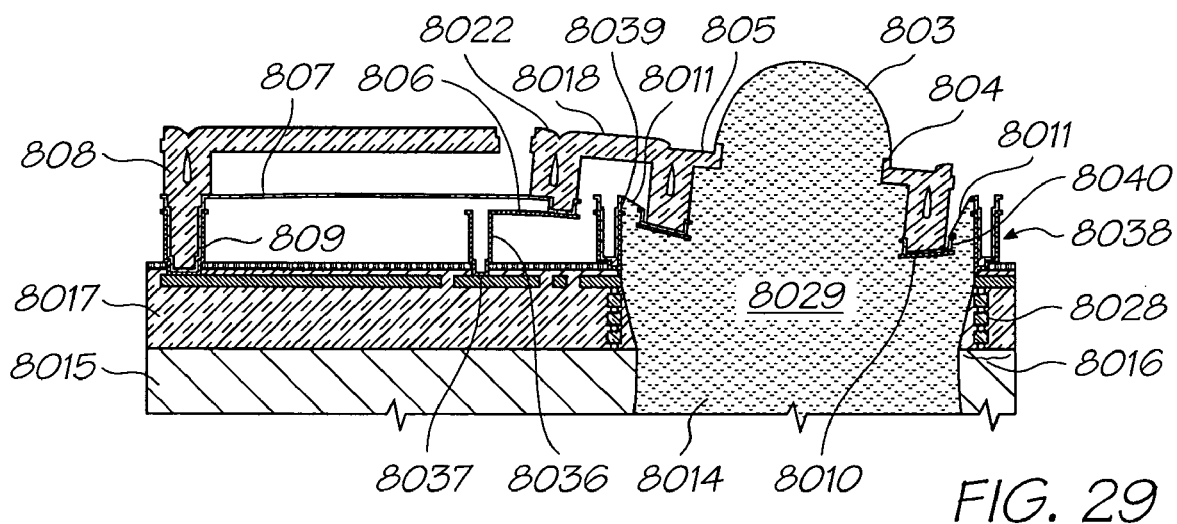

As shown in FIG. 29, to fire ink from the nozzle, a current is passed between the contacts 809 and 8041, passing through the actuator beam 807. The self-heating of the beam 807 due to its resistance causes the beam to expand. The dimensions and design of the actuator beam 807 mean that the majority of the expansion in a horizontal direction with respect to FIGS. 28 to 30. The expansion is constrained to the left by the anchor 808, so the end of the actuator beam 807 adjacent the lever arm 8018 is impelled to the right.

The relative horizontal inflexibility of the passive beams 806 prevents them from allowing much horizontal movement the lever arm 8018. However, the relative displacement of the attachment points of the passive beams and actuator beam respectively to the lever arm causes a twisting movement that causes the lever arm 8018 to move generally downwards. The movement is effectively a pivoting or hinging motion. However, the absence of a true pivot point means that the rotation is about a pivot region defined by bending of the passive beams 806.

The downward movement (and slight rotation) of the lever arm 8018 is amplified by the distance of the nozzle wall 8033 from the passive beams 806. The downward movement of the nozzle walls and roof causes a pressure increase within the chamber 8029, causing the meniscus to bulge as shown in FIG. 29. It will be noted that the surface tension of the ink means the fluid seal 8011 is stretched by this motion without allowing ink to leak out.

Figure 30:
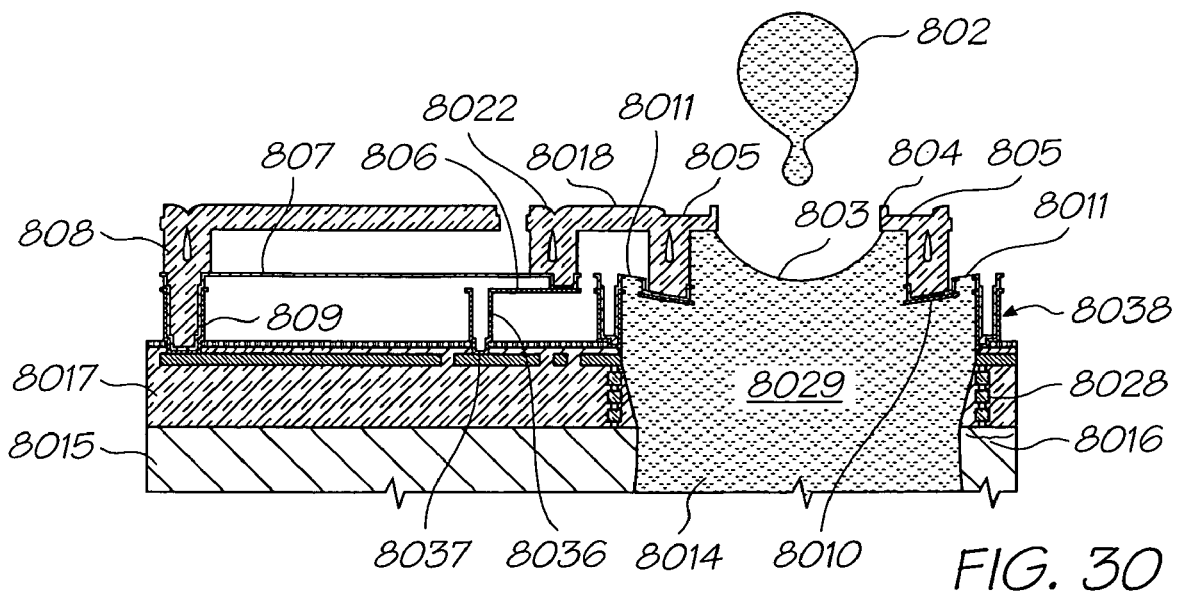

As shown in FIG. 30, at the appropriate time, the drive current is stopped and the actuator beam 807 quickly cools and contracts. The contraction causes the lever arm to commence its return to the quiescent position, which in turn causes a reduction in pressure in the chamber 8029. The interplay of the momentum of the bulging ink and its inherent surface tension, and the negative pressure caused by the upward movement of the nozzle chamber 8029 causes thinning, and ultimately snapping, of the bulging meniscus to define an ink drop 802 that continues upwards until it contacts adjacent print media.

Immediately after the drop 802 detaches, meniscus 803 forms the concave shape shown in FIG. 30. Surface tension causes the pressure in the chamber 8029 to remain relatively low until ink has been sucked upwards through the inlet 8014, which returns the nozzle arrangement and the ink to the quiescent situation shown in Fig. G.

9.4 Thermal Bubble Actuator

Another type of printhead nozzle arrangement suitable for the present invention will now be described with reference to FIG. 31. Once again, for clarity and ease of description, the construction and operation of a single nozzle arrangement 1001 will be described.

The nozzle arrangement 1001 is of a bubble forming heater element actuator type which comprises a nozzle plate 1002 with a nozzle 1003 therein, the nozzle having a nozzle rim 1004, and aperture 1005 extending through the nozzle plate. The nozzle plate 1002 is plasma etched from a silicon nitride structure which is deposited, by way of chemical vapor deposition (CVD), over a sacrificial material which is subsequently etched.

The nozzle arrangement includes, with respect to each nozzle 1003, side walls 1006 on which the nozzle plate is supported, a chamber 1007 defined by the walls and the nozzle plate 1002, a multi-layer substrate 1008 and an inlet passage 1009 extending through the multi-layer substrate to the far side (not shown) of the substrate. A looped, elongate heater element 1010 is suspended within the chamber 1007, so that the element is in the form of a suspended beam. The nozzle arrangement as shown is a microelectromechanical system (MEMS) structure, which is formed by a lithographic process.

When the nozzle arrangement is in use, ink 1011 from a reservoir (not shown) enters the chamber 1007 via the inlet passage 1009, so that the chamber fills. Thereafter, the heater element 1010 is heated for somewhat less than 1 micro second, so that the heating is in the form of a thermal pulse. It will be appreciated that the heater element 1010 is in thermal contact with the ink 1011 in the chamber 1007 so that when the element is heated, this causes the generation of vapor bubbles in the ink. Accordingly, the ink 1011 constitutes a bubble forming liquid.

The bubble 1012, once generated, causes an increase in pressure within the chamber 1007, which in turn causes the ejection of a drop 1016 of the ink 1011 through the nozzle 1003. The rim 1004 assists in directing the drop 1016 as it is ejected, so as to minimize the chance of drop misdirection.

The reason that there is only one nozzle 1003 and chamber 1007 per inlet passage 1009 is so that the pressure wave generated within the chamber, on heating of the element 1010 and forming of a bubble 1012, does not affect adjacent chambers and their corresponding nozzles.

The increase in pressure within the chamber 1007 not only pushes ink 1011 out through the nozzle 1003, but also pushes some ink back through the inlet passage 1009. However, the inlet passage 1009 is approximately 200 to 300 microns in length, and is only approximately 16 microns in diameter. Hence there is a substantial viscous drag. As a result, the predominant effect of the pressure rise in the chamber 1007 is to force ink out through the nozzle 1003 as an ejected drop 1016, rather than back through the inlet passage 1009.

Figure 31:
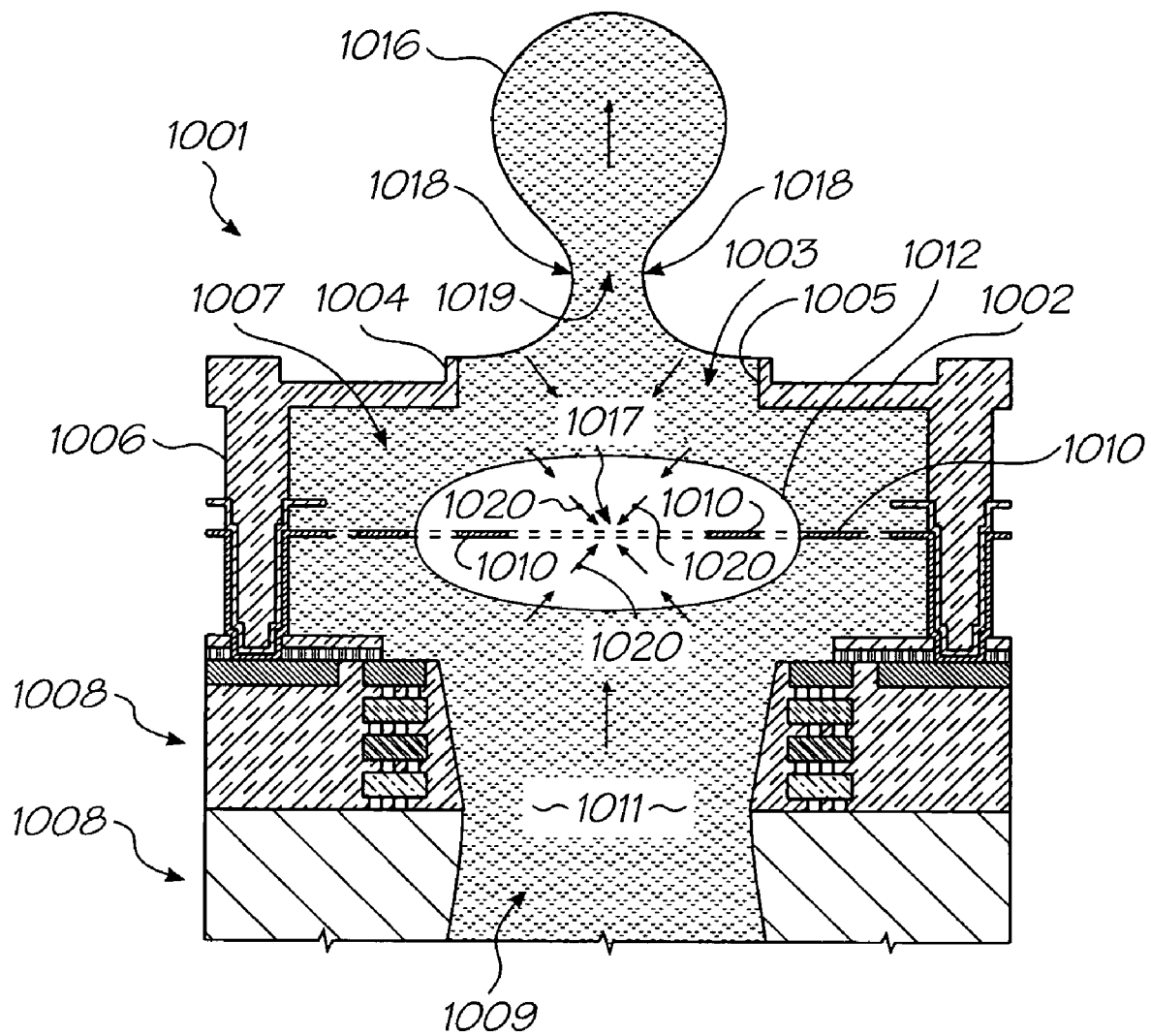
FIG. 31 is a schematic side view of a second example of a printhead nozzle.

As shown in FIG. 31, the ink drop 1016 is being ejected is shown during its "necking phase" before the drop breaks off. At this stage, the bubble 1012 has already reached its maximum size and has then begun to collapse towards the point of collapse 1017.

The collapsing of the bubble 1012 towards the point of collapse 1017 causes some ink 1011 to be drawn from within the nozzle 1003 (from the sides 1018 of the drop), and some to be drawn from the inlet passage 1009, towards the point of collapse. Most of the ink 1011 drawn in this manner is drawn from the nozzle 1003, forming an annular neck 1019 at the base of the drop 1016 prior to its breaking off.

The drop 1016 requires a certain amount of momentum to overcome surface tension forces, in order to break off. As ink 1011 is drawn from the nozzle 1003 by the collapse of the bubble 1012, the diameter of the neck 1019 reduces thereby reducing the amount of total surface tension holding the drop, so that the momentum of the drop as it is ejected out of the nozzle is sufficient to allow the drop to break off.

When the drop 1016 breaks off, cavitation forces are caused as reflected by the arrows 1020, as the bubble 1012 collapses to the point of collapse 1017. It will be noted that there are no solid surfaces in the vicinity of the point of collapse 1017 on which the cavitation can have an effect.

9.5 Control Circuitry

The printhead integrated circuits 74 (see FIG. 22) may have between 5000 to 100,000 of the above described ink delivery nozzles arranged along its surface, depending upon the length of the integrated circuits and the desired printing properties required. For example, for narrow media it may be possible to only require 5000 nozzles arranged along the surface of the printhead assembly to achieve a desired printing result, whereas for wider media a minimum of 10,000, 20,000 or 50,000 nozzles may need to be provided along the length of the printhead assembly to achieve the desired printing result. For full color photo quality images on A4 or US letter sized media at or around 1600 dpi, the integrated circuits 74 may have 13824 nozzles per color. In the case where the printhead assembly 22 is capable of printing in 4 colours (C, M, Y, K), the integrated circuits 74 may have around 53396 nozzles disposed along the surface thereof. Similarly, if the printhead assembly 22 is capable of printing 6 printing fluids (C, M, Y, K, IR and a fixative) this may result in 82944 nozzles being provided on the surface of the integrated circuits 74. In all such arrangements, the electronics supporting each nozzle is the same.

The manner in which the individual ink delivery nozzle arrangements may be controlled within the printhead assembly 22 will now be described with reference to FIGS. 32 to 34.

Figure 32:
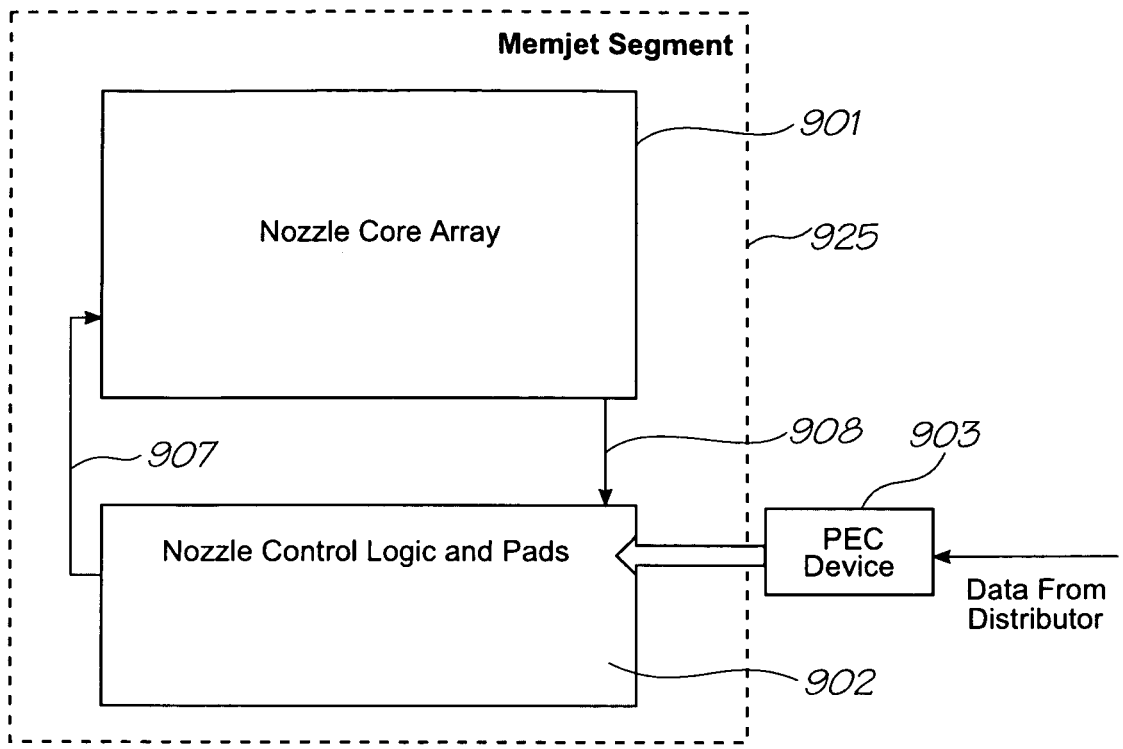
FIG. 32 is an overview of an example of the integrated circuit and its connections to the print engine controller (PEC)

FIG. 32 shows an overview of the integrated circuit 74 and its connections to the print engine controller (PEC) provided within the control electronics of the print engine 1. As discussed above, integrated circuit 74 includes a nozzle core array 901 containing the repeated logic to fire each nozzle, and nozzle control logic 902 to generate the timing signals to fire the nozzles. The nozzle control logic 902 receives data from the PEC 903 via a high-speed link.

The nozzle control logic 902 is configured to send serial data to the nozzle array core for printing, via a link 907, which may be in the form of an electrical connector. Status and other operational information about the nozzle array core 901 is communicated back to the nozzle control logic 902 via another link 908, which may be also provided on the electrical connector.

Figure 33:
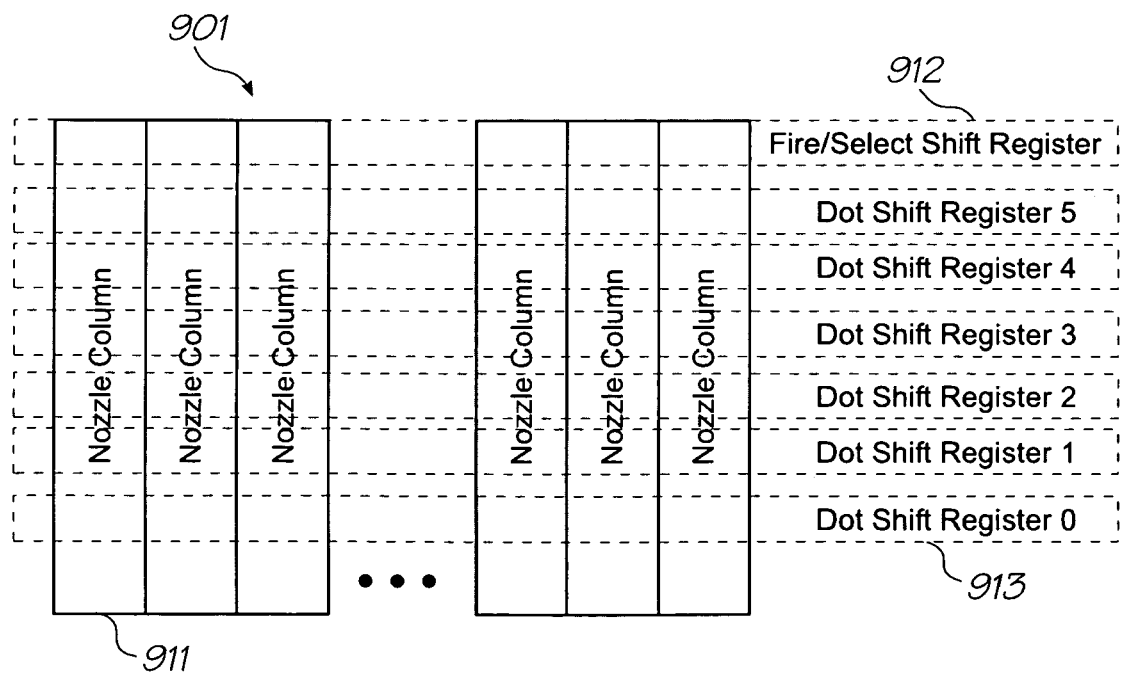
FIG. 33 is an example of a nozzle column arrangement.
Figure 34:
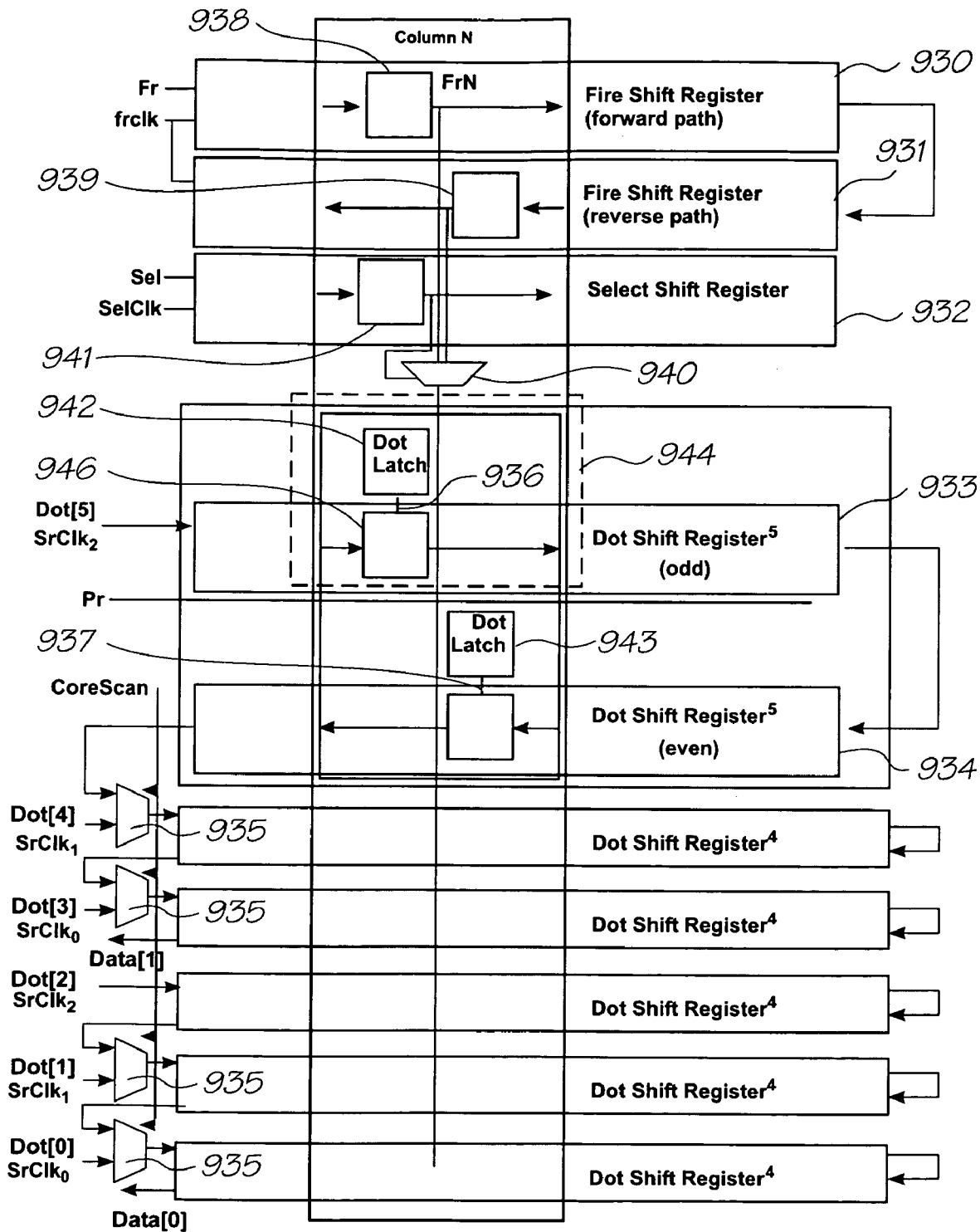
FIG. 34 is an example of a shift register arrangement.

The nozzle array core 901 is shown in more detail in FIGS. 33 and 34. In FIG. 33, it will be seen that the nozzle array core 901 comprises an array of nozzle columns 911. The array includes a fire/select shift register 912 and up to 6 color channels, each of which is represented by a corresponding dot shift register 913.

As shown in FIG. 34, the fire/select shift register 912 includes forward path fire shift register 930, a reverse path fire shift register 931 and a select shift register 932. Each dot shift register 913 includes an odd dot shift register 933 and an even dot shift register 934. The odd and even dot shift registers 933 and 934 are connected at one end such that data is clocked through the odd shift register 933 in one direction, then through the even shift register 934 in the reverse direction. The output of all but the final even dot shift register is fed to one input of a multiplexer 935. This input of the multiplexer is selected by a signal (corescan) during post-production testing. In normal operation, the corescan signal selects dot data input Dot[x] supplied to the other input of the multiplexer 935. This causes Dot[x] for each color to be supplied to the respective dot shift registers 913 (see FIG. 33).

A single column N will now be described with reference to FIG. 35. In the embodiment shown, the column N includes 12 data values, comprising an odd data value 936 and an even data value 937 for each of the six dot shift registers. Column N also includes an odd fire value 938 from the forward fire shift register 930 and an even fire value 939 from the reverse fire shift register 931, which are supplied as inputs to a multiplexer 940. The output of the multiplexer 940 is controlled by the select value 941 in the select shift register 932. When the select value is zero, the odd fire value is output, and when the select value is one, the even fire value is output.

Each of the odd and even data values 936 and 937 is provided as an input to corresponding odd and even dot latches 942 and 943 respectively.

Each dot latch and its associated data value form a unit cell. The details of a unit cell 944 is shown in more detail in FIG. 35. The dot latch 942 is a D-type flip-flop that accepts the output of the data value 936, which is held by a D-type flip-flop 946 forming an element of the odd dot shift register 933 (see FIG. 34). The data input to the flip-flop 946 is provided from the output of a previous element in the odd dot shift register (unless the element under consideration is the first element in the shift register, in which case its input is the Dot[x] value). Data is clocked from the output of flip-flop 946 into latch 942 upon receipt of a negative pulse provided on LsyncL.

The output of latch 942 is provided as one of the inputs to a three-input AND gate 945. Other inputs to the AND gate 945 are the Fr signal (from the output of multiplexer 940 (see FIG. 34)) and a pulse profile signal Pr. The firing time of a nozzle is controlled by the pulse profile signal Pr, and can be, for example, lengthened to take into account a low voltage condition that arises due to low power supply (in a removable power supply (battery) embodiment). This is to ensure that a relatively consistent amount of ink is efficiently ejected from each nozzle as it is fired. In the embodiment described, the profile signal Pr is the same for each dot shift register, which provides a balance between complexity, cost and performance. However, in other embodiments, the Pr signal can be applied globally (ie, is the same for all nozzles), or can be individually tailored to each unit cell or even to each nozzle.

Once the data is loaded into the latch 942, the fire enable Fr and pulse profile Pr signals are applied to the AND gate 945, combining to the trigger the nozzle to eject a dot of ink for each latch 942 that contains a logic 1.

The signals for each nozzle channel are summarized in the following table:

| Name | Direction | Description |
| --- | --- | --- |
| D | Input | Input dot pattern to shift register bit |
| Q | Output | Output dot pattern from shift register bit |
| SrClk | Input | Shift register clock in - d is captured on rising edge of this clock |
| LsyncL | Input | Fire enable - needs to be asserted for nozzle to fire |
| Pr | Input | Profile - needs to be asserted for nozzle to fire |

Figure 35:
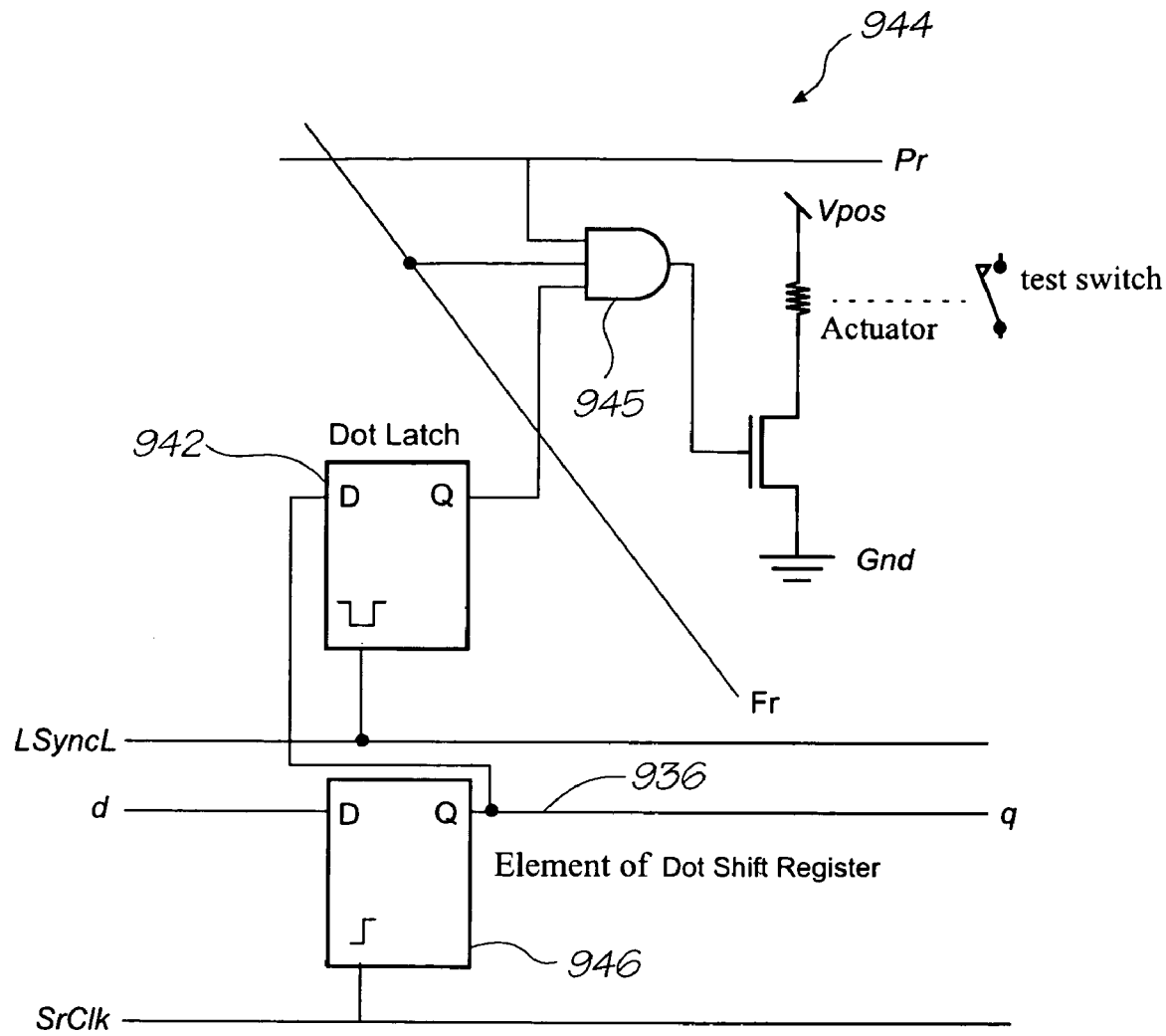
FIG. 35 is an example of connections to a single column.

As shown in FIG. 35, the fire signals Fr are routed on a diagonal, to enable firing of one color in the current column, the next color in the following column, and so on. This averages the current demand by spreading it over 6 columns in time-delayed fashion.

The dot latches and the latches forming the various shift registers are fully static in this embodiment, and are CMOS-based. The design and construction of latches is well known to those skilled in the art of integrated circuit engineering and design, and so will not be described in detail in this document.

The nozzle speed may be as much as 20 kHz for the printer capable of printing at about 60 ppm, and even more for higher speeds. At this range of nozzle speeds the amount of ink than can be ejected by the entire printhead assembly (see FIG. 22) is at least 50 million drops per second. However, as the number of nozzles is increased to provide for higher-speed and higher-quality printing at least 100 million drops per second, preferably at least 500 million drops per second and more preferably at least 1 billion drops per second may be delivered. At such speeds, the drops of ink are ejected by the nozzles with a maximum drop ejection energy of about 250 nanojoules per drop.

Consequently, in order to accommodate printing at these speeds, the control electronics must be able to determine whether a nozzle is to eject a drop of ink at an equivalent rate. In this regard, in some instances the control electronics must be able to determine whether a nozzle ejects a drop of ink at a rate of at least 50 million determinations per second. This may increase to at least 100 million determinations per second or at least 500 million determinations per second, and in many cases at least 1 billion determinations per second for the higher-speed, higher-quality printing applications.

The number of nozzles provided on the printhead assembly together with the nozzle firing speeds and print speeds, results in an area print speed of at least 50 cm2 per second, and depending on the printing speed, at least 100 cm2 per second, preferably at least 200 cm2 per second, and more preferably at least 500 cm2 per second at the higher-speeds. Such an arrangement provides a printer that is capable of printing a given area of media at speeds not previously attainable with conventional printers.

10. Decoder Architecture

A desire to minimise clock speed and power consumption motivates a dedicated decoder design. Conversely, a desire to minimise complexity motivates an ALU-based decoder design. Various compromises between these two extremes exist, such as a hybrid design which includes both an ALU and dedicated blocks.

An ALU-based decoder can also be used to implement a single-chip product, i.e. in the absence of an additional host controller, with the ALU executing product application software as well as reader and decoder software. Alternatively the decoder is included as a block in a larger application-specific integrated circuit (ASIC) or system-on-a-chip (SoC). This is discussed in Section 10.2.

EQ 116 gives the rate rd at which the decoder interpolates and resolves bit values. Since the decoder processes every scanline, the rate $r_d'$ at which it generates candidate encoding locations is higher than $r_d$ by a factor N:

$$r_d' = r_d N = \frac{\tilde{r}_s}{N} \qquad \text{(EQ 126)}$$

The two most demanding tasks performed by the decoder are clock tracking and data decoding. Data decoding is relatively simple, but must be performed at the average data rates $r_d$ and $r_d'$ described above. Clock tracking is more complex, but because it is spatially localised it can be amortised over the line time corresponding to the block width. A higher clock rate can obviously be used alternatively or additionally to amortising clock tracking over the block width.

Because expected clock variation is of low frequency, data clock PLLs can be used predictively to provide clock estimates for a given scanline, even while the PLLs are being updated for that scanline.

Assuming no data parallelism, $r_d'$ therefore defines a minimum value for the clock speed $r_c$ of a dedicated decoder:

$$r_c \geq r_d' \qquad \text{(EQ 127)}$$

The minimum clock speed of an ALU-based decoder is higher still, and is a function of its instruction set and how many dedicated blocks it incorporates.

Since an ALU-based decoder trivially implements the decoding algorithm in software, the remainder of this section describes a dedicated decoder design. Blocks of this dedicated decoder design can be used to produce a hybrid design.

Figure 36:
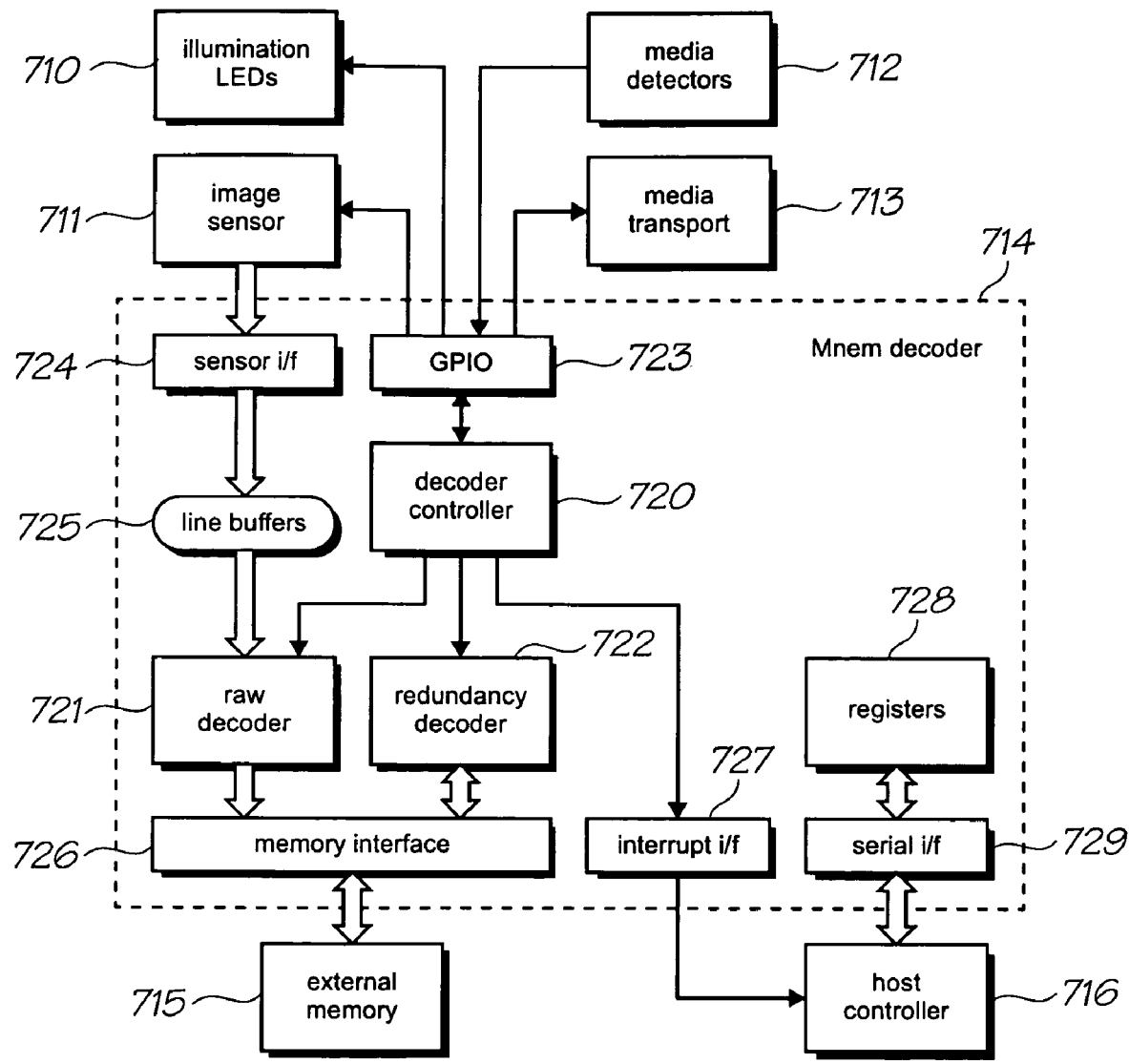
FIG. 36 is a high-level block diagram of an example of a mnem decoder.

FIG. 36 shows a high-level block diagram of the decoder 714 in the context of the Mnem reader. It consists of a controller 720, a raw decoder 721, and a redundancy decoder 722. The controller controls the external peripherals in synchrony with the raw decoder during the first raw decoding phase, and controls the redundancy decoder during the optional second redundancy decoding phase.

During the scan the controller generates the line clock, and from the line clock derives the control signals which control the illumination LEDs 710, the image sensor 711, and the transport motor 713 via the general-purpose I/O interface GPIO 723, as well as the internal raw decoder 721.

The decoder 721 acquires pixel-wide (i.e. typically 8-bit wide) samples from the image sensor 711, via an image sensor interface 724 into an input line buffer 725 at the image sensor read-out rate $r_i$. The decoder maintains three input line buffers, and alternates between them on successive lines. On any given line, one buffer is being written to from the image sensor interface 724, and two buffers are being read by the raw decoder 721. Due to the read-out considerations discussed in Section 7.3, the image sensor read-out rate $r_i$ is generally higher than the average scan data rate $\tilde{r}_s$, which in turn is higher than the decoder clock speed $r_c$ by a factor N or less (see EQ 126 and EQ 127).

During the scan the raw decoder 721 decodes scan data line by line, and writes decoded raw data to external memory 715, via a memory interface 726.

If the decoder is configured to perform redundancy decoding, then after the scan is complete the controller signals the redundancy decoder 722 to perform redundancy decoding. The redundancy decoder reads raw data from external memory 715 and writes corrected data back to external memory.

If the decoder is configured to interrupt the host controller on completion, then after decoding is complete the controller signals the host controller via an interrupt interface 727.

The decoder provides the host controller with read-write access to configuration registers 728 and read access to status registers 728 via a serial interface 729.

Figure 37:
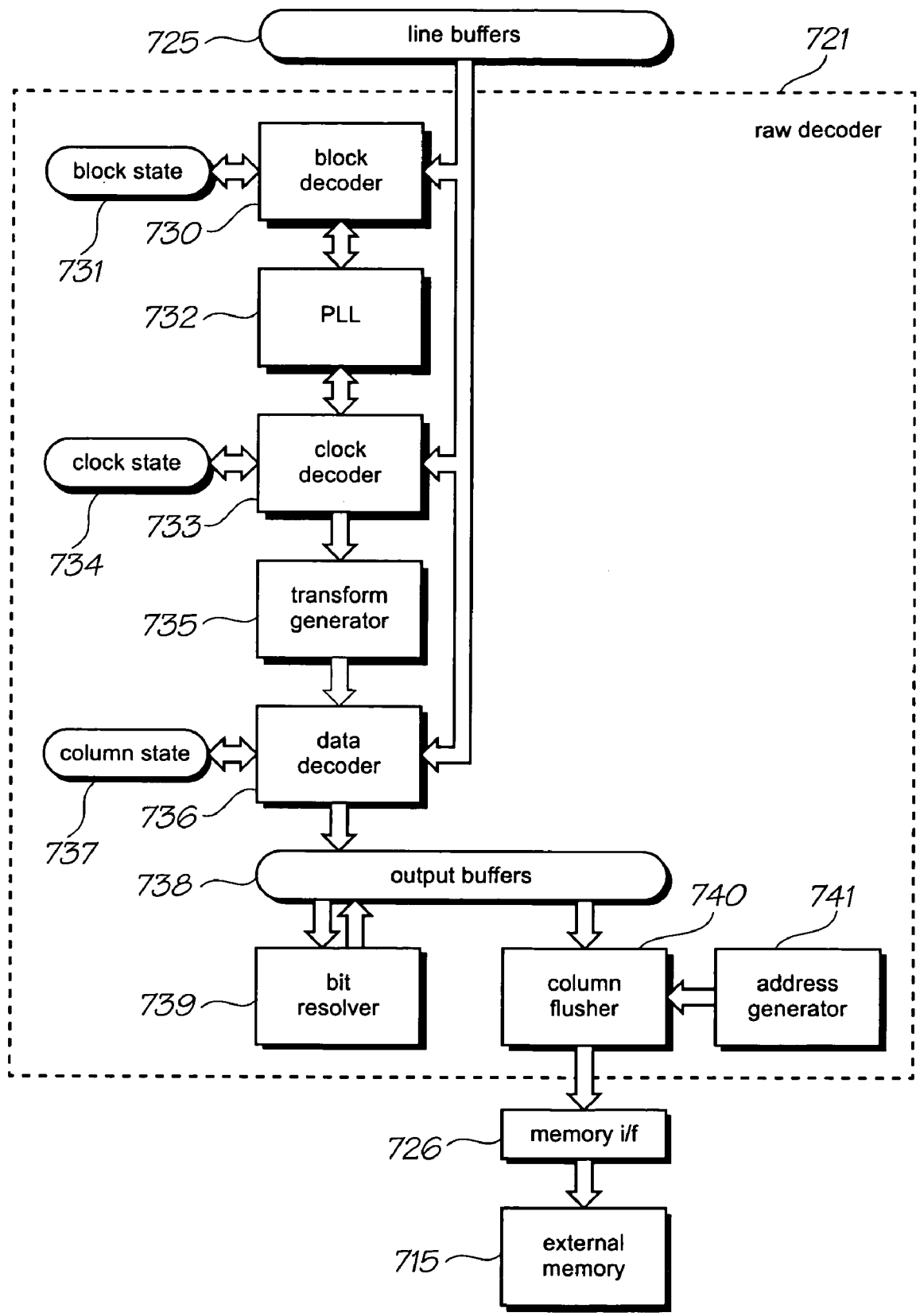
FIG. 37 is a high-level block diagram of an example of a raw decoder.

FIG. 37 shows a high-level block diagram of the raw decoder. It contains a block decoder 730 which implements the state machine described in Section 3.1. As the block processes a scanline, it indexes the block state 731 in internal memory associated with each block column in turn.

The block decoder 730 uses a shared PLL 732 to acquire the pilot and acquire and track the registration clocks. It uses a clock decoder 733 to track the data clocks and their associated alignment lines. It uses a data decoder 736 to generate candidate encoding locations and to interpolate and threshold unresolved bit values. It uses a bit resolver 739 to generate resolved bit values from unresolved bit values. It uses a column flusher 740 to flush resolved raw data words to external memory 715.

The clock decoder 733 implements the data clock tracking algorithm described in Section 4. It indexes the clock state 734 in internal memory associated with the current data clock within the current block. The clock decoder uses a transform generator 735 to generate the block space to scan space transform based on the two data clocks.

The PLL 732 is shared and multi-purpose. It implements a digital PLL as described in Section 6. It operates on the PLL state of the appropriate clock, maintained as part of the current block state 731 or current clock state 734.

The data decoder 736 implements the unresolved bit decoding algorithm described in Section 3.1.3. It indexes the column state 737 in internal memory associated with the current column within the current block, and writes unresolved bit values to the current column within the output buffer 738 associated with the current block, pending resolution and flushing to external memory. The data decoder 736 uses the block space to scan space transform generated by the transform generator 735 to generate the coordinates of successive candidate bit encoding locations.

The transform generator 735 implements the algorithm described in Section 5.

The bit resolver 739 implements the bit resolution algorithm described in Section 3.1.3. It resolves bit values within the column previous to the current column within the output buffer associated with the current block The column flusher 740 uses an address generator 741 to generate the output address for each data column, as described in Section 3.1.3. If redundancy decoding is enabled, then the column flusher writes bitstream parameter column data to a separate external memory area.

Figure 38:
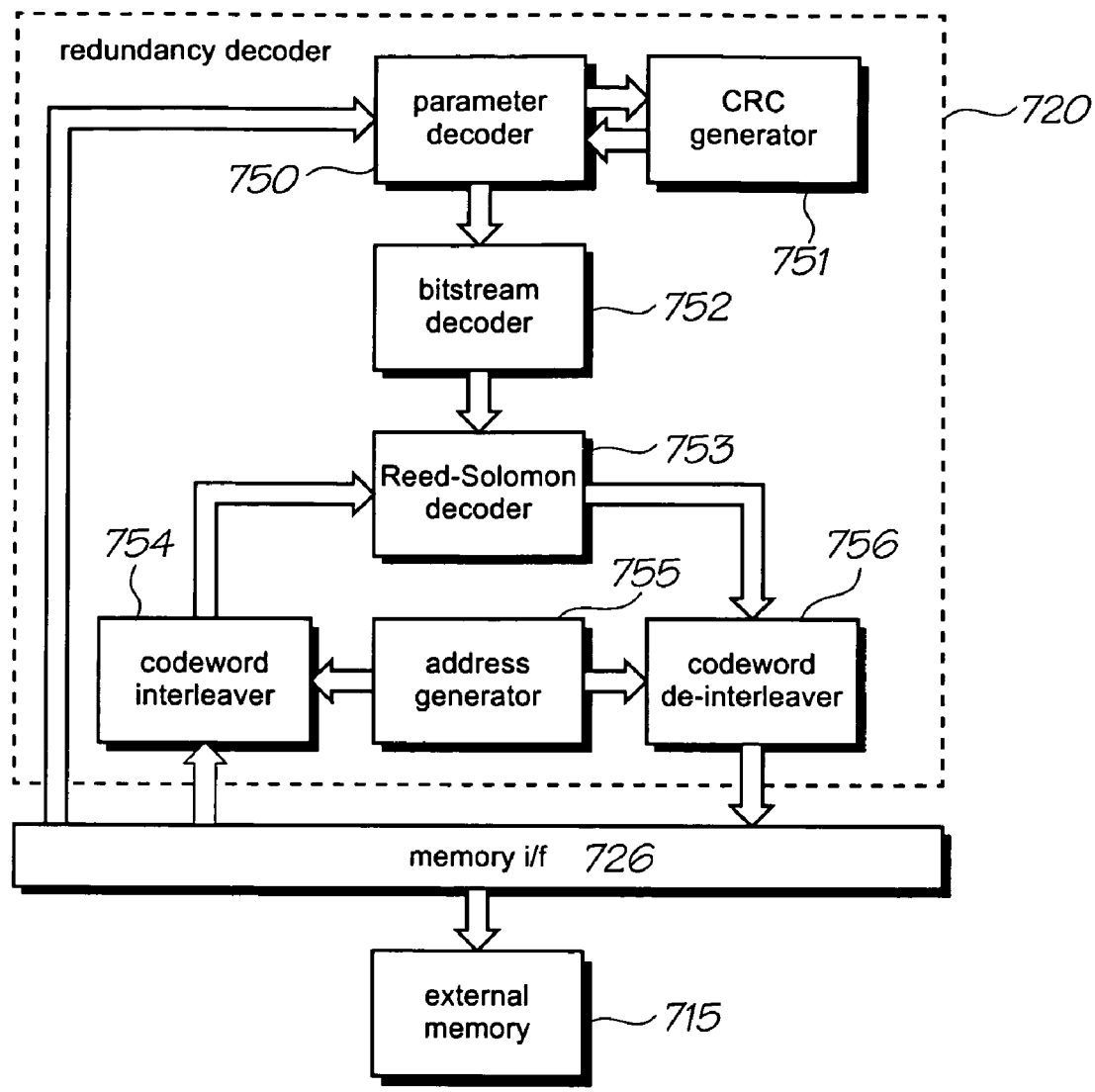
FIG. 38 is a high-level block diagram of an example of a redundancy decoder.

FIG. 38 shows a high-level block diagram of the redundancy decoder. It contains a parameter decoder 750 which extracts bitstream parameters from the CRC-encoded parameter data, and a bitstream decoder 752 which corrects errors in the raw data via the Reed-Solomon redundancy data associated with the raw data.

The parameter decoder 750 implements the algorithm described in Section 3.2.1. It reads CRC-encoded bitstream parameter data from external memory 715 via the memory interface 726. It uses a CRC generator 751 to generate CRCs to allow it to detect valid parameter data.

Once the parameter decoder 750 obtains valid bitstream parameters, it signals the bitstream decoder 752 to correct errors in the raw data. The bitstream decoder 752 implements the algorithm described in Section 3.2.2. It uses a codeword interleaver 754 to interleave, during read-out from external memory 715, the distributed raw data of each codeword and its associated redundancy data; a Reed-Solomon decoder 753 to correct errors in the codeword; and a codeword de-interleaver 756 to write corrected raw data back to its distributed locations.

The interleaver 754 and de-interleaver 756 share an address generator 755, which generates the distributed byte addresses of codeword symbols.

The decoder may utilise off-the-shelf functional blocks as required. For example, Reed-Solomon decoder blocks which support CCSDS codes are widely available, such as *Xilinx, Reed-Solomon Decoder V*3.0, 14 Mar. 2002.

10.1 Internal Memory Estimates

The decoder uses three scanline buffers to buffer image sensor input. Assuming 8-bit samples, the size $z_i$ of each scan buffer is given by:

$$z_i = 8\tilde{W}_s \quad \text{(EQ 128)}$$

The decoder uses a word-width output buffer per data column to buffer resolved output bits pending word-width writes to external memory. Assuming an output word size of w bits, the size $z_o$ of the output buffer is approximately given by:

$$z_o = wW_m \quad \text{(EQ 129)}$$

The decoder also buffers two unresolved bit values, each represented by a two-bit value, per data column.

The total size $z_t$ of the decoder's internal memory, ignoring block state, is therefore given by:

$$z_t = 8\tilde{W}_s + (w+2)W_m \quad \text{(EQ 130)}$$

10.2 Decoder Configuration

The decoder may be configured as a stand-alone ASIC or it may be included as a block in a larger ASIC or SoC.

As mentioned earlier, the decoder may be dynamically configured via its registers to decode a variety of Mnem configurations. The decoding parameters may also be statically configured with suitable default values.

Although the design of the decoder is scalable in terms of media size and shape, decoding time, clock speed and power consumption, the capabilities of a particular decoder implementation are limited by its maximum clock speed and the size of its internal buffers.

To be designed as a re-usable block, the decoder's internal buffer memory is best separated from the decoder itself so that the decoder is easily re-used with different buffer memory sizes.

11. Sample Mnem Configurations

11.1 3.5"×2.5" Playing Card

TABLE 4

| | Variable parameters | |
|---|---|---|
| parameter | Value | description |
| $\alpha_{max}$ | 2 degrees | Maximum α, the rotation of the block in scan space. |
| $\Delta_b$ | 0 | The nominal edge-to-edge spacing between adjacent blocks, and twice the maximum block misalignment. |
| $\Delta_m$ | 100 | 1 mm rounded up to 100 dots The nominal minimum x spacing between the edge of the Mnem area and the edge of the scan, and the maximum Horizontal Mnem area misalignment. |

TABLE 4-continued

| | Variable parameters | |
|---|---|---|
| parameter | Value | description |
| $H_{b_{max}}$ | 1080 | The maximum height of a block. |
| $H_m$ | 5400 | ¹3.5" less 0.05" border rounded up to 100 dots The height of the Mnem area. |
| N | 3 | The sampling rate, i.e. the nominal block space to scan space scale factor. |
| R | 1600/inch | The real space to Mnem space scale factor. |
| $W_{b_{max}}$ | 760 | The maximum width of a block. |
| $W_m$ | 3800 | 2.5" less 0.05" border rounded up to 100 dots The width of the Mnem area. |
| $v_r$ | 2 inches/s | The transport speed. |
| w | 16 | The width of external memory writes. |

11.2 Printed Using Memjet

TABLE 5

| | Selected derived parameters | | |
|---|---|---|---|
| parameter | equation | value | description |
| $\Delta_f$ | EQ 7 | 120 | The edge-to-edge spacing between adjacent registration markers. |
| $D_m$ | EQ 15 | 2.1 MB | The raw capacity of the Mnem area. |
| $E_m$ | EQ 23 | 1.8 MB | The encoded capacity of the Mnem area. |
| $H_b$ | EQ 16 | 1073 | The height of the block. |
| $H_d$ | EQ 13 | 944 | The height of the data grid always a multiple of 8). |
| $H_h$ | EQ 11 | 129 | The height of the block overhead. |
| $H_r$ | EQ 8 | 21 | The height of the registration track. |
| m | EQ 1 | 5 | The number of block rows in the Mnem area. |
| n | EQ 2 | 5 | The number of block columns in the Mnem area. |
| $W_b$ | EQ 4 | 760 | The width of the block. |
| $W_d$ | EQ 14 | 742 | The width of the data grid. |
| $W_f$ | EQ 6 | 120 | The width of a registration marker. |
| $W_h$ | EQ 12 | 18 | The width of the block overhead. |
| $W_p$ | EQ 21 | 758 | The width of the pilot. |
| $W_r$ | EQ 22 | 540 | The width of the registration track. |
| $\tilde{W}_s$ | EQ 24 | 13130 | The width of a scanline. |
| $W_w$ | EQ 10 | 108 | The width of the wide data clock track. |
| $r_c$ | EQ 127 | 12 MHz | The decoder clock speed. |
| $z_t$ | EQ 130 | 21 KB | Internal memory requirements. |

11.3 6"×4" Photo

TABLE 6

| | Variable parameters | |
|---|---|---|
| parameter | value | description |
| $\alpha_{max}$ | 2 degrees | Maximum α, the rotation of the block in scan space. |

TABLE 6-continued

Variable parameters

| parameter | value | description |
|---|---|---|
| $\Delta_b$ | 0 | The nominal edge-to-edge spacing between adjacent blocks, and twice the maximum block misalignment. |
| $\Delta_m$ | 100 | 1 mm rounded up to 100 dots. The nominal minimum x spacing between the edge of the Mnem area and the edge of the scan, and the maximum horizontal Mnem area misalignment. |
| $H_{b_{max}}$ | 1175 | The maximum height of a block. |
| $H_m$ | 9400 | 6" less 0.05" border rounded up to 100 dots. The height of the Mnem area. |
| N | 3 | The sampling rate, i.e. the nominal block space to scan space scale factor. |
| R | 1600/inch | The real space to Mnem space scale factor. |
| $W_{b_{max}}$ | 775 | The maximum width of a block. |
| $W_m$ | 6200 | 4" less 0.05" border rounded up to 100 dots. The width of the Mnem area. |
| $v_r$ | 2 inches/s | The transport speed. |
| w | 16 | The width of external memory writes. |

11.4 Printed Using Memjet

TABLE 7

Selected derived parameters

| parameter | equation | value | description |
|---|---|---|---|
| $\Delta_f$ | EQ 7 | 120 | The edge-to-edge spacing between adjacent registration markers. |
| $D_m$ | EQ 15 | 6.0 MB | The raw capacity of the Mnem area. |
| $E_m$ | EQ 23 | 5.2 MB | The encoded capacity of the Mnem area. |
| $H_b$ | EQ 16 | 1173 | The height of the block. |
| $H_d$ | EQ 13 | 1040 | The height of the data grid always a multiple of 8). |
| $H_h$ | EQ 11 | 133 | The height of the block overhead. |
| $H_r$ | EQ 8 | 23 | The height of the registration track. |
| m | EQ 1 | 8 | The number of block rows in the Mnem area. |
| n | EQ 2 | 8 | The number of block columns in the Mnem area. |
| $W_b$ | EQ 4 | 775 | The width of the block. |
| $W_c$ | EQ 9 | 7 | The width of the data clock track. |
| $W_d$ | EQ 14 | 757 | The width of the data grid. |
| $W_f$ | EQ 6 | 120 | The width of a registration marker. |
| $W_h$ | EQ 12 | 18 | The width of the block overhead. |
| $W_p$ | EQ 21 | 773 | The width of the pilot. |
| $W_r$ | EQ 22 | 555 | The width of the registration track. |
| $\tilde{W}_s$ | EQ 24 | 21170 | The width of a scanline. |
| $W_w$ | EQ 10 | 108 | The width of the wide data clock track. |
| $r_c$ | EQ 127 | 20 MHz | The (minimum) decoder clock speed. |
| $z_t$ | EQ 130 | 35 KB | Internal memory requirements. |

12. Effect of Blur on Bit-Encoding Value

Figure 39:
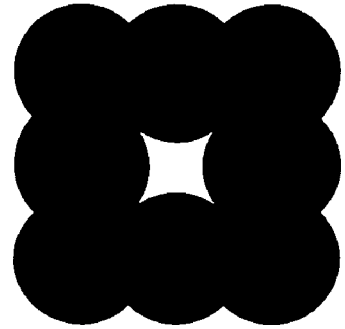
FIG. 39 is an example of a hole surrounded by eight black marks with no blur.

FIG. 39 shows an empty bit-encoding location whose eight surrounding bit-encoding locations are all marked. The mark diameter shown is the maximum allowed. This arrangement yields the worst-case effect of neighbouring marks on the imaged grayscale value of the central bit-encoding location.

The marks in FIG. 39 are not blurred. The effect of blur is explored in subsequent figures.

Figure 40:
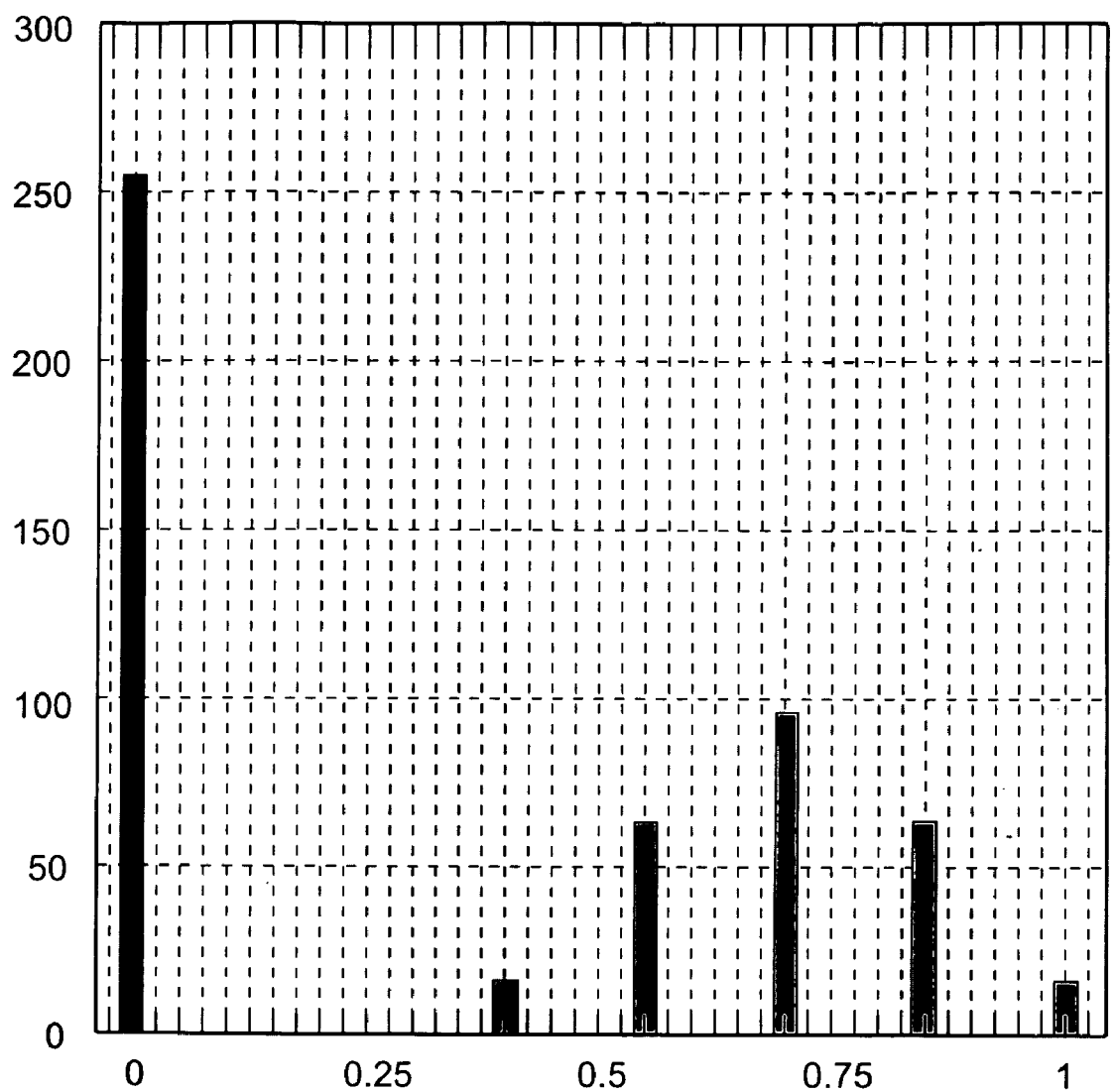
FIG. 40 is an example histogram of central value for all possible neighbourhoods, for mark (black bar) and hole (gray bars) with no blur.

FIG. 40 shows a histogram of the imaged grayscale value of the central bit-encoding location for all possible neighbouring mark arrangements, and in the absence of blur, for both a central mark (black bar) and a central hole (gray bars).

For the purpose of computing the histogram, block space is supersampled at 23:1. The imaged grayscale value is computed by averaging the supersampled image within a block-space unit square centred on the central bit-encoding location. Blur is computed using a low-pass box filter.

Figure 41:
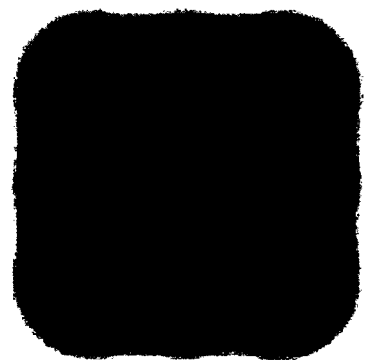
FIG. 41 is an example of a hole surrounded by eight black marks with a blur radius/mark radius of $9/33$.
Figure 42:
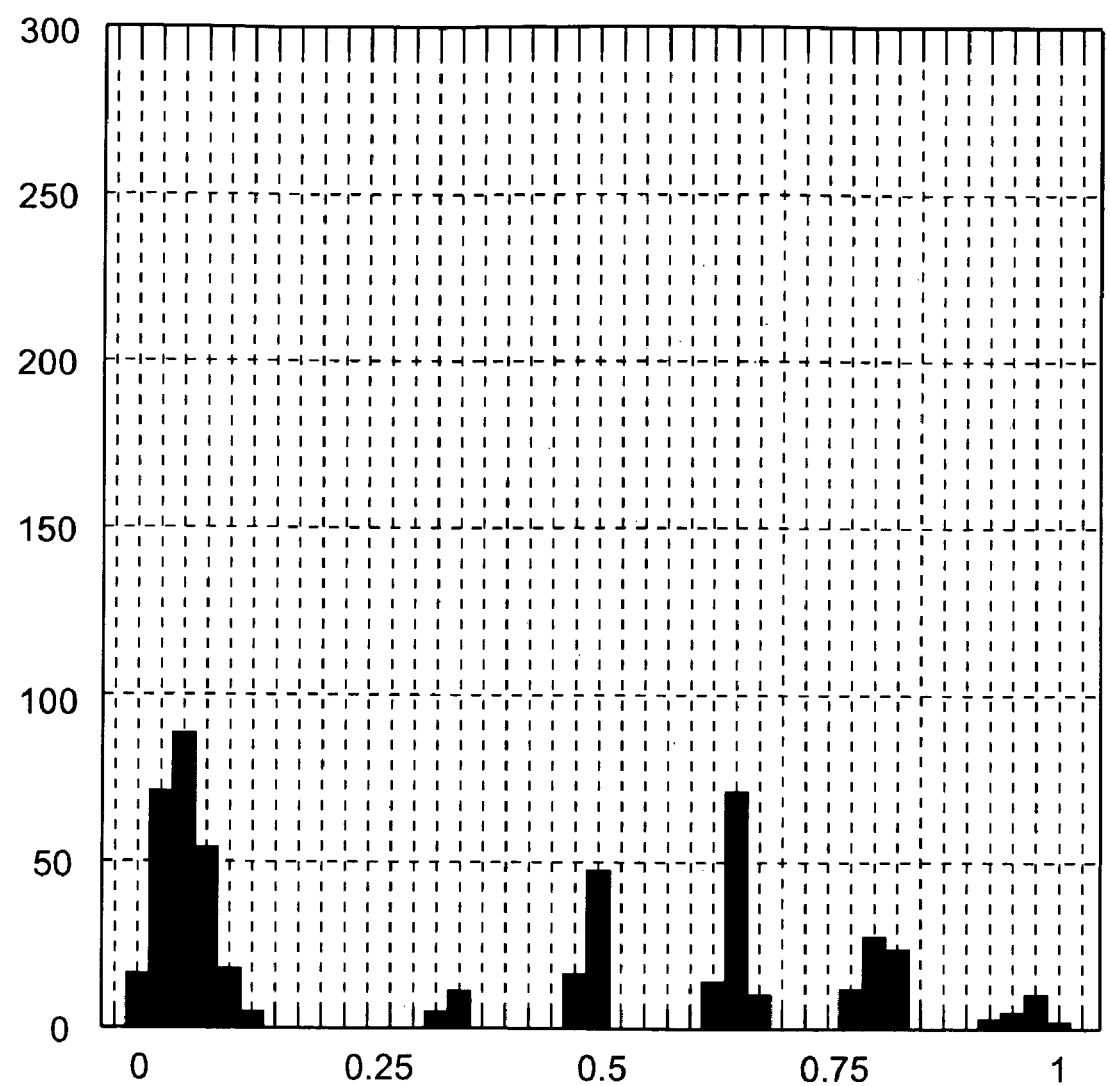
FIG. 42 is an example histogram of central value for all possible neighbourhoods, for mark (black bar) and hole (gray bars) with a blur radius/mark radius of $9/33$.
Figure 43:
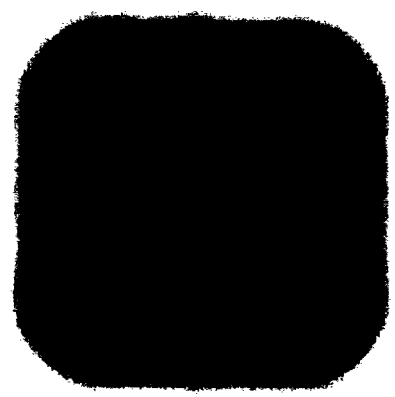
FIG. 43 is an example of a hole surrounded by eight black marks with a blur radius/mark radius of $12/33$; and, FIG. 44 is an example histogram of central value for all possible neighbourhoods, for mark (black bar) and hole (gray bars) with a blur radius/mark radius of $12/33$.
Figure 44:
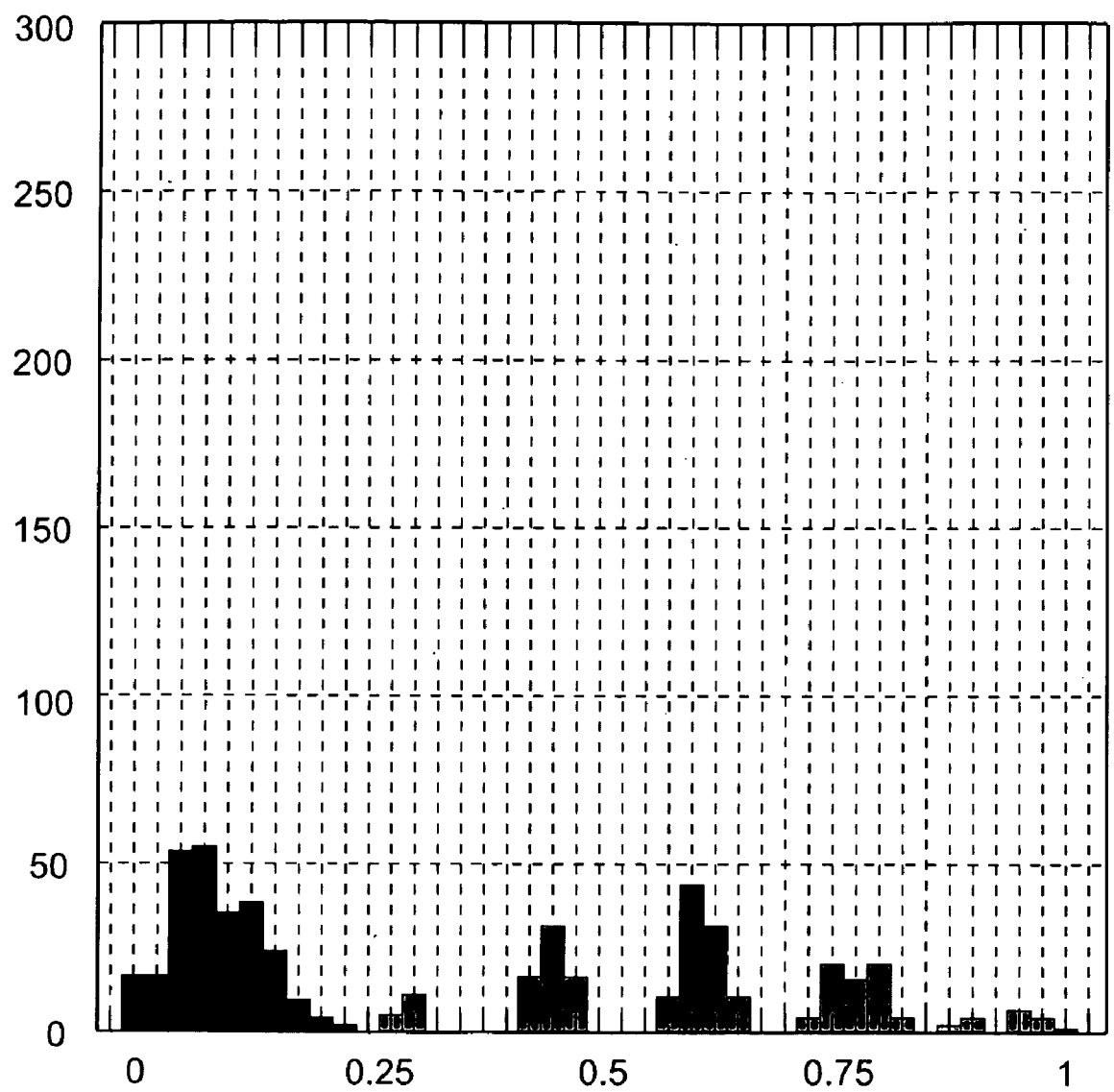

FIGS. 41 and 43 show the arrangement of FIG. 20 with increasing amounts of blur. FIGS. 42 and 44 show histograms of the imaged grayscale value of the central bit-encoding location for all possible neighbouring mark arrangements, computed with corresponding amounts of blur.

As shown in the histograms, as image blur increases the separation between the range of possible values representing a mark and the range of possible values representing a hole decreases to zero.

The five distinct modes in the hole intensity distributions correspond to the five possible combinations of marks at the bit-encoding locations directly adjacent to the central bit-encoding location. Marks at the diagonally-adjacent bit-encoding locations have a much smaller effect.

13. Relation to Earlier DotCard Design

13.1 Raw Data Layer

The Mnem raw data layer decouples block detection and y registration from block x registration, using a pilot sequence for block detection and y registration, and a multi-resolution registration track for x registration. In comparison with dot-Card's two-dimensional targets, this approach simplifies decoding and is more redundant and robust.

13.2 Fault-Tolerant Layer

The Mnem fault-tolerant layer uses CRCs on replicated bitstream parameter data to allow parameter decoding before Reed-Solomon decoding. This allows optimal interleaving of variable-length bitstreams, and allows in situ Reed-Solomon decoding (see below).

The Mnem fault-tolerant layer uses significantly less Reed-Solomon redundancy (15% versus 50%) than dotCard. This increases data density and simplifies decoding.

13.3 Decoding Algorithm

The Mnem decoding algorithm differs from the dotCard decoding algorithm in several ways, all of which are also applicable to dotCard decoding.

The Mnem algorithm uses scanline decoding rather printline decoding. Scanline decoding extracts data by traversing a scanline, while printline decoding extracts data by traversing a printline, i.e. by visiting all of the scanlines the printline intersects. Scanline decoding allows the Mnem algorithm to operate without off-chip buffering for raw scan data, significantly reducing external memory requirements and memory bandwidth.

Printline decoding requires an amount of external memory proportional to the maximum rotation of the block (for small angles) and the square of the media width (this can be reduced to the square of the block width with some additional decoding complexity). For the media width of 2.2 inches and maximum block rotation of 1 degree assumed in the original dot-Card study, the design of which has been disclosed in a series of Granted patents and pending patent applications listed in the cross references above, printline decoding requires about 2 MB of temporary scan memory. For a media width of 4 inches printline decoding requires about 6.7 MB of temporary scan memory. Note that scanline decoding assumes a constant print speed, while printline decoding assumes a constant scan speed.

The Mnem algorithm uses a conventional PLL. This is both less complex and less susceptible to noise than the dotCard algorithm's ad hoc PLL, which has an inefficient phase detector and lacks a proper loop filter.

The Mnem algorithm uses the full local context for bit value disambiguation. This improves accuracy and partially makes up for reduced Reed-Solomon redundancy.

The Mnem algorithm uses on-the-fly interleaving and de-interleaving of redundancy-encoded data to allow in-situ decoding. This ensures contiguity of decoded data, simplifying its use by applications. Pre-and post-process interleaving and de-interleaving can only be performed in situ if the interleave factor equals the codeword size.

The invention claimed is:

1. A system for decoding coded data printed in ink on a surface, the coded data including an encoded bit stream and redundancy data associated with the bit stream, the system comprising:
   a store for storing the coded data; and
   a decoder for:
      determining a codeword format for the coded data;
      reading from the store, using the determined format, coded data, the coded data being read so as to de-interleave the encoded bit stream and the redundancy data into each of a number of codewords, each codeword including a bit stream part and corresponding redundancy data;
      correcting, using the bit stream part and the corresponding redundancy data, errors in the encoded bit stream; and
      writing the corrected data to the store,
   wherein the coded data includes a registration structure, the registration structure including at least two clock tracks indicative of a position of the coded data in the direction perpendicular to an alignment direction and two alignment lines for each clock track, the two alignment lines being indicative of the position of the respective clock track, and wherein the decoder is for:
      determining, using an alignment phase-locked loop (PLL), a position of the alignment lines for a respective clock track;
      determining, using the position of the alignment lines, the position of each respective track; and
      updating the alignment PLL.

2. A system according to claim 1, wherein the decoder is for decoding the coded data by:
   determining a transform for each scan line using the alignment data, the transform being indicative of coordinates of bit encoding locations within the data portions; and,
   detecting bit values using the transform.

3. A system according to claim 2, wherein the decoder is for:
   determining coordinates of sample values from the coordinates of the bit-encoding location; and,
   determining a bit-encoding value by interpolating sample values from two successive sample lines.

4. A system according to claim 3, wherein the decoder is for:
   assigning a temporary value to a decoded bitstream bit which has more than two possible values;
   resolving a binary value for the bit based on the values of surrounding bits in the data-encoding area; and,
   writing resolved encoded bitstream bit values to a storage device in bitstream order.

5. A system according to claim 1, wherein the decoder is for:
   determining the position of at least one marker to determine a gross registration;
   determining, using the gross registration, a clock indicator in a clock track;
   updating, using the clock indicator, an alignment PLL;
   determining, using the alignment PLL, a fine registration of the coded data in the alignment direction.

6. A system according to claim 1, wherein the decoder is for:
   for each clock track, determining, using a respective data clock PLL, a position of a clock indicator on the clock track;
   determining, using the position of the clock indicator on each clock track, an alignment angle; and,
   updating each data clock PLL.

* * * * *